(12) United States Patent
Hassell

(10) Patent No.: US 10,322,849 B2
(45) Date of Patent: Jun. 18, 2019

(54) BAKERY TRAY AND DOLLY

(71) Applicant: Rehrig Pacific Company, Los Angeles, CA (US)

(72) Inventor: Jon P. Hassell, Atlanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 107 days.

(21) Appl. No.: 14/866,022

(22) Filed: Sep. 25, 2015

(65) Prior Publication Data

US 2016/0009448 A1   Jan. 14, 2016

Related U.S. Application Data

(63) Continuation of application No. 12/856,900, filed on Aug. 16, 2010, now Pat. No. 9,156,588.

(60) Provisional application No. 61/234,182, filed on Aug. 14, 2009, provisional application No. 61/264,717, filed on Nov. 27, 2009, provisional application No. 61/312,788, filed on Mar. 11, 2010, provisional application No. 61/365,519, filed on Jul. 19, 2010.

(51) Int. Cl.

| | | |
|---|---|---|
| *B65D 21/02* | (2006.01) | |
| *B62B 5/00* | (2006.01) | |
| *B65D 21/04* | (2006.01) | |
| *B65D 1/34* | (2006.01) | |
| *B62B 3/14* | (2006.01) | |

(52) U.S. Cl.
CPC ........ *B65D 21/0215* (2013.01); *B62B 5/0093* (2013.01); *B65D 1/34* (2013.01); *B65D 21/041* (2013.01); *B65D 21/046* (2013.01); *B62B 3/14* (2013.01); *B62B 2501/065* (2013.01)

(58) Field of Classification Search
CPC ...... B65D 1/34; B65D 21/041; B65D 21/046; B65D 21/0215; B62B 3/14; B62B 5/0093; B62B 2501/065
See application file for complete search history.

(56) References Cited

U.S. PATENT DOCUMENTS

| | | | | |
|---|---|---|---|---|
| 3,613,943 A | * | 10/1971 | Bridenstine | B65D 21/045 206/507 |
| 3,675,815 A | * | 7/1972 | Rehrig | B65D 21/046 206/507 |
| 4,000,817 A | * | 1/1977 | Sanders | B65D 21/041 206/505 |
| 4,936,458 A | * | 6/1990 | Tabler | B65D 21/062 206/386 |

(Continued)

*Primary Examiner* — Frank B Vanaman
(74) *Attorney, Agent, or Firm* — Carlson, Gaskey & Olds, P.C.

(57) ABSTRACT

A tray includes a base and a pair of opposed side walls extending upward from the base. Each of the side walls includes a plurality of feet providing multiple stacking heights with an identical tray. Each side wall including a recess on an inner, upper edge. A rear wall extends upward from a rear the base between the side walls. A front wall extends upward from a front of the base between the side walls, the front wall including a portion lower than the side walls.

A dolly that can be used with the tray includes a deck having a pair of contiguous support surfaces. A reinforcement rod supports the pair of support surfaces. A caster includes a caster plate secured to the deck, the reinforcement rod between the caster plate and the deck.

35 Claims, 56 Drawing Sheets

(56) References Cited

U.S. PATENT DOCUMENTS

| | | | | |
|---|---|---|---|---|
| 5,896,992 A * | 4/1999 | McGrath | B65D 21/045 206/505 |
| 6,260,706 B1 * | 7/2001 | Koefelda | B65D 21/046 206/505 |
| 6,273,259 B1 * | 8/2001 | Stahl | B65D 21/046 206/509 |
| 6,394,274 B1 * | 5/2002 | Cheeseman | B65D 21/045 206/503 |
| 2003/0183549 A1 * | 10/2003 | Verna | B65D 21/045 206/509 |
| 2006/0070906 A1 * | 4/2006 | Verna | B65D 21/041 206/509 |
| 2008/0110790 A1 * | 5/2008 | McTavish | B65D 21/0213 206/511 |

* cited by examiner

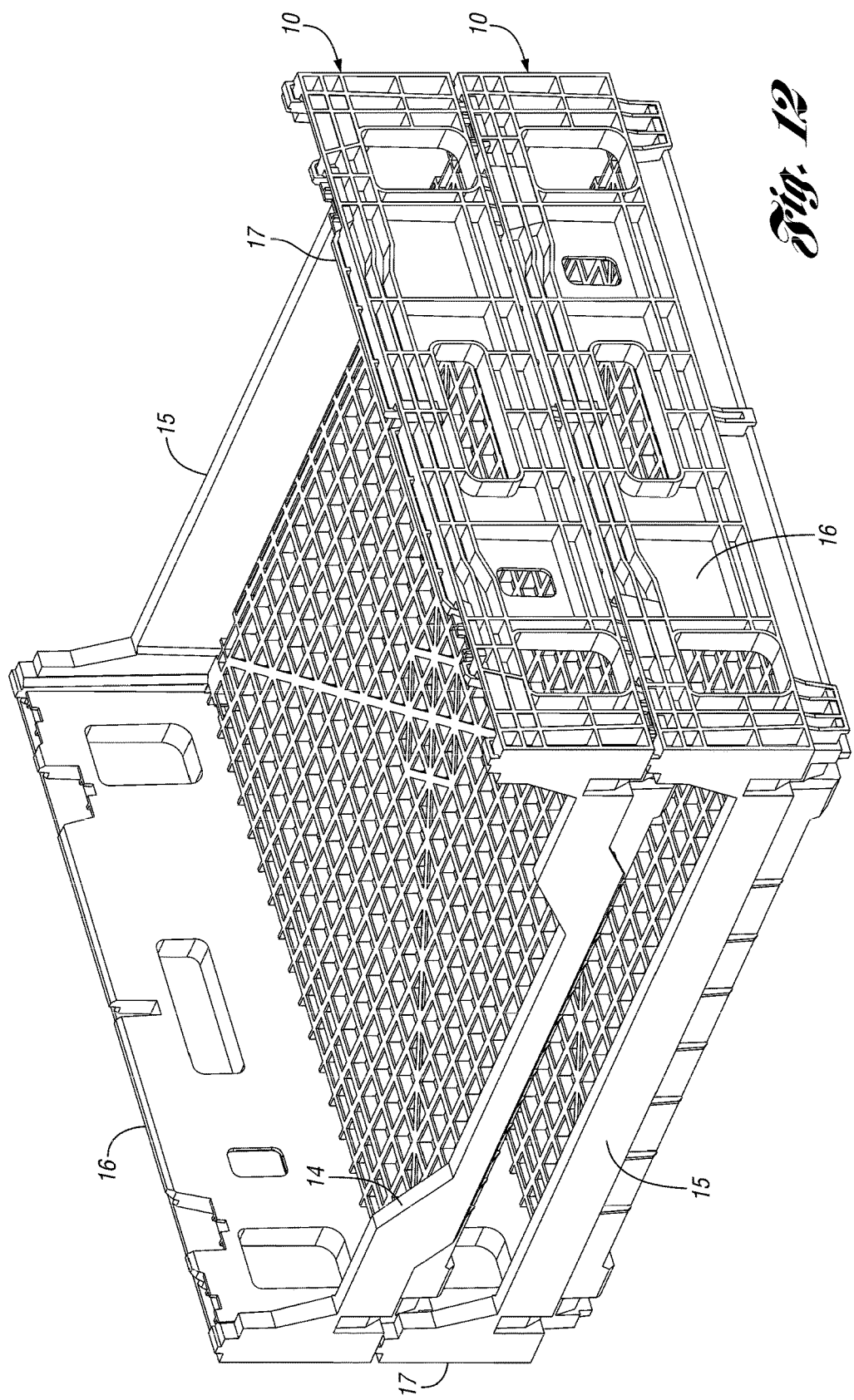

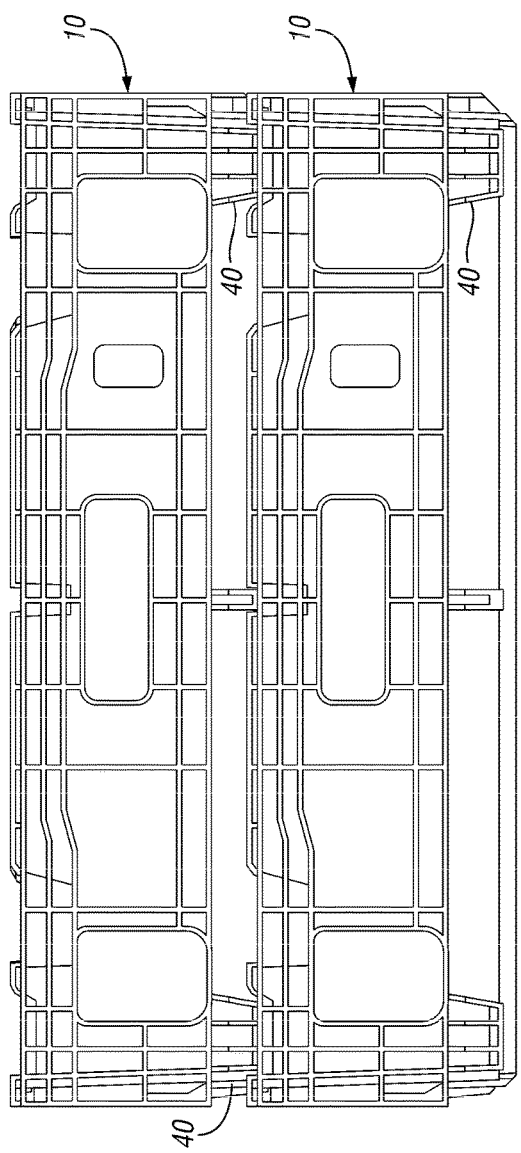
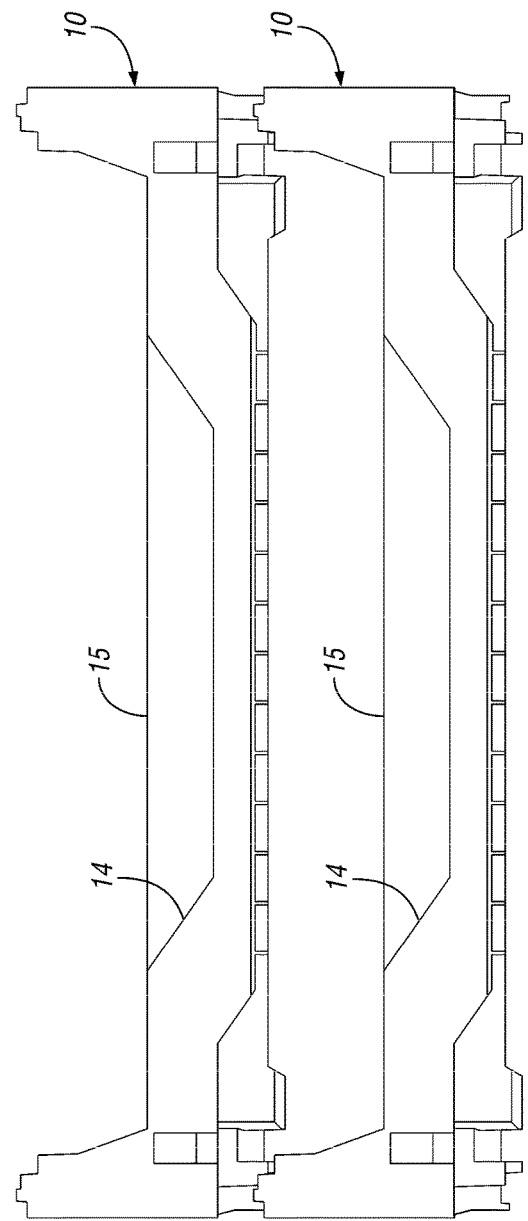

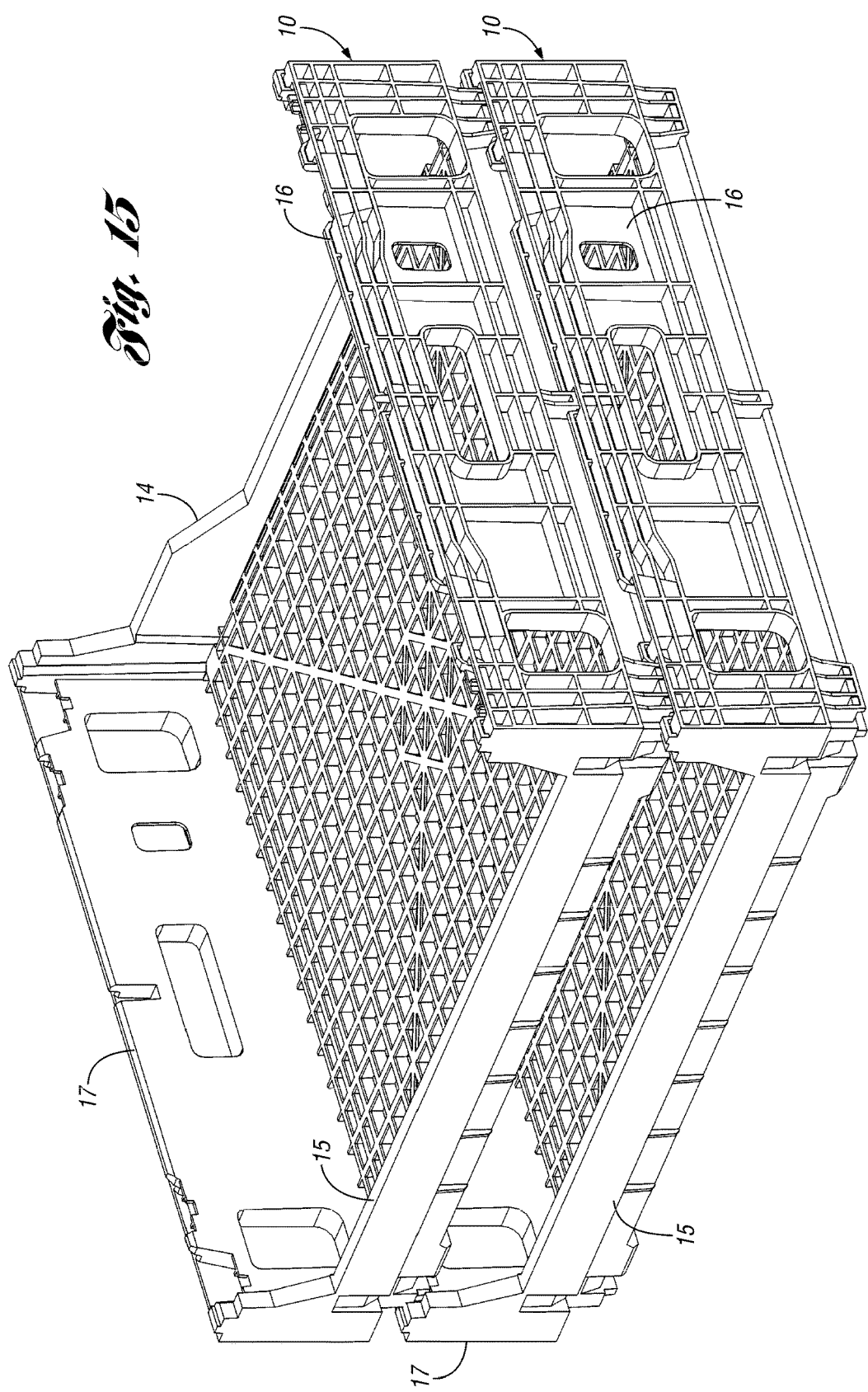

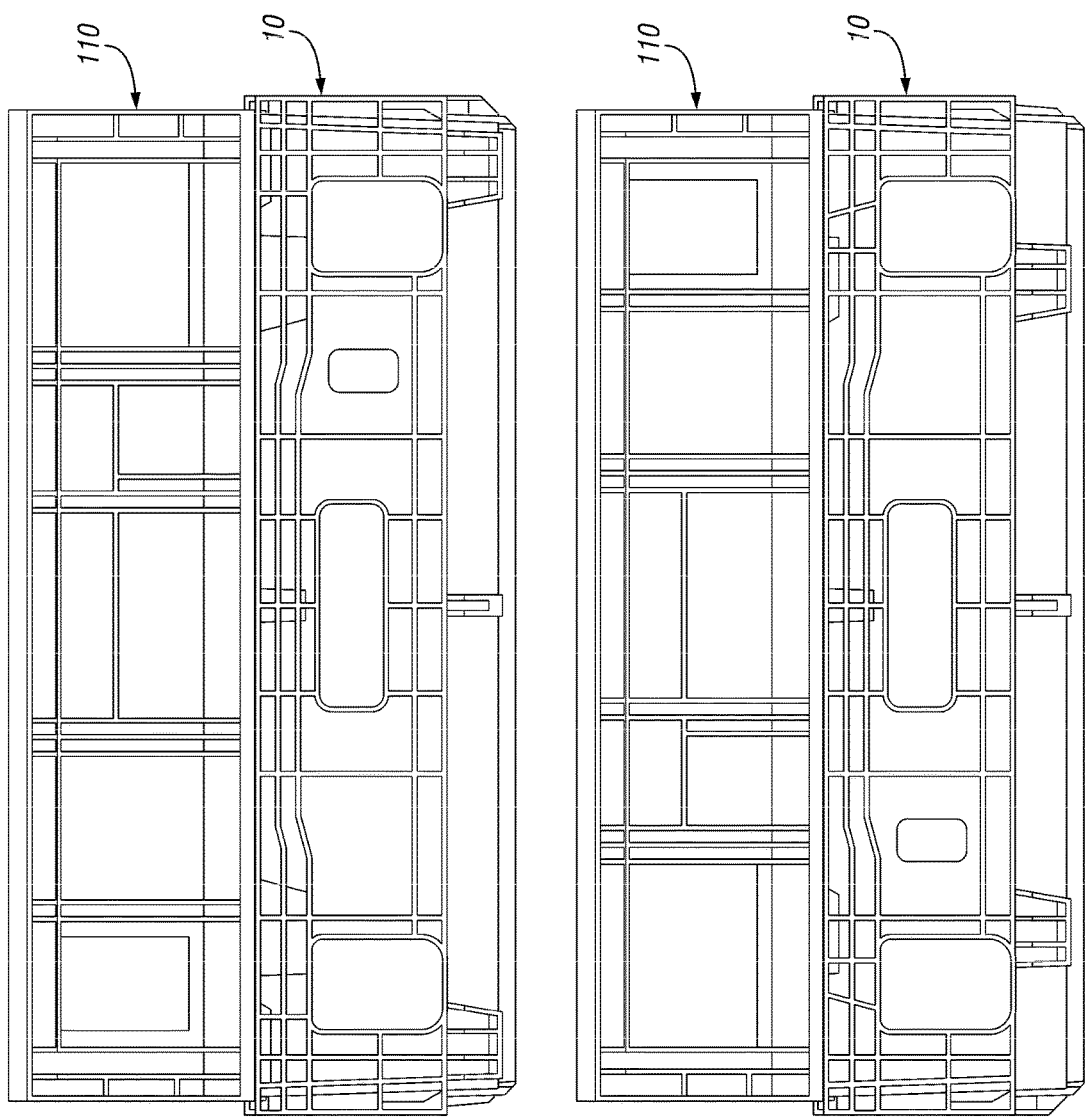

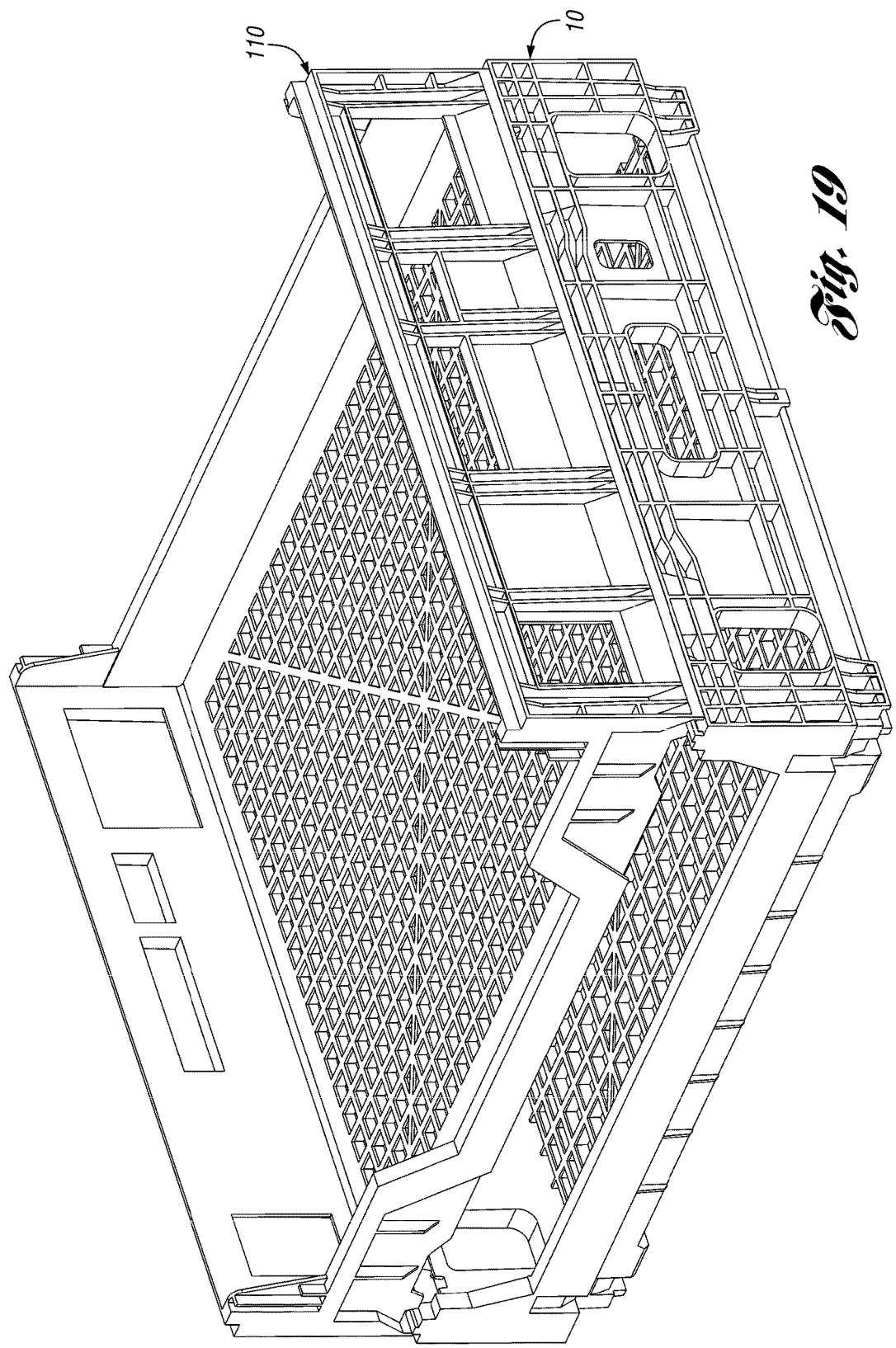

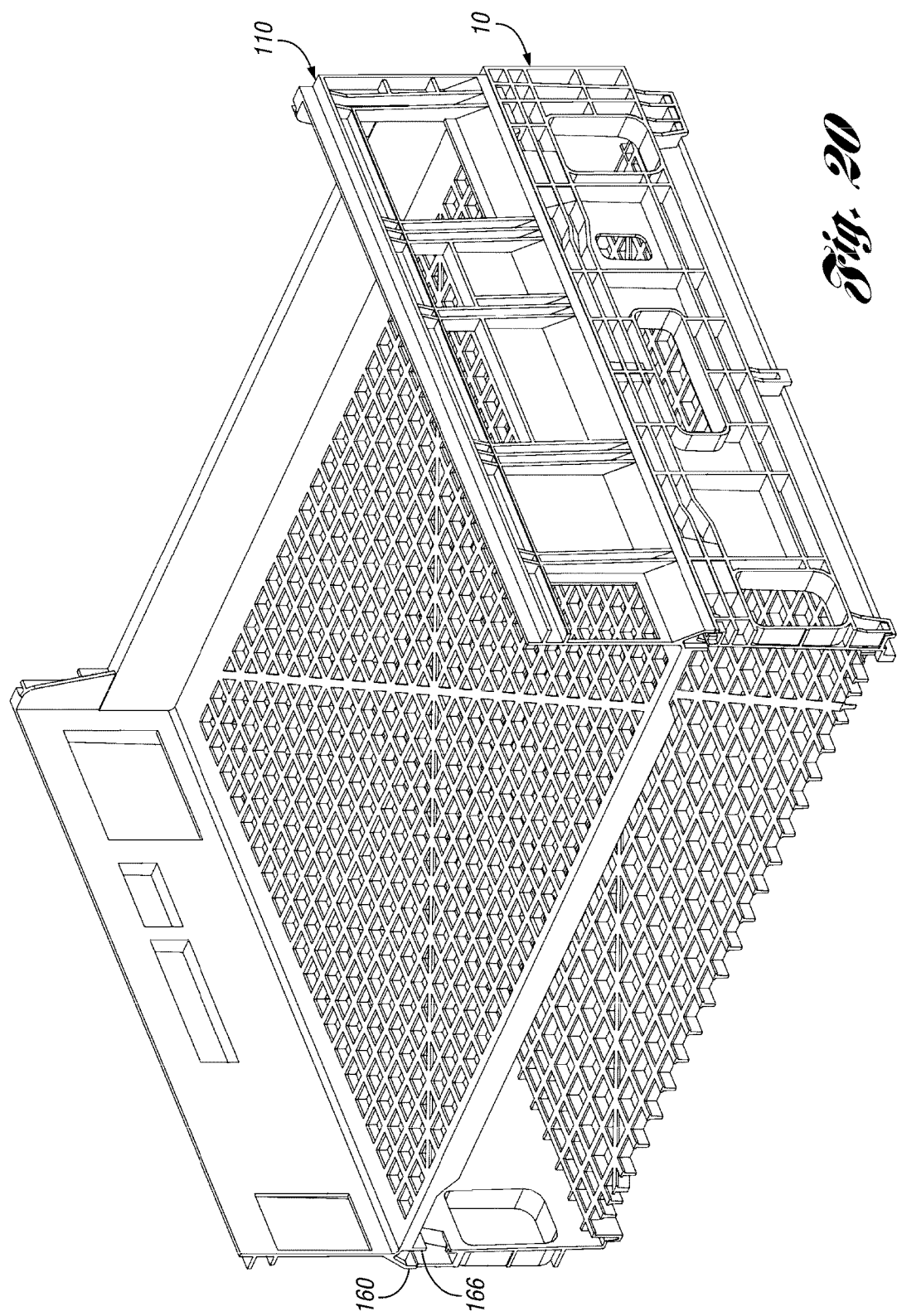

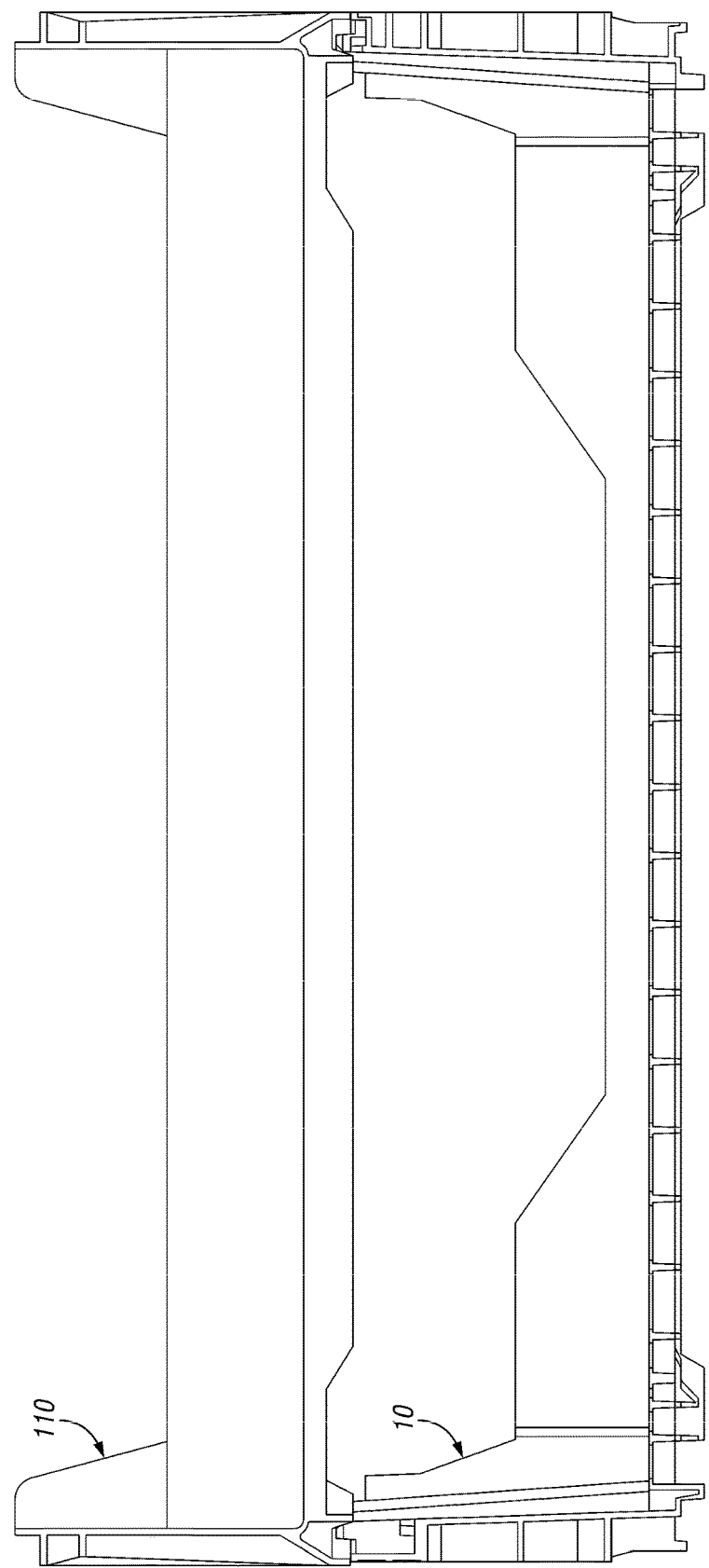

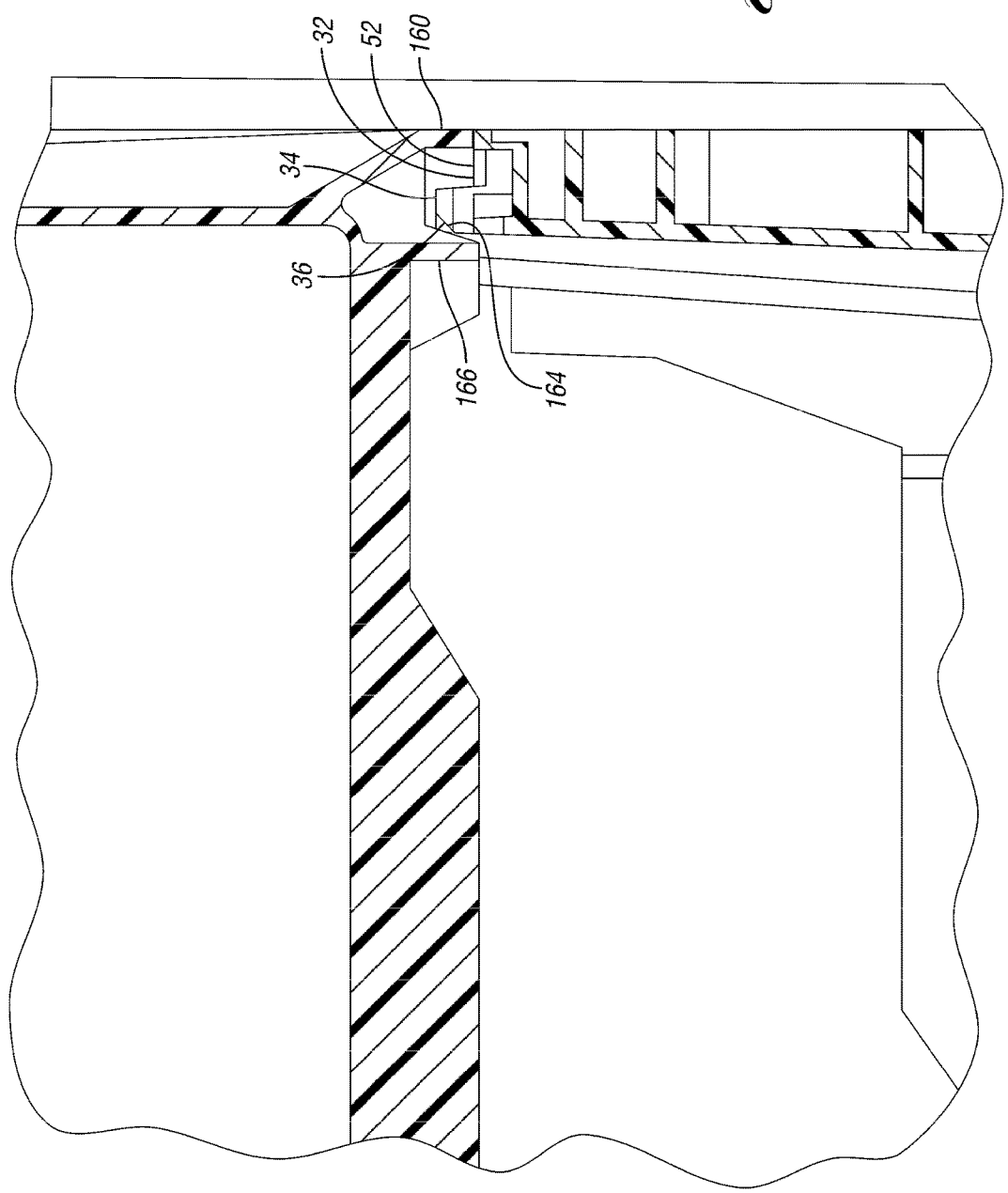

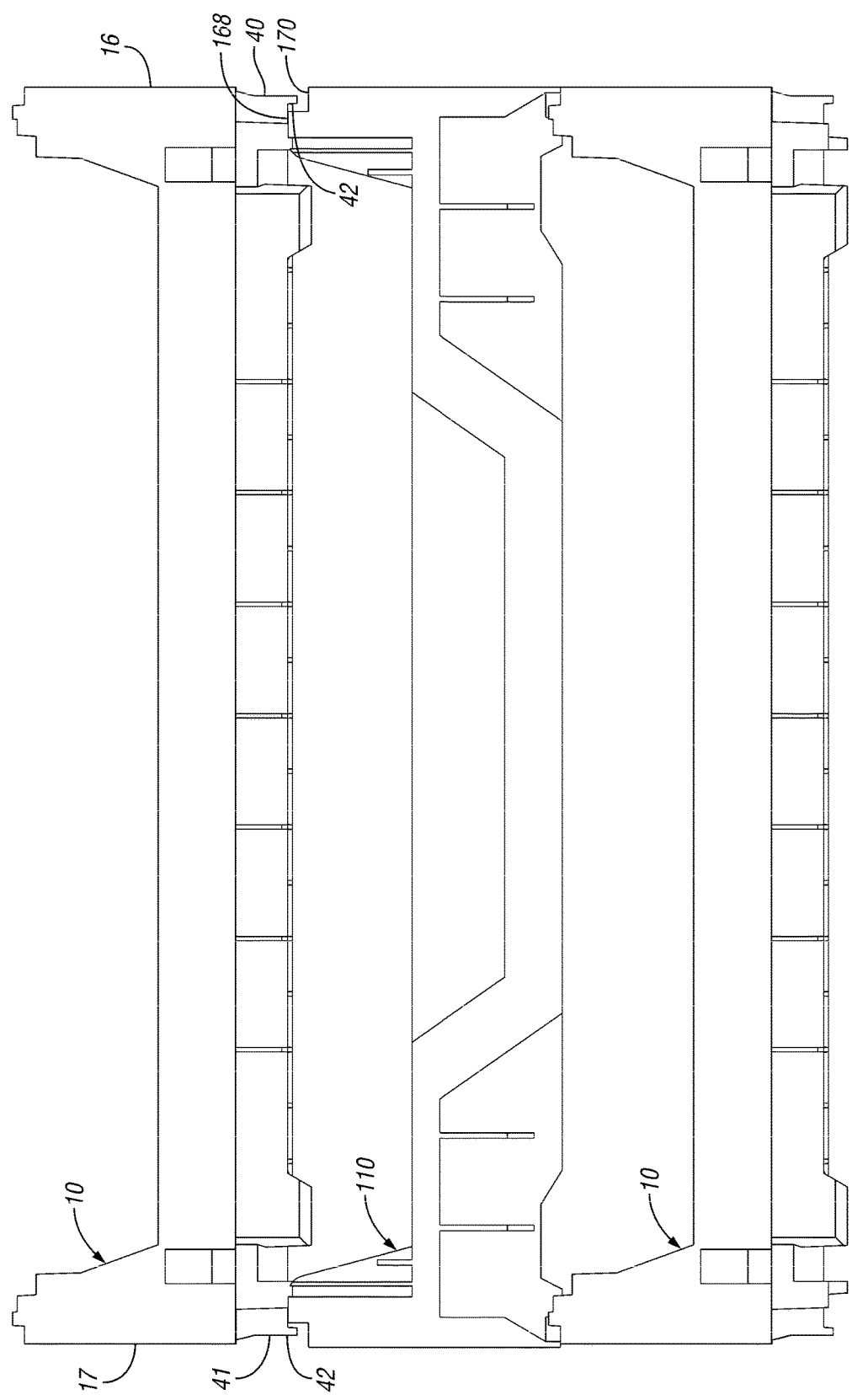

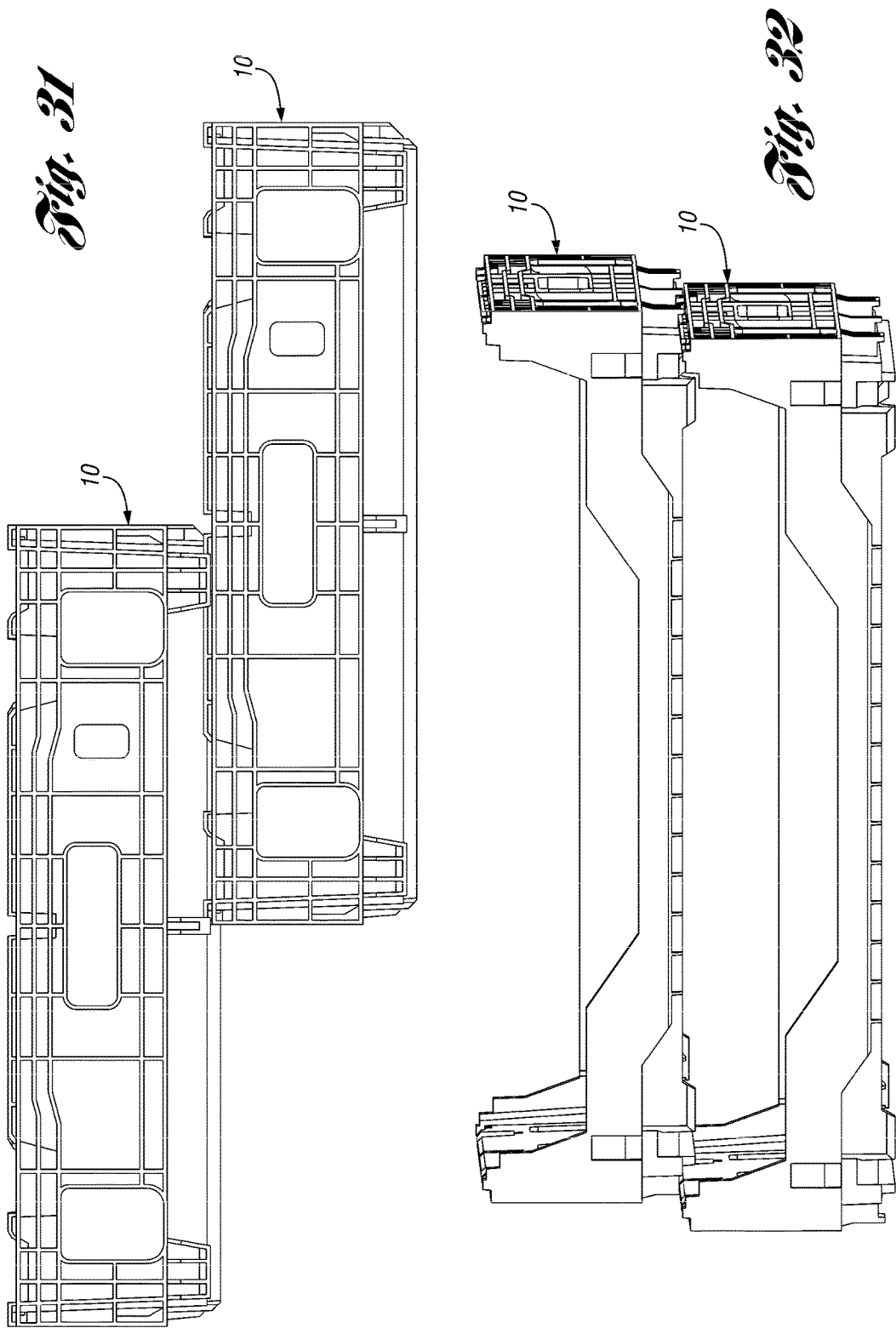

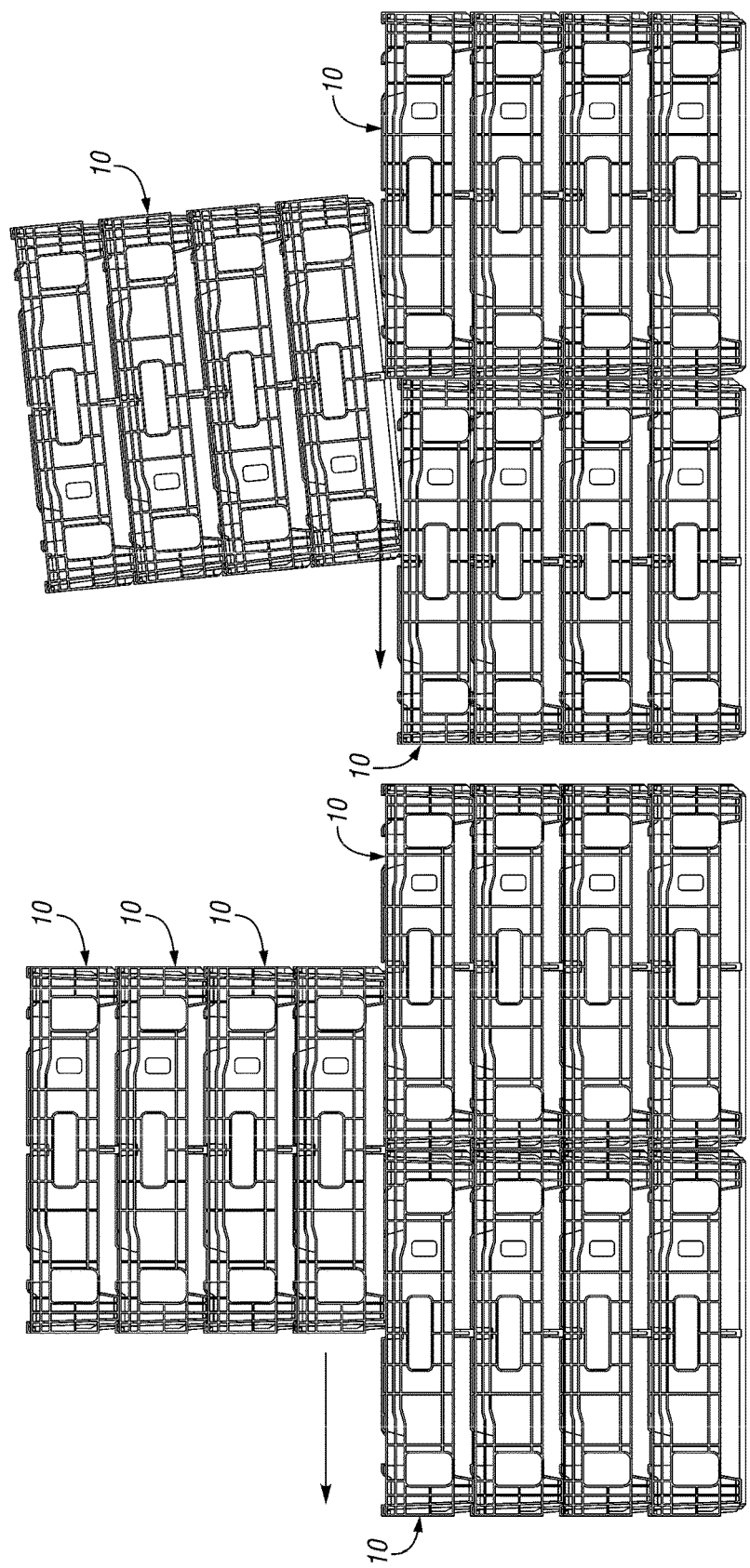

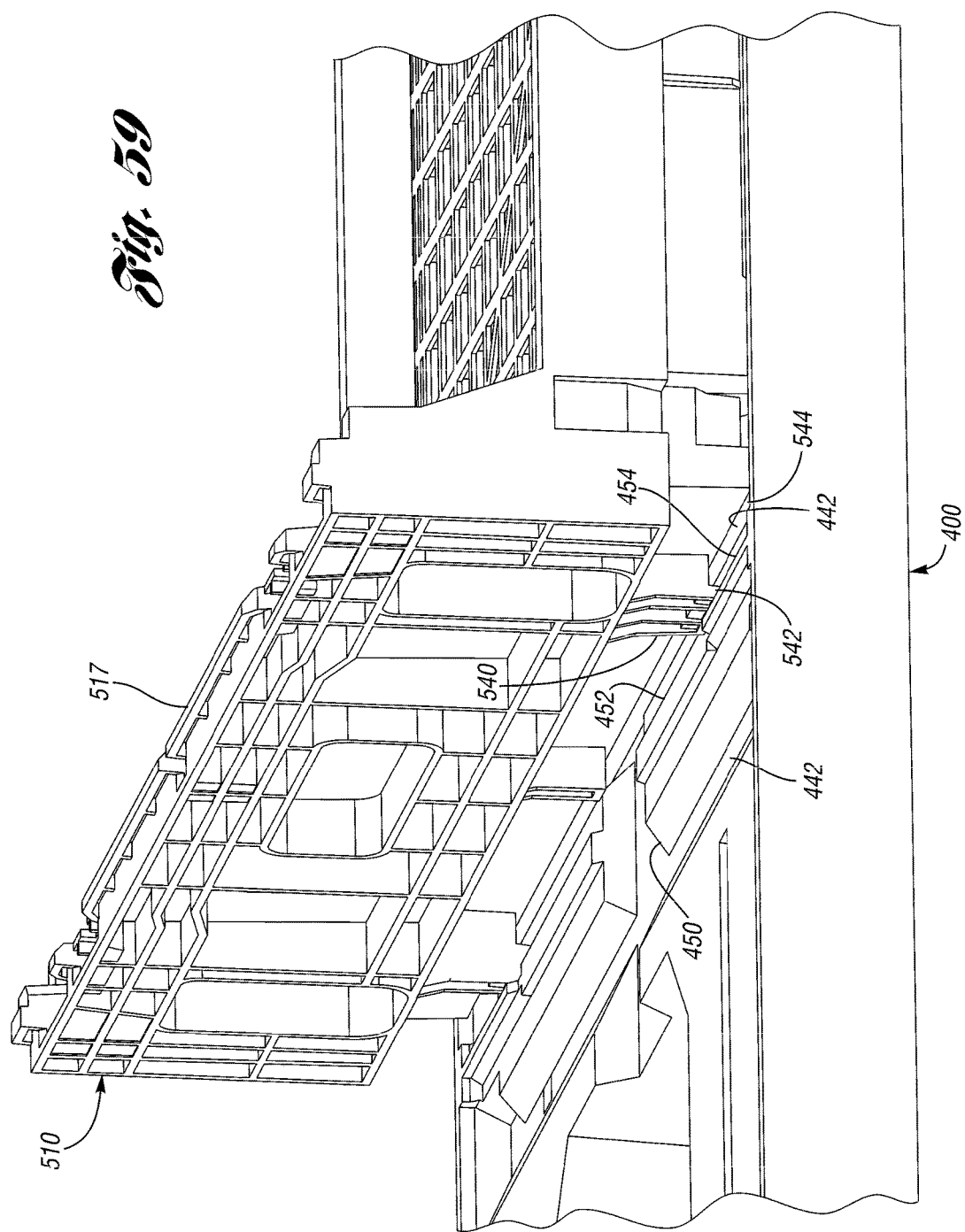

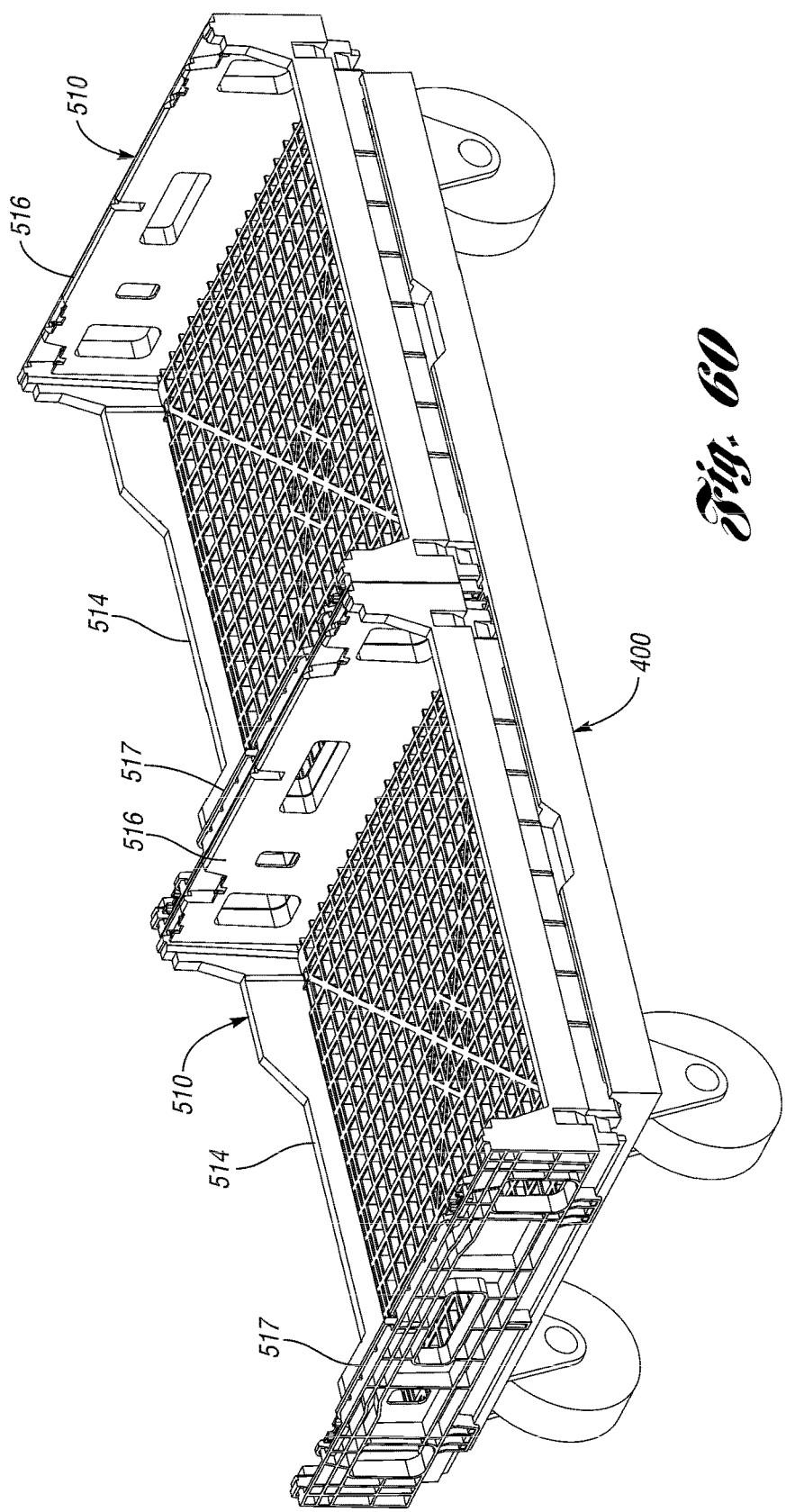

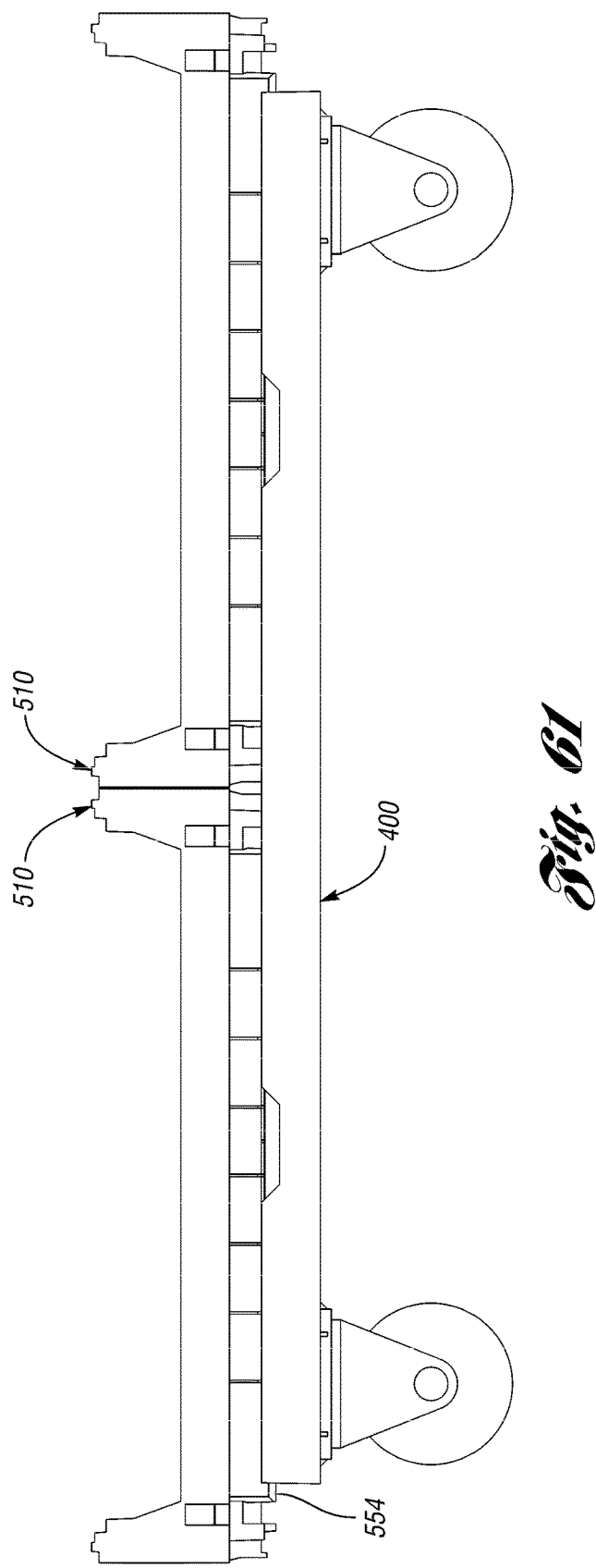

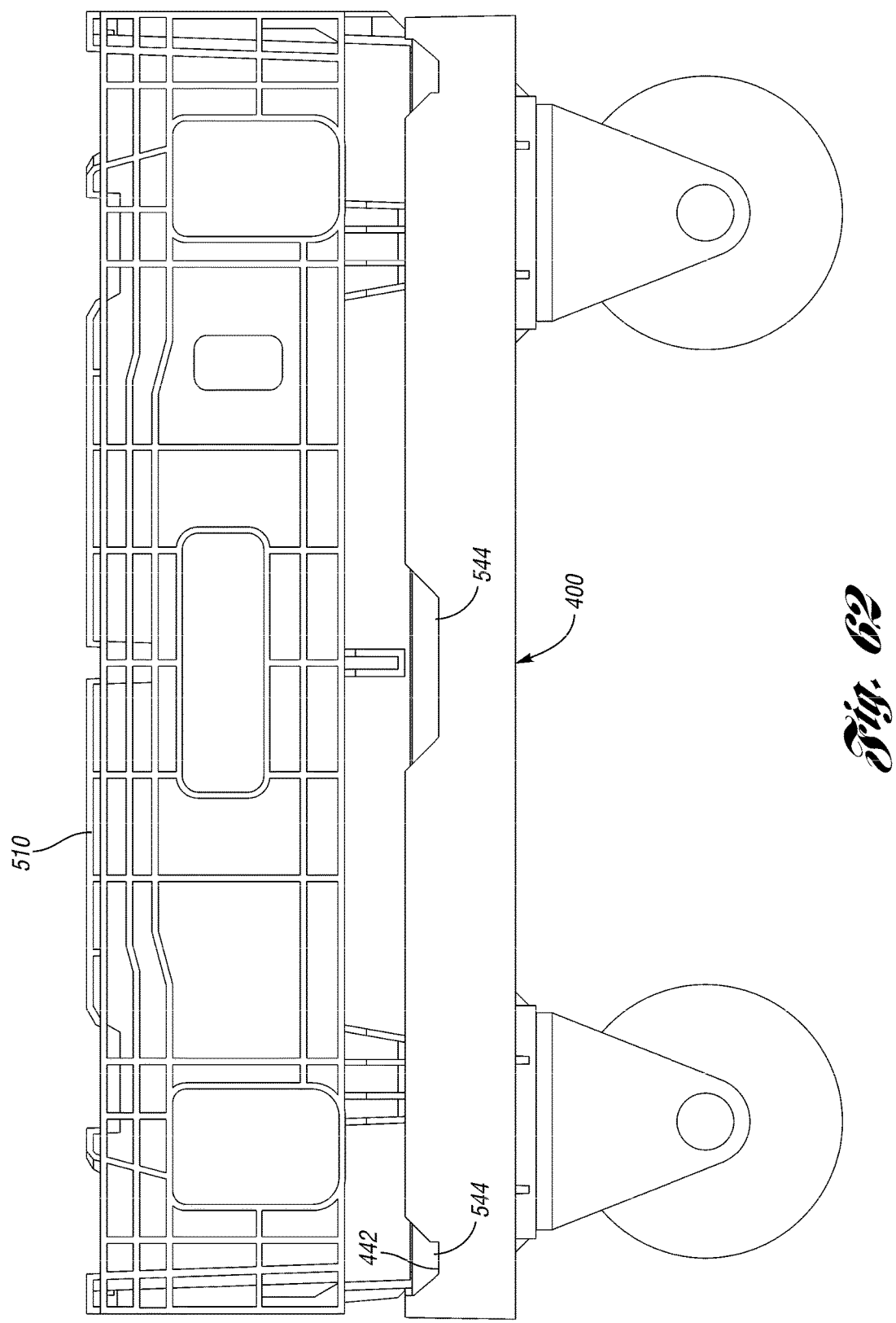

BAKERY TRAY AND DOLLY

BACKGROUND

Bakery trays for carrying and supporting baked items are well-known. The trays generally include a base and side walls extending upward from side edges of the base. Front and rear walls extend upward from front and rear edges of the base, and are shorter than the side walls.

SUMMARY

A tray includes a base and a pair of opposed side walls extending upward from the base. Each of the side walls includes a plurality of feet providing multiple stacking heights with an identical tray. A rear wall extends upward from a rear the base between the side walls. A front wall extends upward from a front of the base between the side walls, the front wall including a portion lower than the side walls.

The tray may optionally include a recess on an inner, upper edge. The tray may optionally include a channel on an outer, upper edge of each side wall.

A dolly that can be used with the tray includes a deck having a pair of contiguous support surfaces.

The dolly may optionally include a reinforcement rod supporting the pair of support surfaces. A caster includes a caster plate secured to the deck, the reinforcement rod between the caster plate and the deck.

In use, the dolly may have a pair of trays stacked thereon, each tray including a base, a pair of opposed side walls extending upward from the base, a rear wall extending upward from a rear the base between the side walls, and a front wall extending upward from a front of the base between the side walls, the front wall including a portion lower than the side walls, wherein the trays protrude over side edges of the dolly.

The dolly may optionally include a lip protruding upward from a periphery of the deck. If the trays include a drag rail extending downward of the base and defining a recess inward of the drag rail, the lip of the deck of the dolly can be received in the recess inward of the drag rail of the trays.

The dolly may optionally include a central divider between the pair of support surfaces, the divider including a first rail portion projecting upward from a base divider.

BRIEF DESCRIPTION OF THE DRAWINGS

FIG. 12 is a perspective view of the trays of FIG. 10.
FIG. 13 is a side view of the trays of FIG. 9 in a low stack position.
FIG. 14 is a rear view of the trays of FIG. 10.
FIG. 15 is a perspective view of the trays of FIG. 10.
FIG. 17 is a side view of the trays of FIG. 16.
FIG. 18 is the other side view of the trays of FIG. 16.
FIG. 19 is a perspective view of the trays of FIG. 16.
FIG. 20 shows the trays of FIG. 19, partially broken away.
FIG. 21 is a section view of the trays of FIG. 20.
FIG. 22 is an enlarged view of a portion of the trays of FIG. 21.
FIG. 23 is a rear view of a prior art tray between two of the trays of FIG. 1.
FIG. 31 is a side view of the trays of FIG. 30.
FIG. 32 is a front perspective view of the trays of FIG. 30.
FIG. 34 is a side view of a first stack of the trays of FIG. 1 slid across two other stacks of trays of FIG. 1.
FIG. 35 shows the first stack of trays slid across two uneven stacks of trays.

FIG. 59 is an enlarged view of the center of the dolly and tray of FIG. 58.

FIG. 60 shows the tray and dolly of FIG. 58 with a second tray on the dolly.

FIG. 61 is a side view of the tray and dollies of FIG. 60.

FIG. 62 is an end view of the tray and dollies of FIG. 60.

DETAILED DESCRIPTION OF THE
PREFERRED EMBODIMENT

Figure 1:
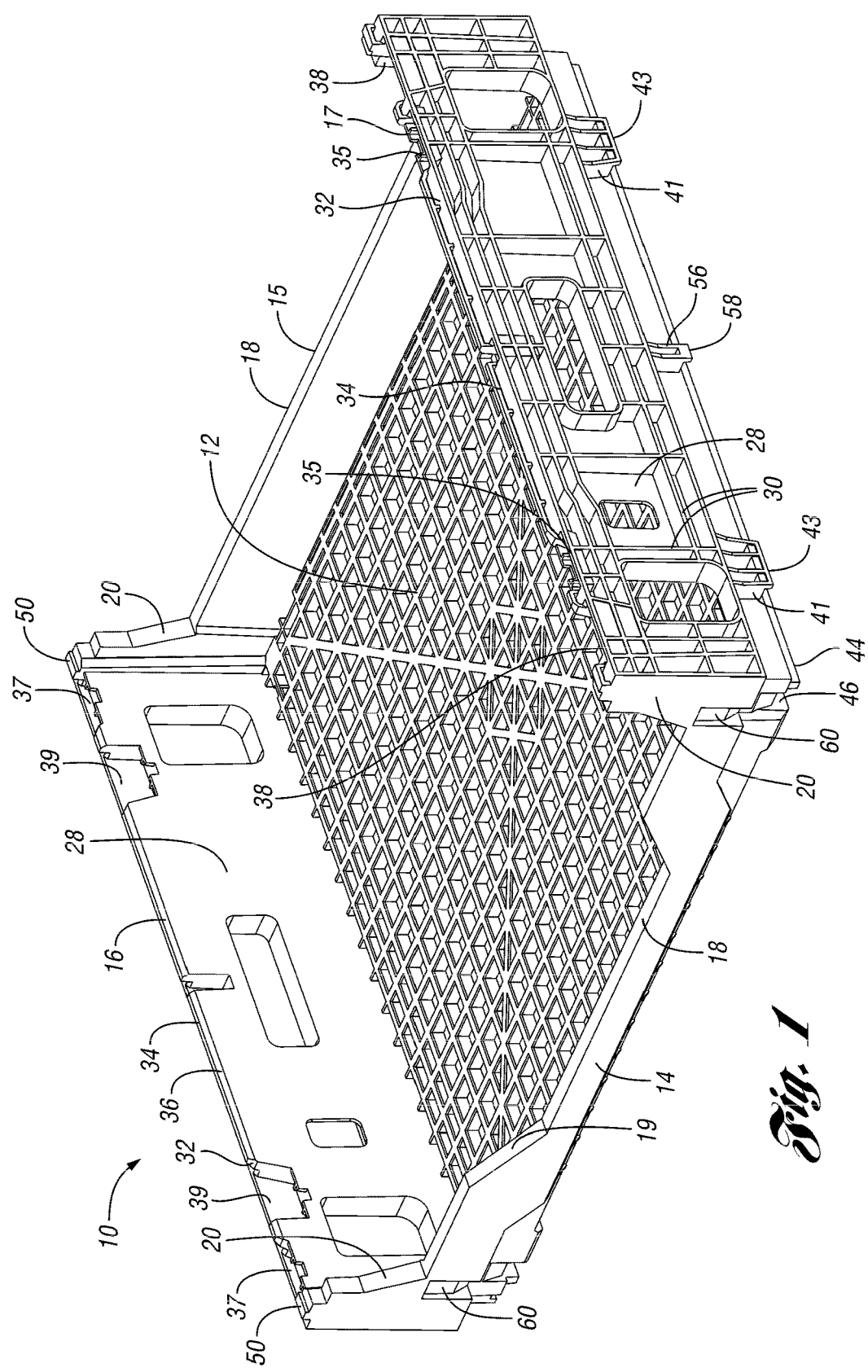
FIG. 1 is a front perspective view of a tray according to one embodiment.

A bakery tray 10 according to one embodiment of the present invention is shown in FIG. 1. The bakery tray 10 includes a base 12, which may be a grid or lattice of interconnected ribs, a front wall 14, a rear wall 15, and side walls 16 and 17. The front wall 14 and rear wall 15 each include an upper edge 18, which is lower than the side walls 16, 17. In the front wall 14, a cut-out portion 19 of reduced height is formed to provide easier access to the interior of the tray 10. Side flanges 20 extend inwardly into the front wall 14 and rear wall 15 from the side walls 16, 17.

Each of the side walls 16, 17 includes an interior wall portion 28 and a plurality of ribs 30 projecting outwardly therefrom. The side walls 16, 17 include an upper support surface 32 from which projects a side rail 34, interrupted to accommodate closely-spaced, high feet receiving pockets 35 and widely-spaced low feet receiving pockets 38 on side wall 17 and widely-spaced, high feet receiving pockets 37 and closely-spaced, low feet receiving pockets 39 on side wall 16. An upper edge of the interior wall portion 28 of the side walls 16, 17 includes a chamfered portion 36 providing a recess.

The side wall 17 includes a pair of closely-spaced feet 41 each having an outer rib 43 projecting downwardly from an outer edge thereof. The feet 41 are generally aligned with the high feet receiving pockets 35. The side wall 17 includes a lower wall portion 44 (or drag rail) from which the feet 41 project outwardly. A channel 46 is defined inwardly of the lower wall portion 44.

Figure 2:
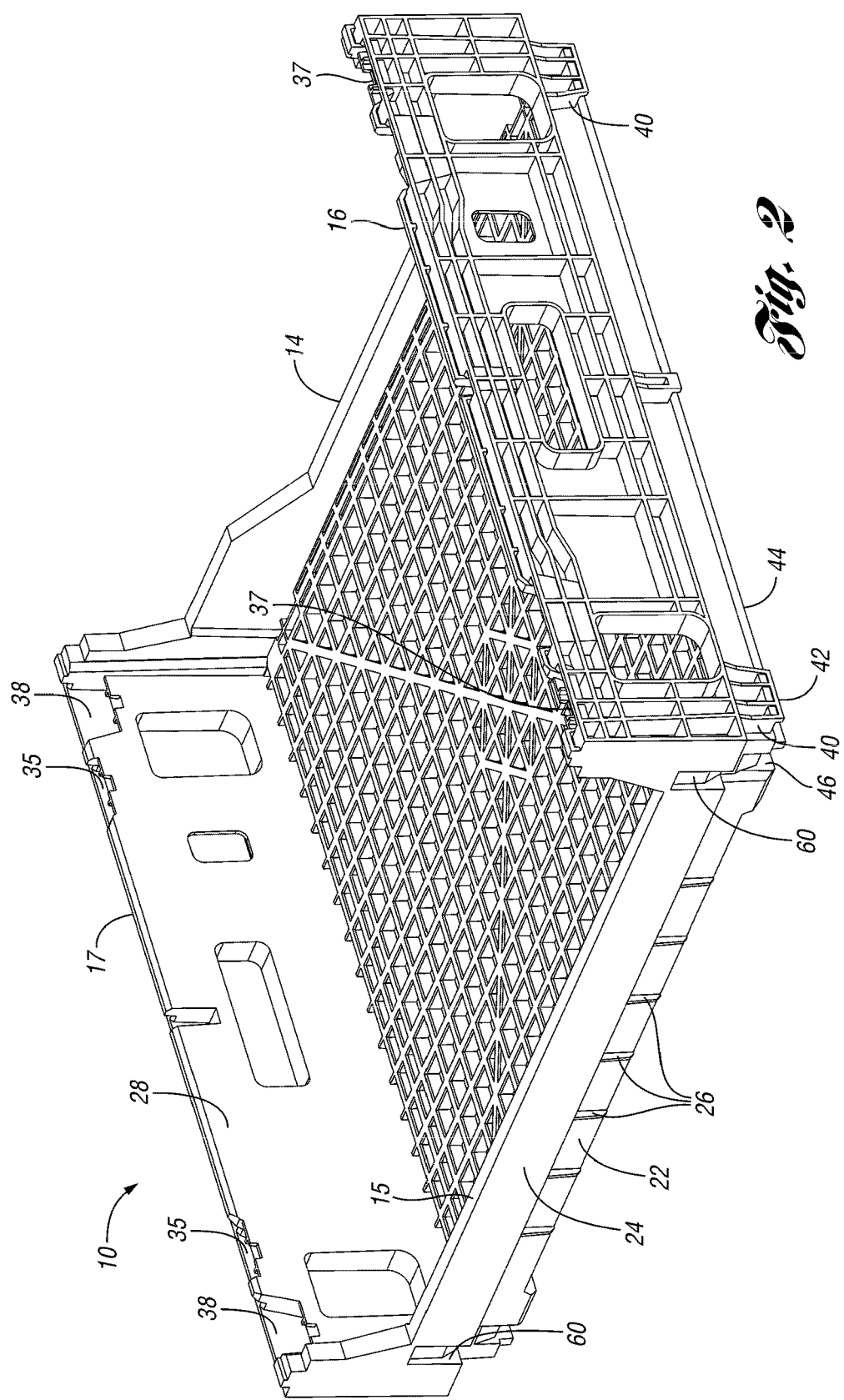
FIG. 2 is a rear perspective view of the tray of FIG. 1.

Referring to FIG. 2, the side wall 16 includes a pair of widely-spaced feet 40 each having an outer rib 42 projecting downwardly from an outer edge thereof. The feet 40 are generally aligned with the high feet receiving pockets 37. The side wall 16 includes a lower wall portion 44 (or drag rail) from which the feet 40 project outwardly. A channel 46 is defined inwardly of the lower wall portion 44.

At front and rear edges of the side walls 16, 17, the side rails 34 include a thicker ribbed portion 50 (alternatively, a double ribbed portion).

On the side walls 16, 17 in the center between the feet, a center projection 56 protrudes outwardly. An outer projection 58 projects downwardly from an outer edge of the center projection 56 to form a hook for added strength and consistent pivot feature disengagement.

As shown in FIGS. 1 and 2, a notch 60 is formed in front and rear walls 14, 15 adjacent each corner to accommodate cross stack of trays 10 when empty.

Referring to FIG. 2, the rear wall 15 includes an interior wall portion 22 and a lip 24 extending downwardly from the upper edge 18 of the rear wall 15. A plurality of vertical ribs 26 protrude from the outer surface of the interior wall portion 22 and into the lip 24.

Figure 3:
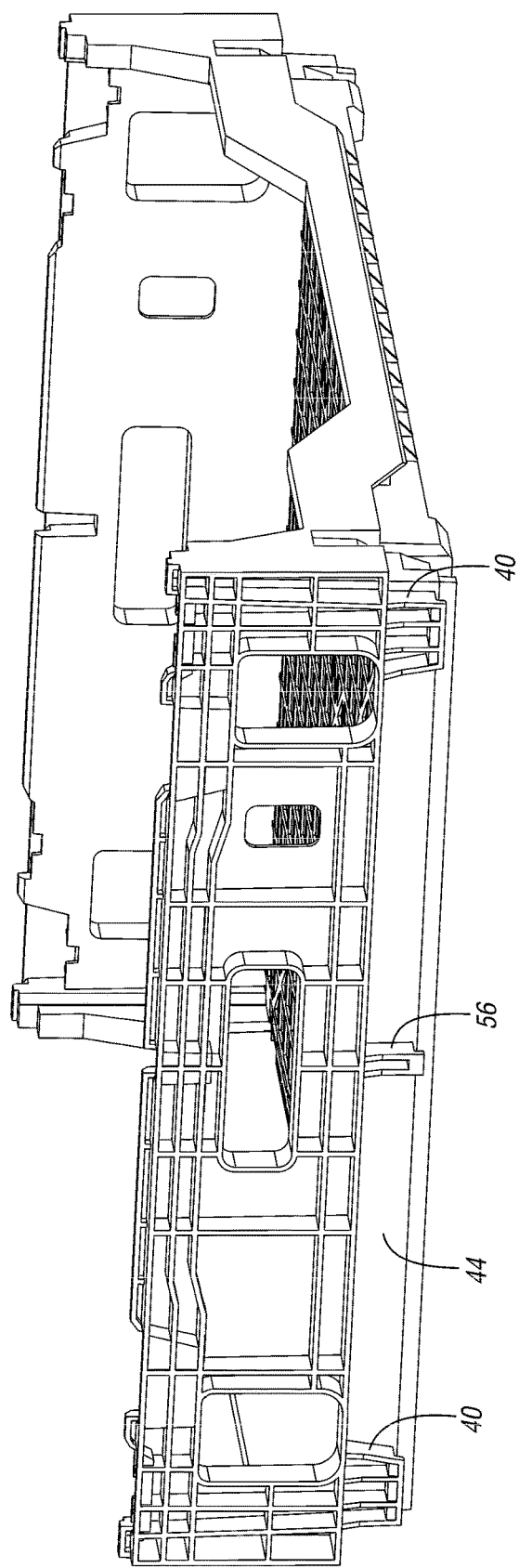
FIG. 3 is a side perspective view of the tray of FIG. 1.

As can be seen in FIG. 3, the feet 40 and center projection 56 are located above a plane of the lowermost edge of the lower wall portion 44 to protect the feet 40 and center projection 56 from damage.

Figure 4:
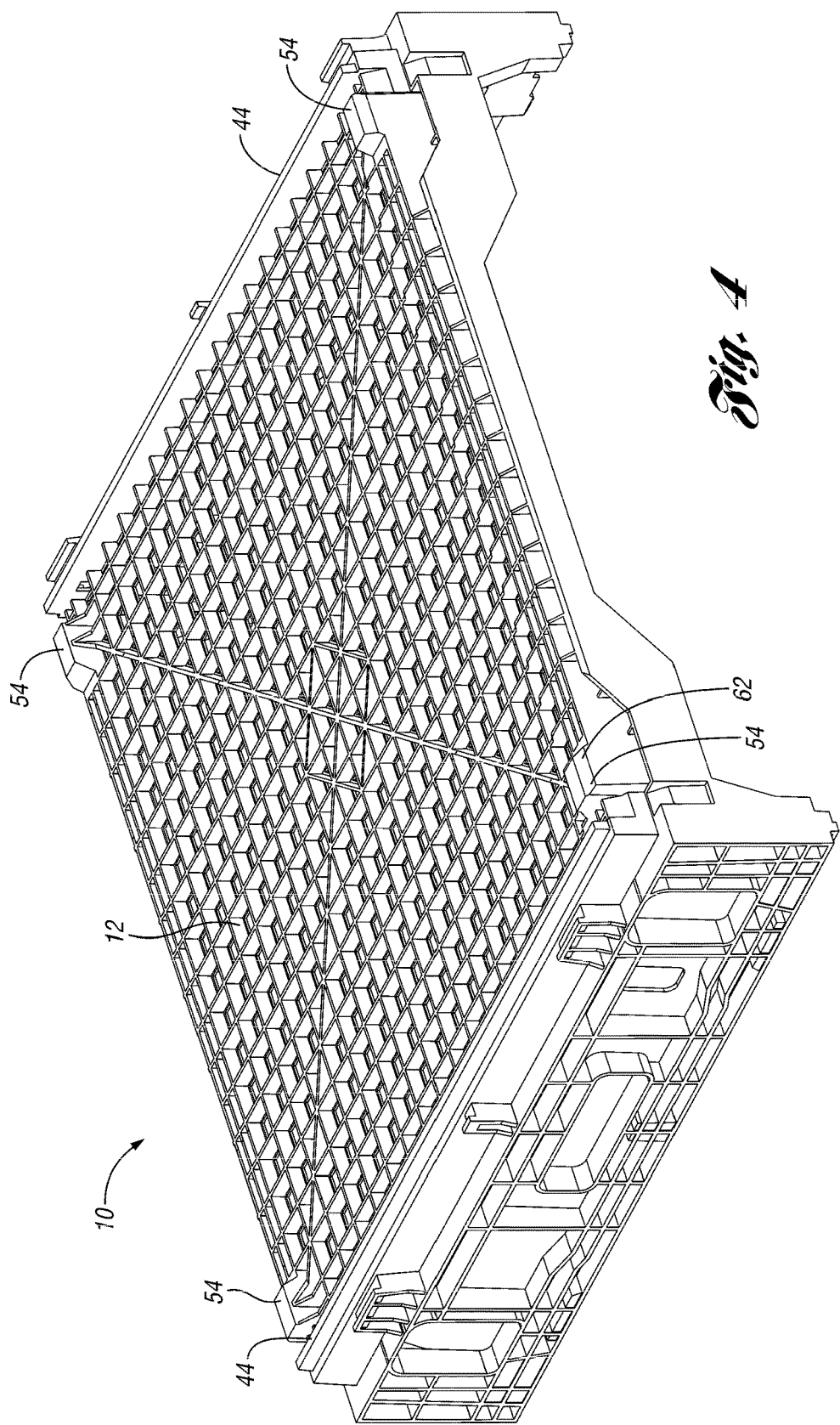
FIG. 4 is a bottom perspective view of the tray of FIG. 1.

FIG. 4 is a bottom perspective view of the tray 10. Drag feet 54 project downward from the base 12 and together with the lower wall portion 44 define the lowermost plane of the tray 10. The drag feet 54 include angled faces 62 that will impact the dock lift plate and protect the corners of the tray 10.

Figure 5:
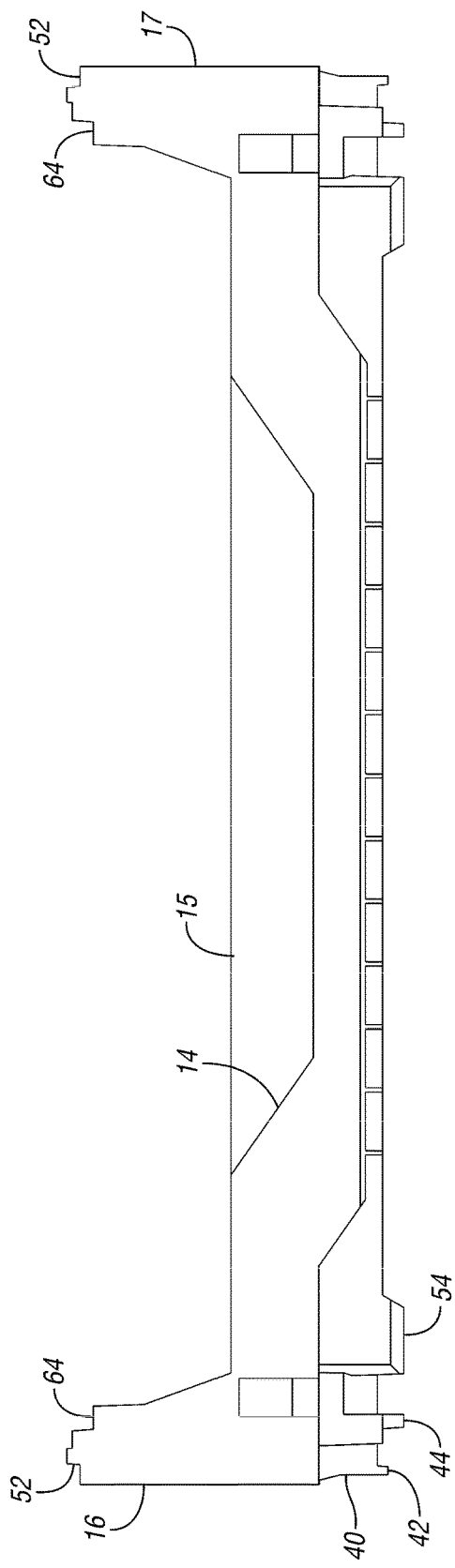
FIG. 5 is a front view of the tray of FIG. 1.
Figure 6:
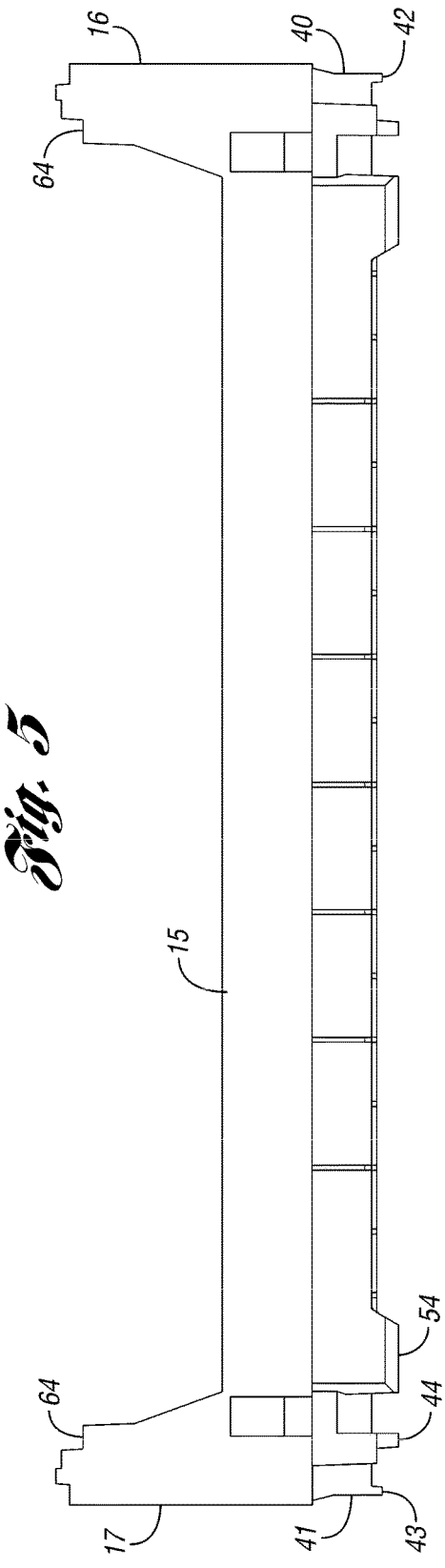
FIG. 6 is a rear view of the tray of FIG. 1.
Figure 7:
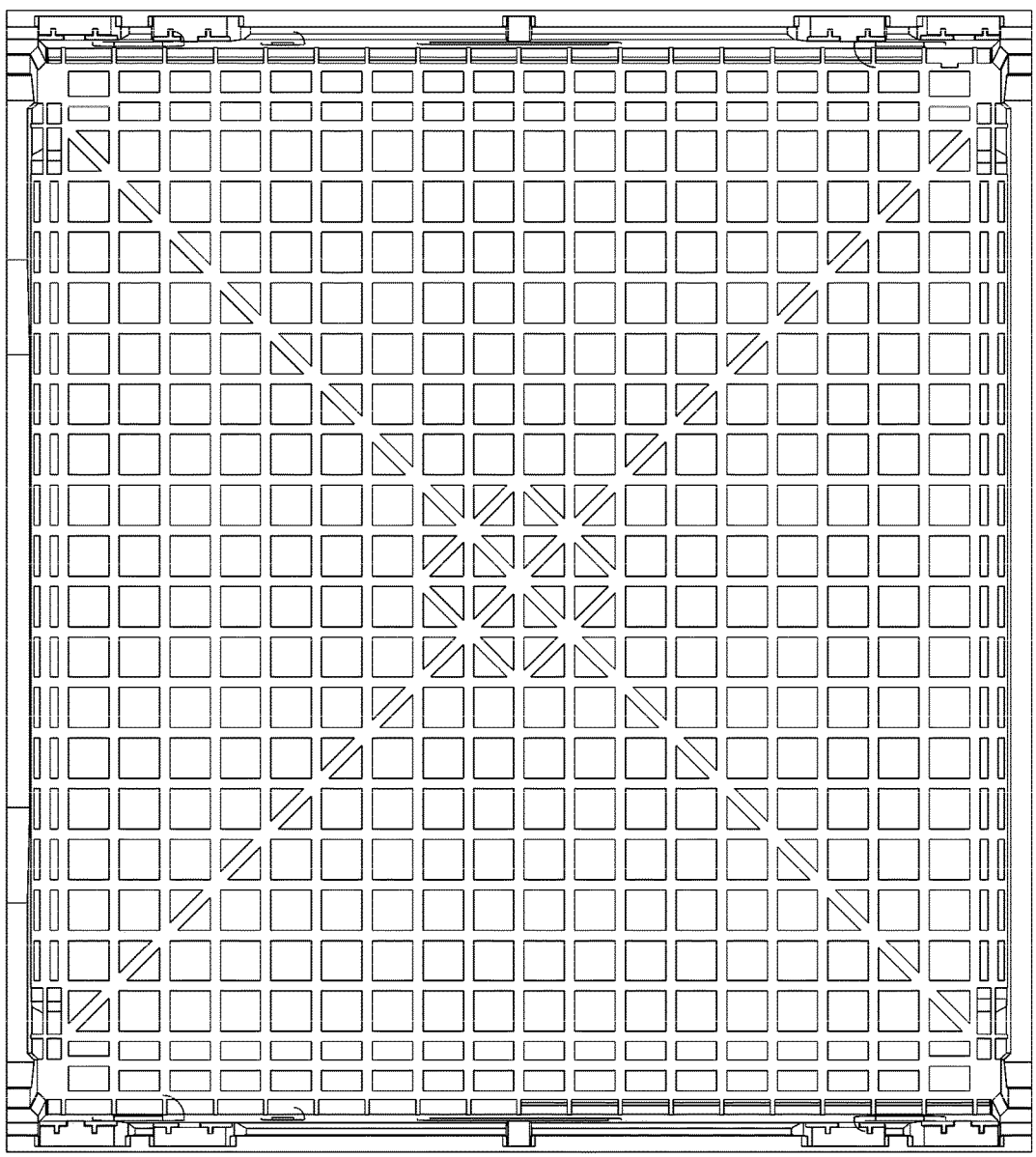
FIG. 7 is a top view of the tray of FIG. 1.
Figure 8:
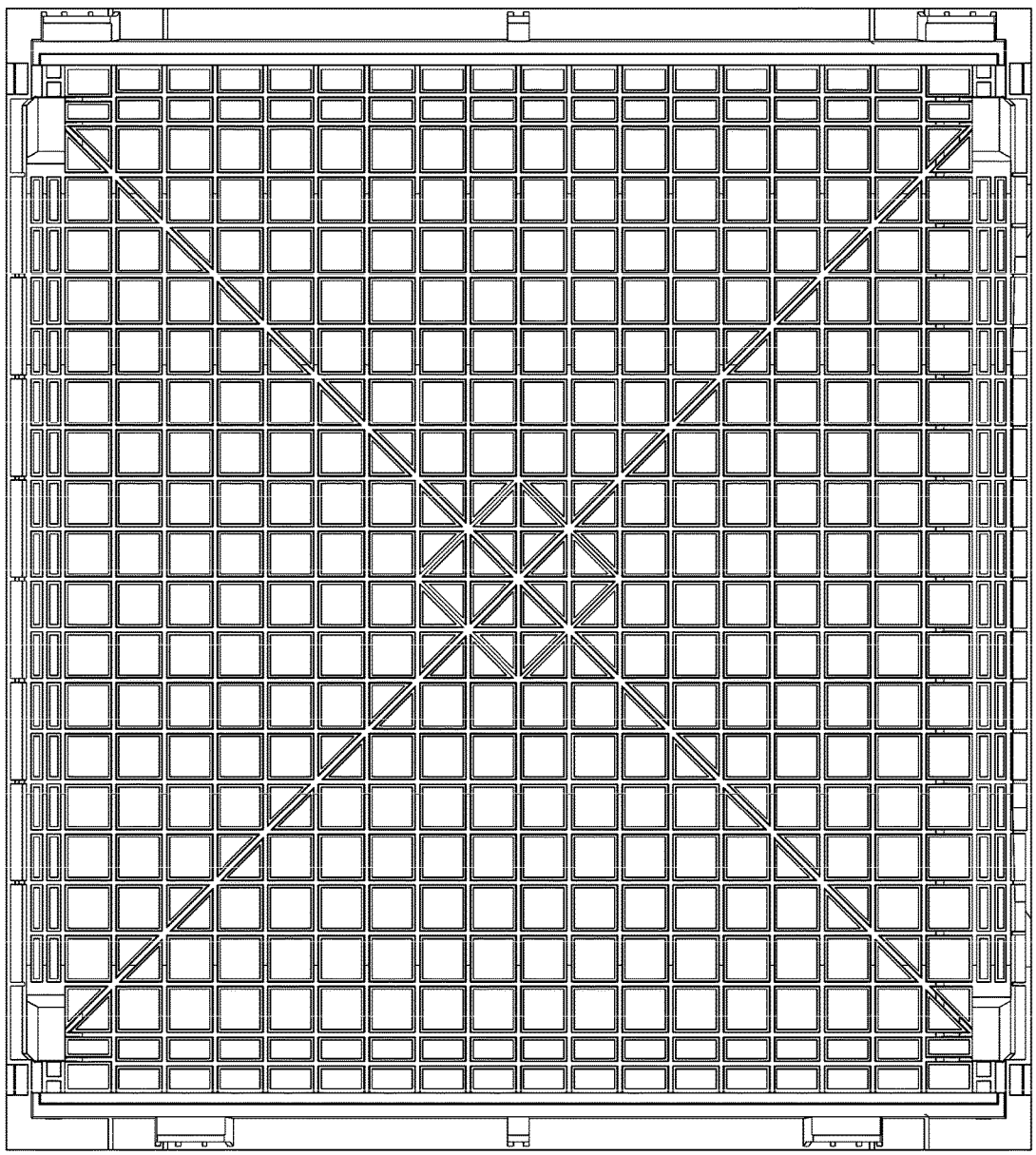
FIG. 8 is a bottom view of the tray of FIG. 1.

FIG. 5 is a front view of the tray 10. FIG. 6 is a rear view of the tray 10. As shown, each of the side walls 16, 17 includes a channel 52 along an upper outer corner. A notch 64 at the top of each side flange 20 is aligned with the lower wall portion 44 for alignment prior to sliding. FIG. 7 is a top view. FIG. 8 is a bottom view.

Figure 9:
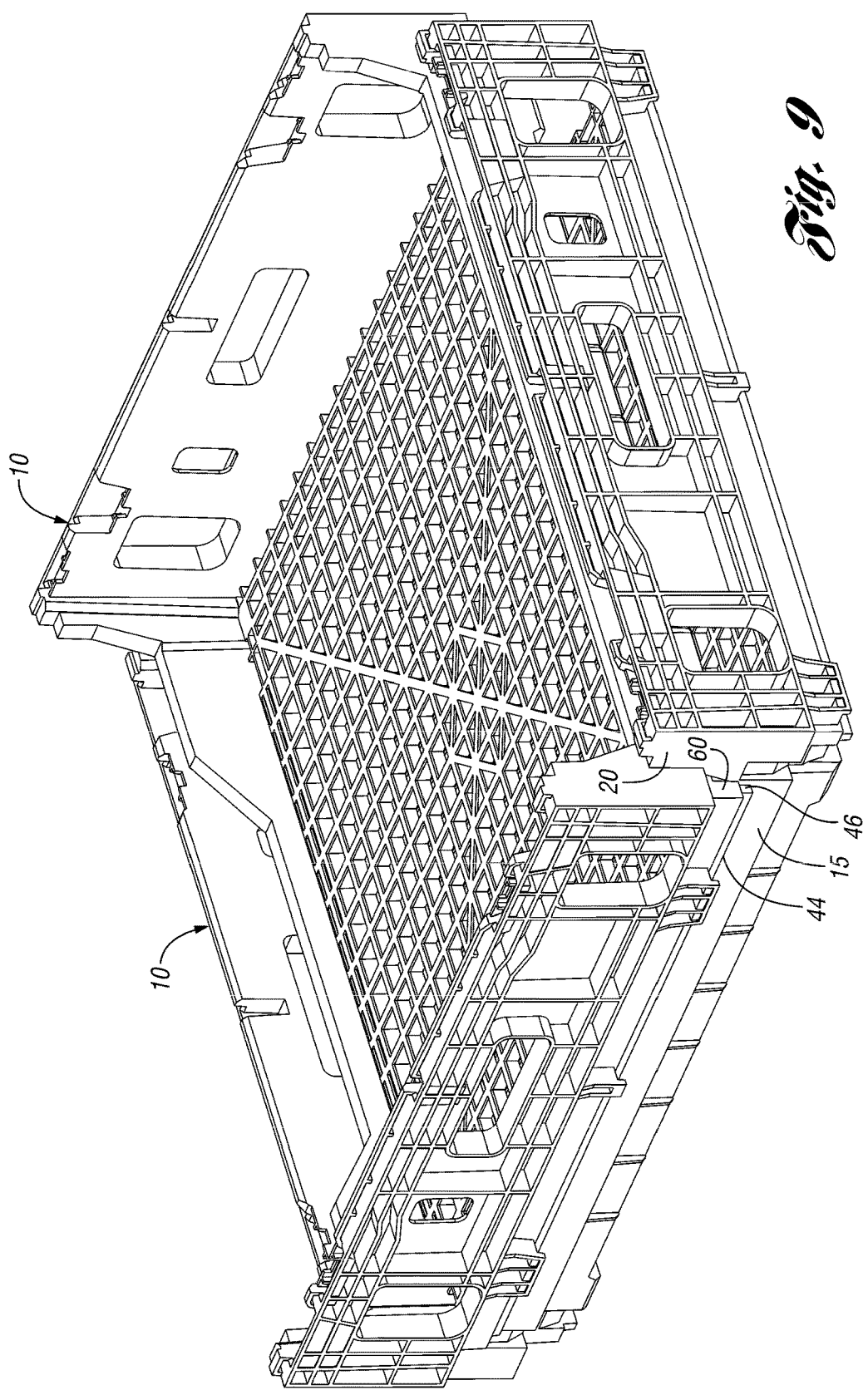
FIG. 9 shows the tray of FIG. 1 with an identical tray cross-stacked thereon.

FIG. 9 shows two empty trays 10 cross stacked. The flanges 20 of the lower tray 10 are received in the notches 60 in the front and rear walls 14, 15 of the upper tray 10. The front and rear walls 14, 15 of the lower tray 10 are received in the recess 46 inward of the lower wall portion 44 of the upper tray 10. In the cross-stacked position, the front wall 14 and rear wall 15 of the upper tray 10 are received between the side walls 16, 17 of the lower tray 10. The side walls 16, 17 of the upper tray 10 extend outwardly of the front and rear walls 14, 15 of the lower tray 10. In particular, the upper edges 18 (FIG. 1) of the front and rear walls 14, 15 of the lower tray 10 are received in the channels 46 of the side walls 16, 17 of the upper tray 10, such that the lower portion 44 of the side walls 16, 17 is interlocked on the exterior surface of the front and rear walls 14, 15 of the lower tray 10.

Figure 10:
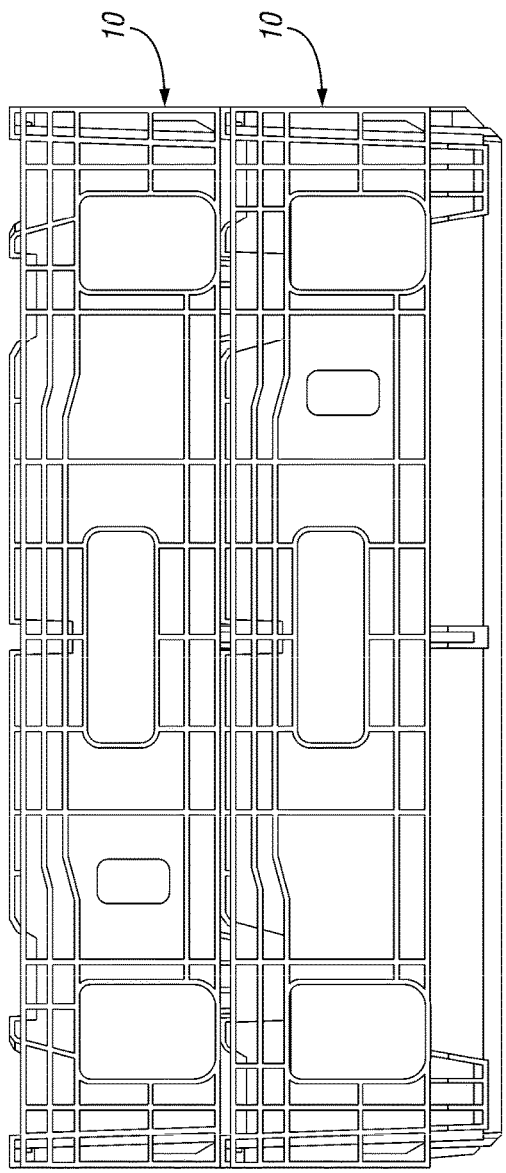
FIG. 10 is a side view of the trays of FIG. 9 in a low stack position.
Figure 11:
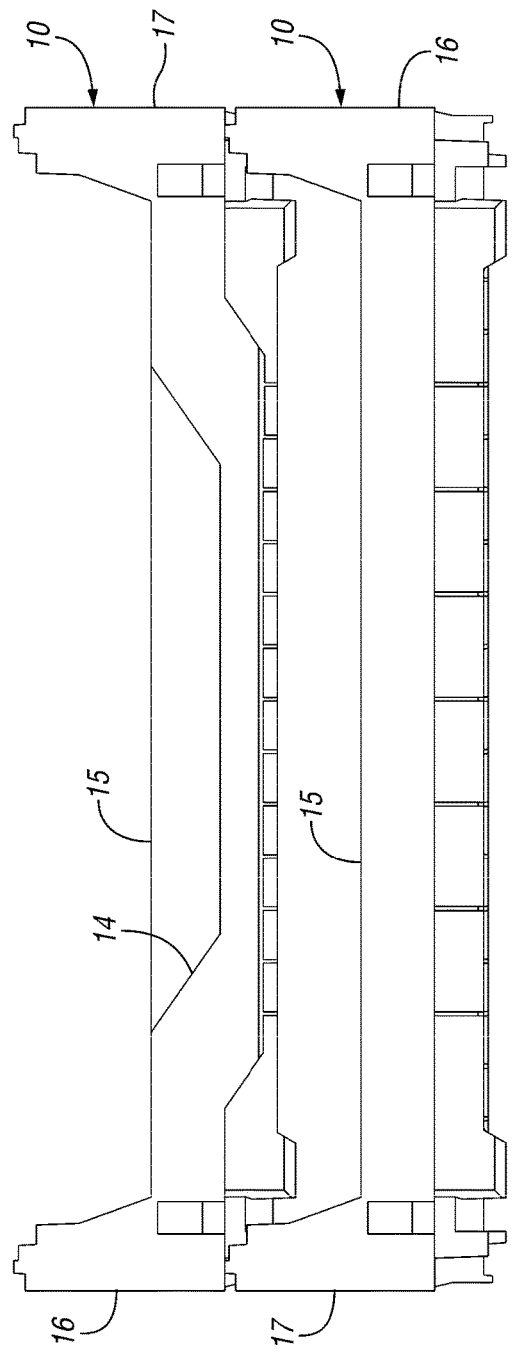
FIG. 11 is a rear view of the trays of FIG. 10.

FIG. 10 is a side view of the two trays 10 stacked in the low position, i.e. with the front wall 14 of the upper tray 10 aligned over the rear wall 15 of the lower tray 10, the side wall 16 of the upper tray 10 is aligned over the side wall 17 of the lower tray 10, and the side wall 17 of the upper tray 10 is aligned over the side wall 16 of the lower tray. The widely-spaced feet 40 of the side wall 16 of the upper tray 10 are received in the widely-spaced, low feet receiving pockets 38 of the side wall 17 of the lower tray 10. The closely-spaced feet 41 of the side wall 17 of the upper tray 10 are received in the closely-spaced, low feet receiving pockets 39 of the side wall 16 of the lower tray 10. In the low stacked position, the base 12 of the upper tray 10 is closer to the base 12 of the lower tray 10 for more efficient stacking of goods that are not as high within the trays 10. FIG. 11 is a front view of the two trays 10 in the low stacked position. FIG. 12 is a perspective view of the trays 10 in the low stacked position.

FIG. 13 is a side view of the two trays 10 stacked in the high position, i.e. with the front wall 14 of the upper tray 10 aligned over the front wall 14 of the lower tray 10, such that the feet 40 of the upper tray 10 are received in the high feet receiving pockets 35, 37 of the lower tray 10. To achieve the stacked high position, the trays 10 are aligned with one another such that the front, rear and side walls 14, 15, 16, 17 of the lower tray 10 are aligned with the front, rear and side walls 14, 15, 16, 17 of the upper tray 10, respectively. In this position, the feet 40 on the side wall 16 are received within the pockets 37 on the side wall 16 of the lower tray. Similarly, the closely spaced apart feet 41 (not shown) on the side wall 17 of the upper tray 10 are received within the closely spaced pockets 35 (not shown) of the side wall 17 of the lower tray 10. FIG. 14 is a front view of the two trays 10 in the high stacked position. FIG. 15 is a perspective view of the trays 10 in the high stacked position.

It should be noted that the arrangement of the feet 40, 41 could be changed in various ways. For example, the high stack position could be provided when the trays 10 are aligned with the front wall 14 over the rear wall 15.

Additionally, the feet 40, 41 could differ from each other in arrangement in ways other than "closely-spaced" and "widely-spaced."

Figure 16:
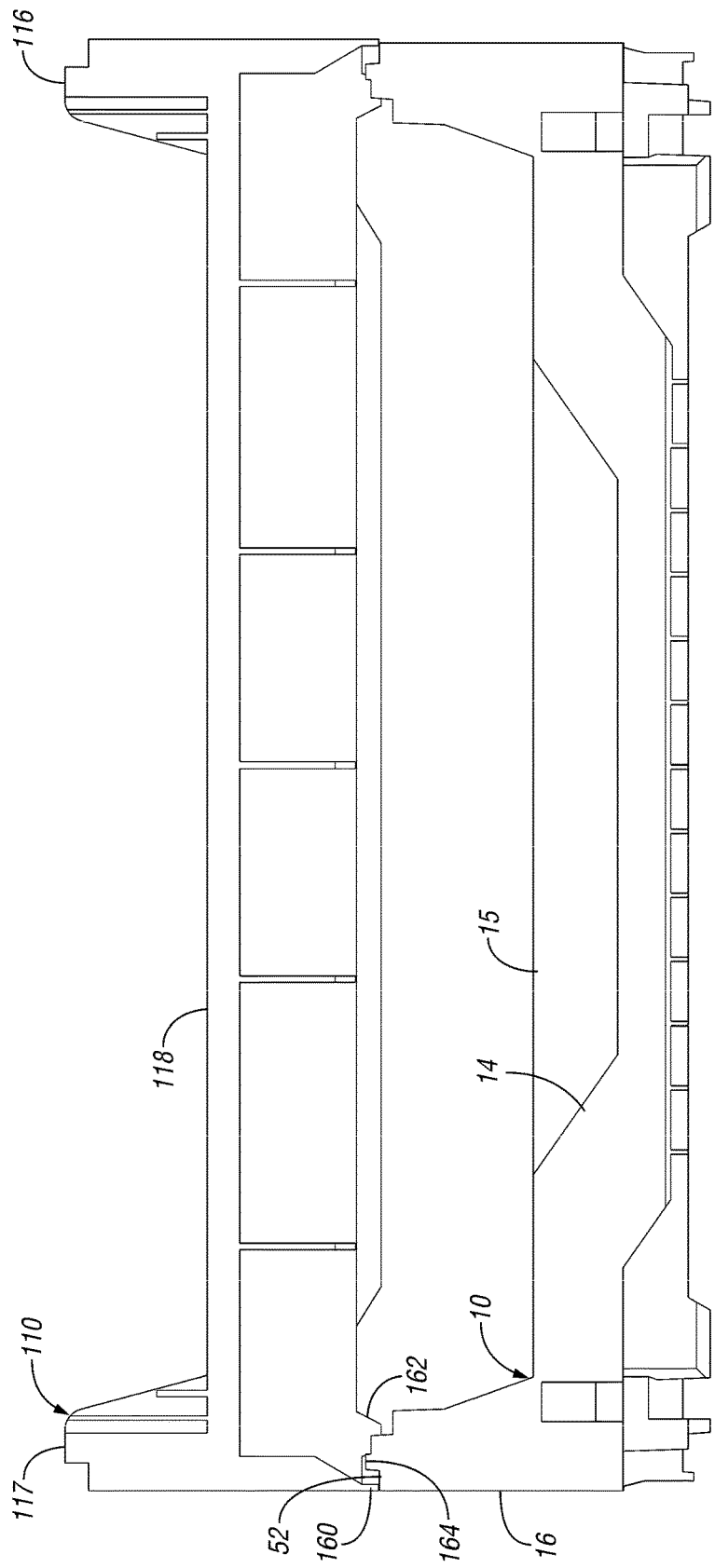
FIG. 16 is a front view of the tray of FIG. 1 with a prior art tray stacked thereon.

The tray 10, in addition to providing multiple stack heights and a cross-stack position, is also compatible with a prior art tray 110 as shown in FIGS. 16-25. In FIG. 16, the prior art tray 110, which only provides a single stack height, is shown stacked on the tray 10. The prior art tray 110 includes a rear wall 118 and side walls 116, 117. The side walls 117 include a downwardly directed outer rail 160, which is spaced outwardly of an inner support wall 162 by a channel 164. When the prior art tray 110 is stacked on the tray 10, the support wall 162 rests on the upper surface 32 of the side walls 16, 17. The outer rail 160 is received in the channel 52 of the side walls 16, 17 and the rail 34, including the end portions 50 thereof, are received in the recess 164 in the prior art tray 110. FIGS. 17 and 18 are side views of the tray 10 and prior art tray 110 of FIG. 13. FIG. 19 is a perspective view of the tray 10 and prior art tray 110.

In FIG. 20, the trays 10, 110 are partially broken away. The prior art tray 110 includes an inner rail 166 extending from the support wall 162 to a similar support wall 162 at the other end of the tray 110.

FIG. 21 is a section view through the trays 10, 110 of FIG. 20. FIG. 22 is an enlarged view of a portion of FIG. 21. As shown, the chamfer 36 in the side wall 16 provides a recess that accommodates the support wall 162 in the prior art tray 110. The side rail 34 is received within the channel 164 of the prior art tray 110. The outer rail 160 is received in the channel 52 in the side wall 16 of the lower tray 10. Thus, the prior art tray 110 can be stacked stably on the tray 10.

Figure 24:
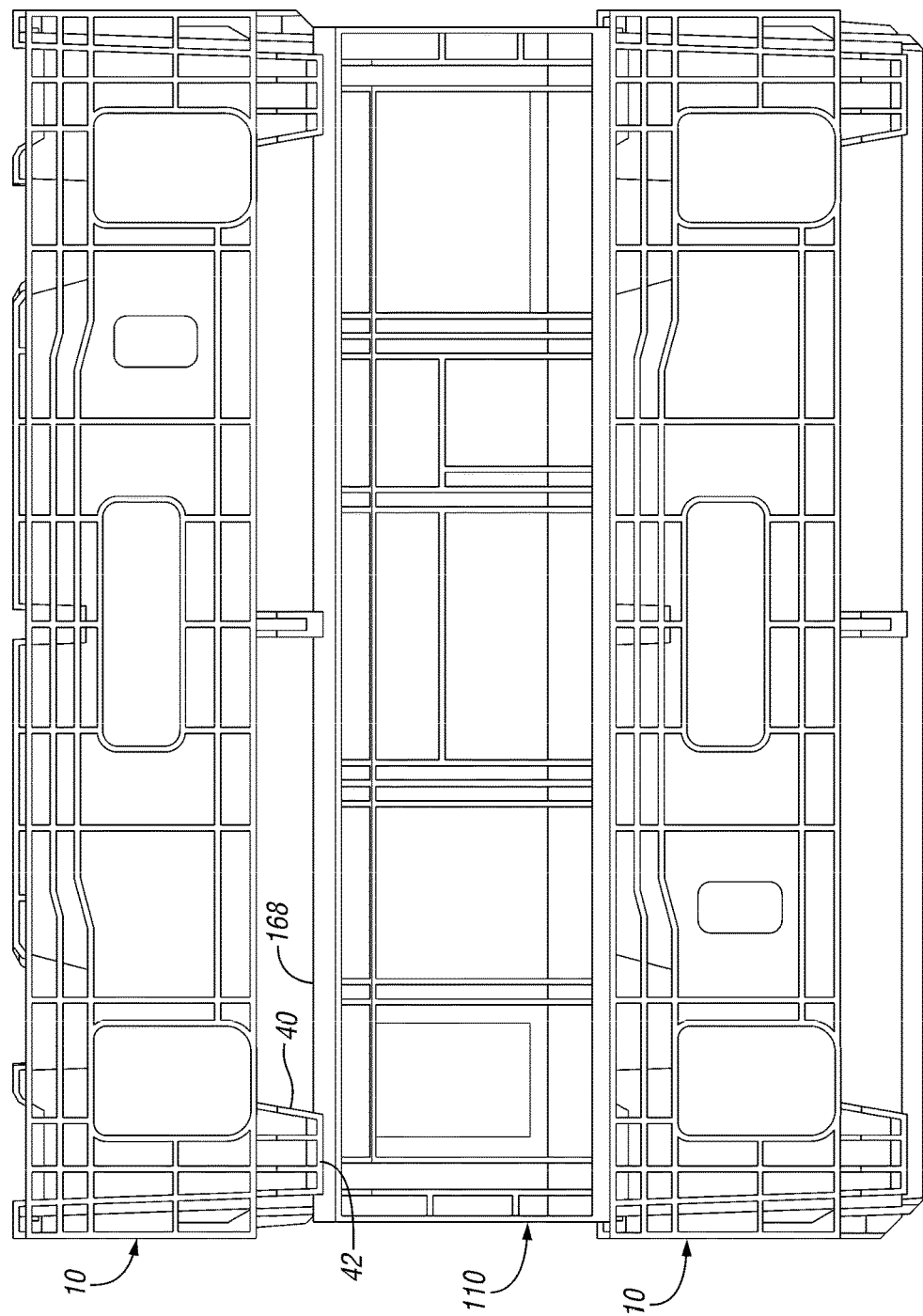
FIG. 24 is a side view of the trays of FIG. 23.
Figure 25:
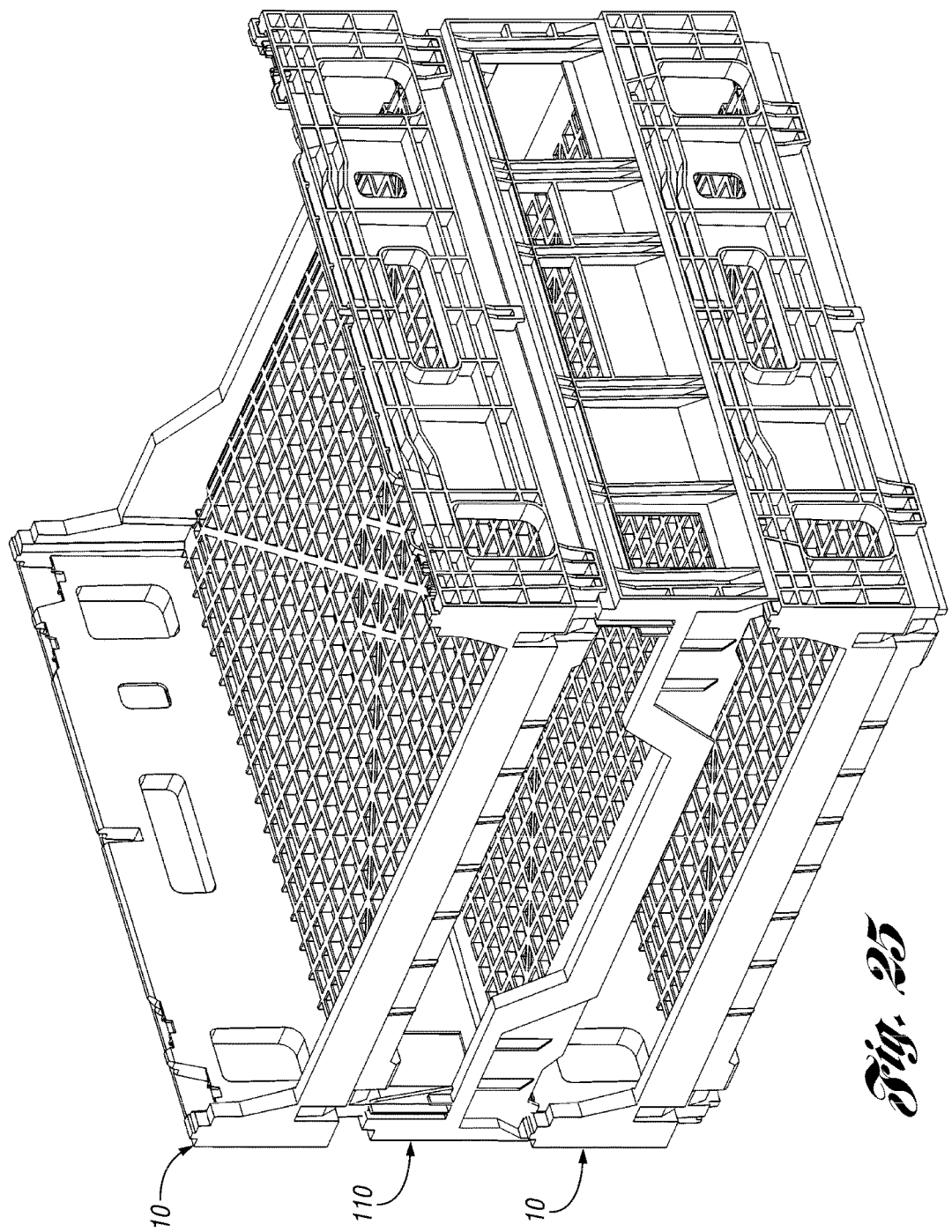
FIG. 25 is a perspective view of the trays of FIG. 23.

As shown in FIGS. 23-25, the tray 10 can also be stacked stably on the prior art tray 110. The prior art tray 110 includes an upper support surface 168 on the side walls 116, 117. A channel 170 is formed at an upper outer edge of the support surface 168 on the side walls 116, 117. The feet 40, 41 of the upper tray 10 are supported on the support surface 168 of the prior art tray 110, with the ribs 42, 43 received in the channel 170 of the side walls 116, 117.

Figure 26:
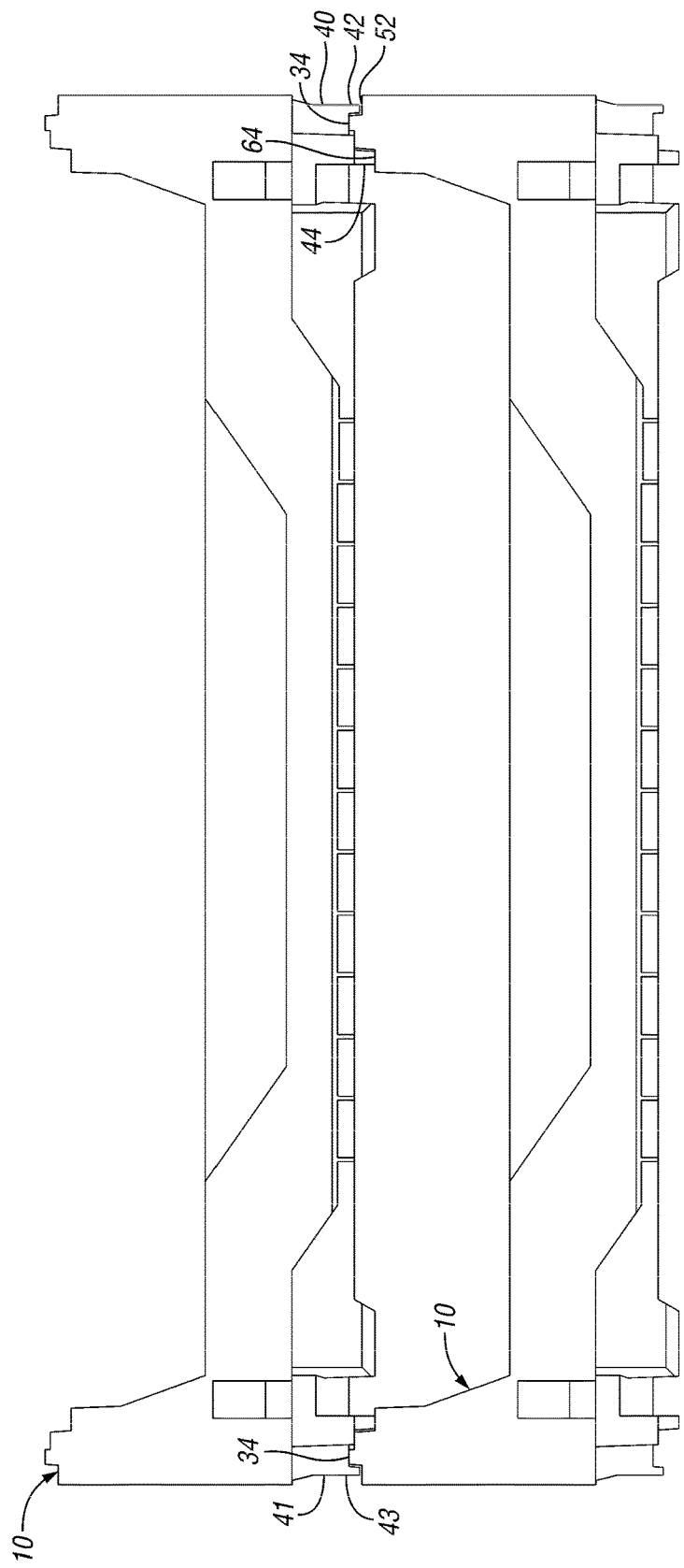
FIG. 26 is a front view of two stacked trays of FIG. 1.
Figure 27:
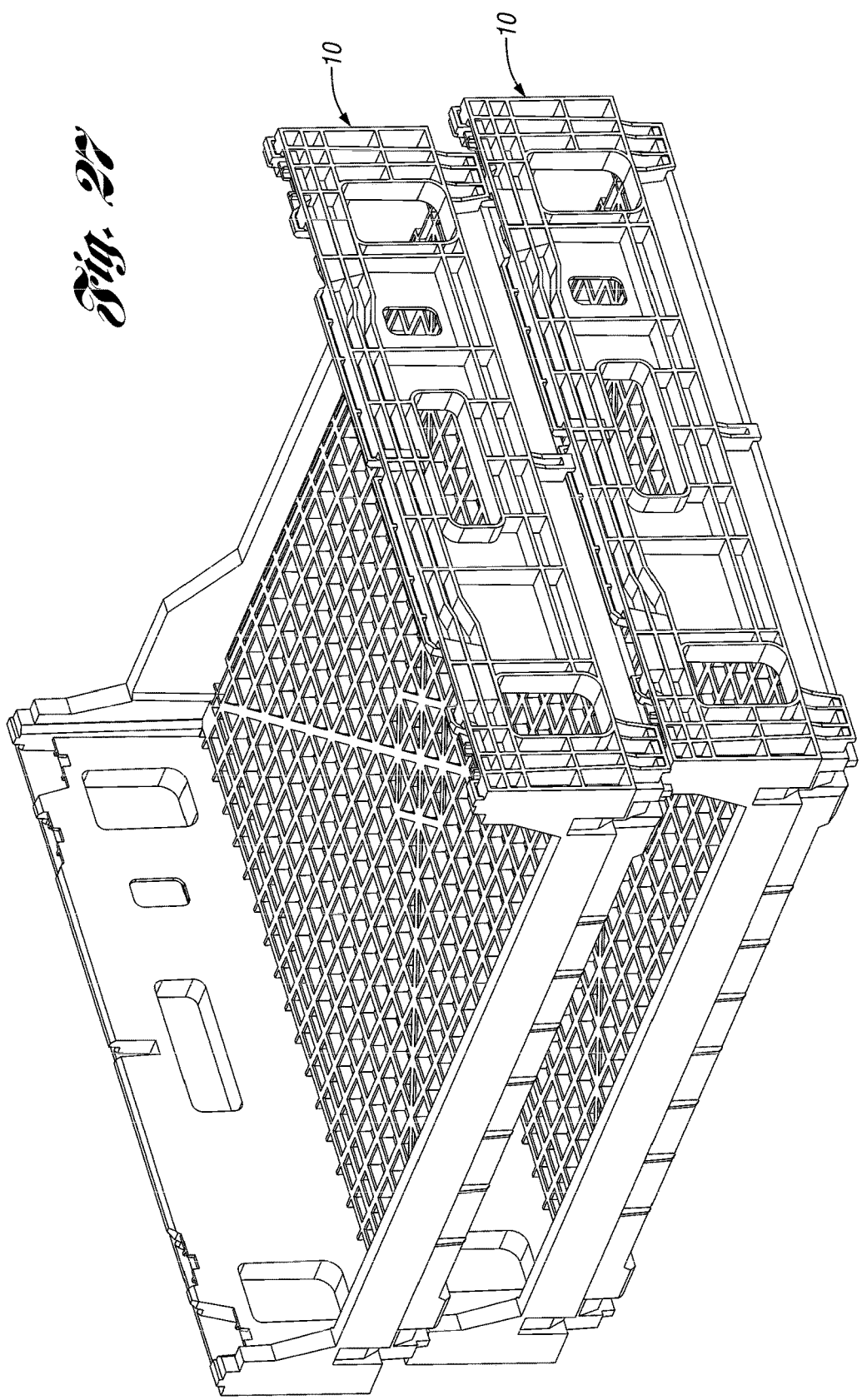
FIG. 27 is a perspective view of the trays of FIG. 26 slid to a first position relative to one another.

FIG. 26 is a front view of the tray 10, with the identical tray 10 stacked thereon. The feet 40, 41 are supported on the side rails 34 with the ribs 42, 43 abutting outer surfaces of the side rails 34 and received in the channels 52. The lower wall portion 44 (or drag rail) is supported on the notch 64.

Figure 33:
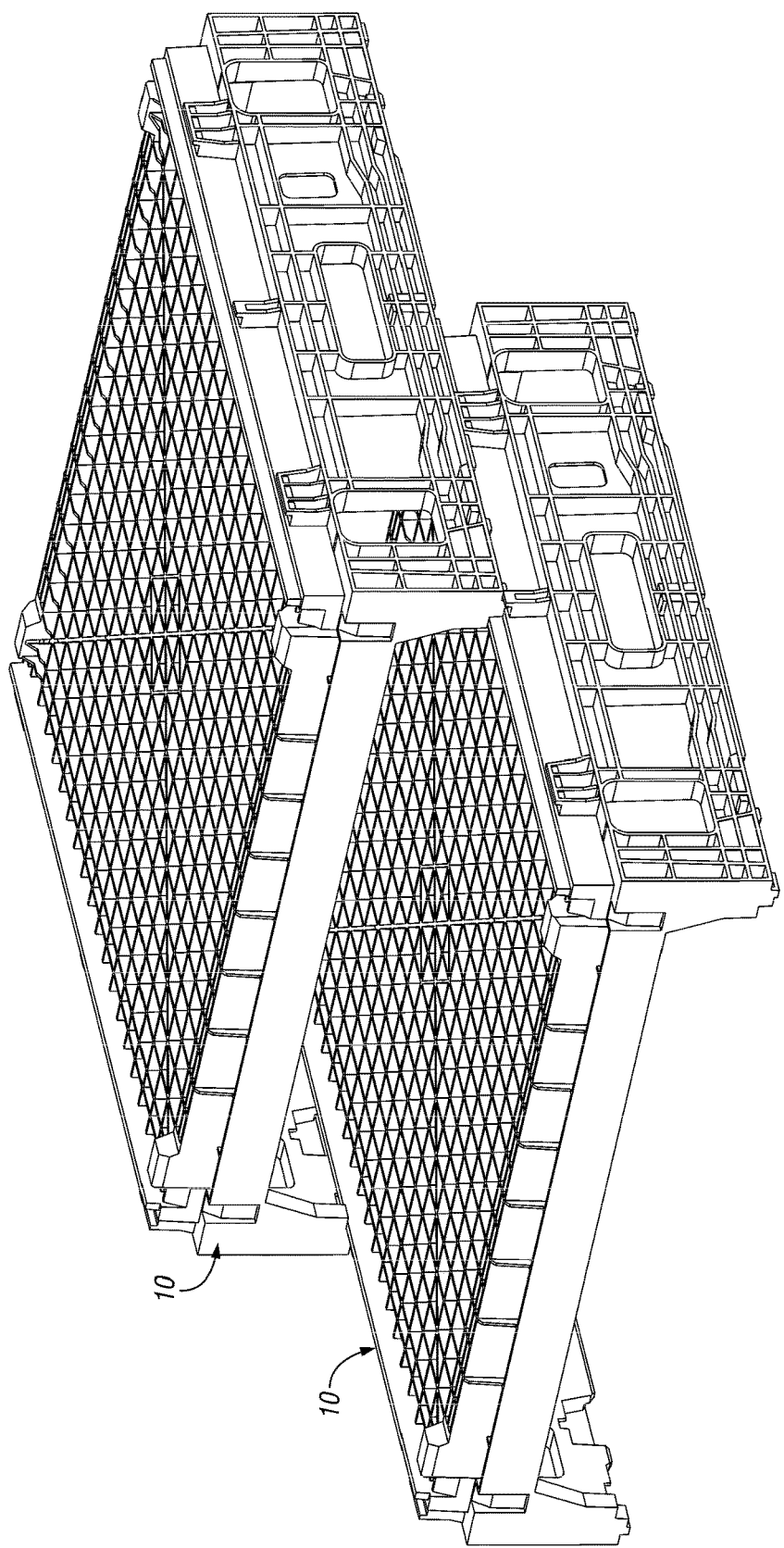
FIG. 33 is a bottom perspective view of the trays of FIG. 30.

FIGS. 27-30 are perspective views showing the top tray 10 sliding relative to the bottom tray 10. FIG. 31 is a side view of the trays of FIG. 30. FIG. 32 is a front perspective view of the trays of FIG. 30. FIG. 33 is a bottom perspective view of the trays 10 of FIG. 30.

Figure 36:
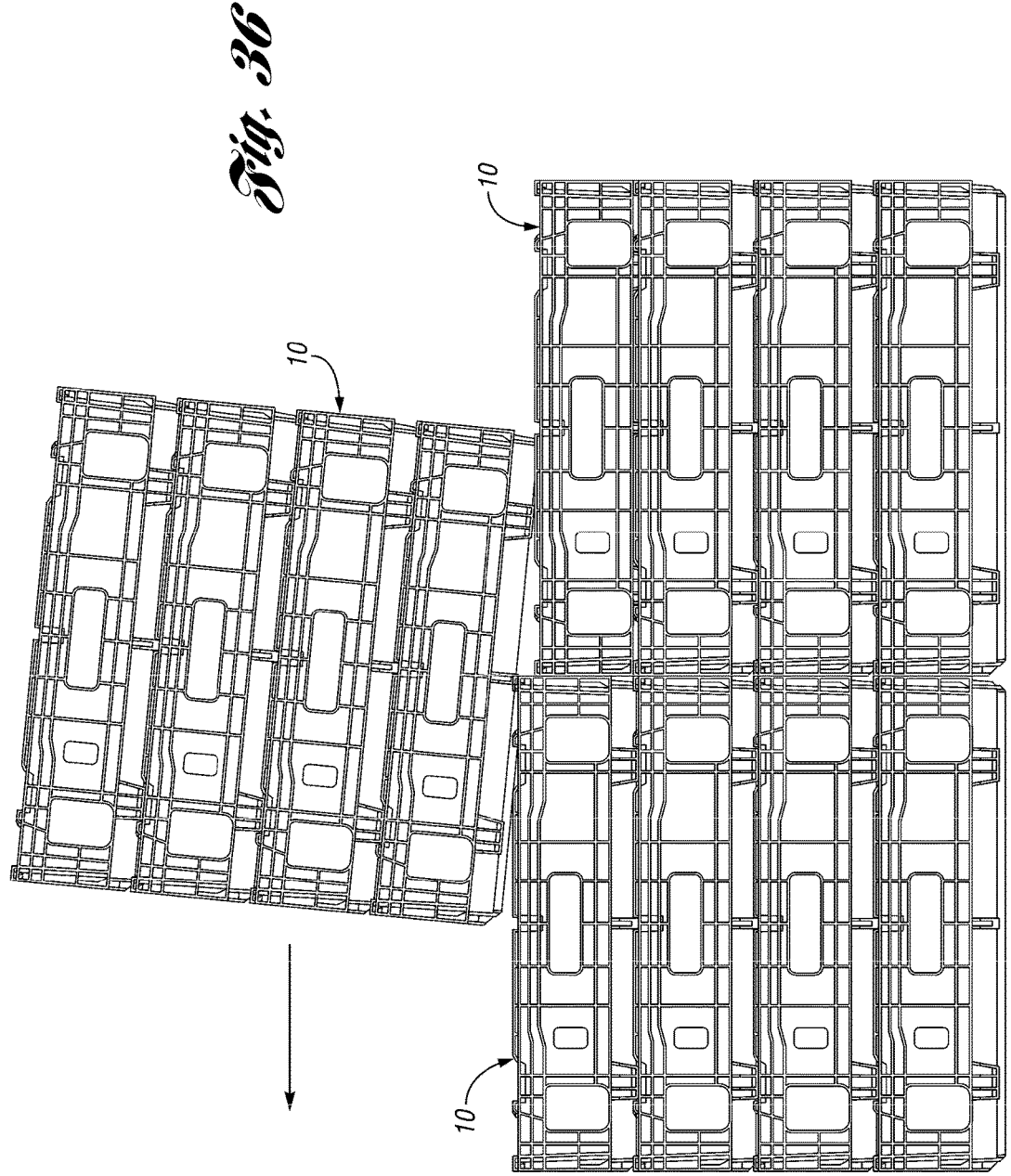
FIG. 36 shows the first stack of trays slid across two uneven stacks of trays.

FIGS. 34-36 are side views of a first stack of trays 10 sliding across two stacks of trays 10. In FIG. 34, the two lower stacks of trays 10 are even. In FIGS. 35 and 36, the lower stacks of trays 10 are uneven (some are in low stacking height position and some are in high stacking height position), but the upper stack of trays 10 can be stably slid across the two lower, uneven stacks of trays 10.

Figure 37:
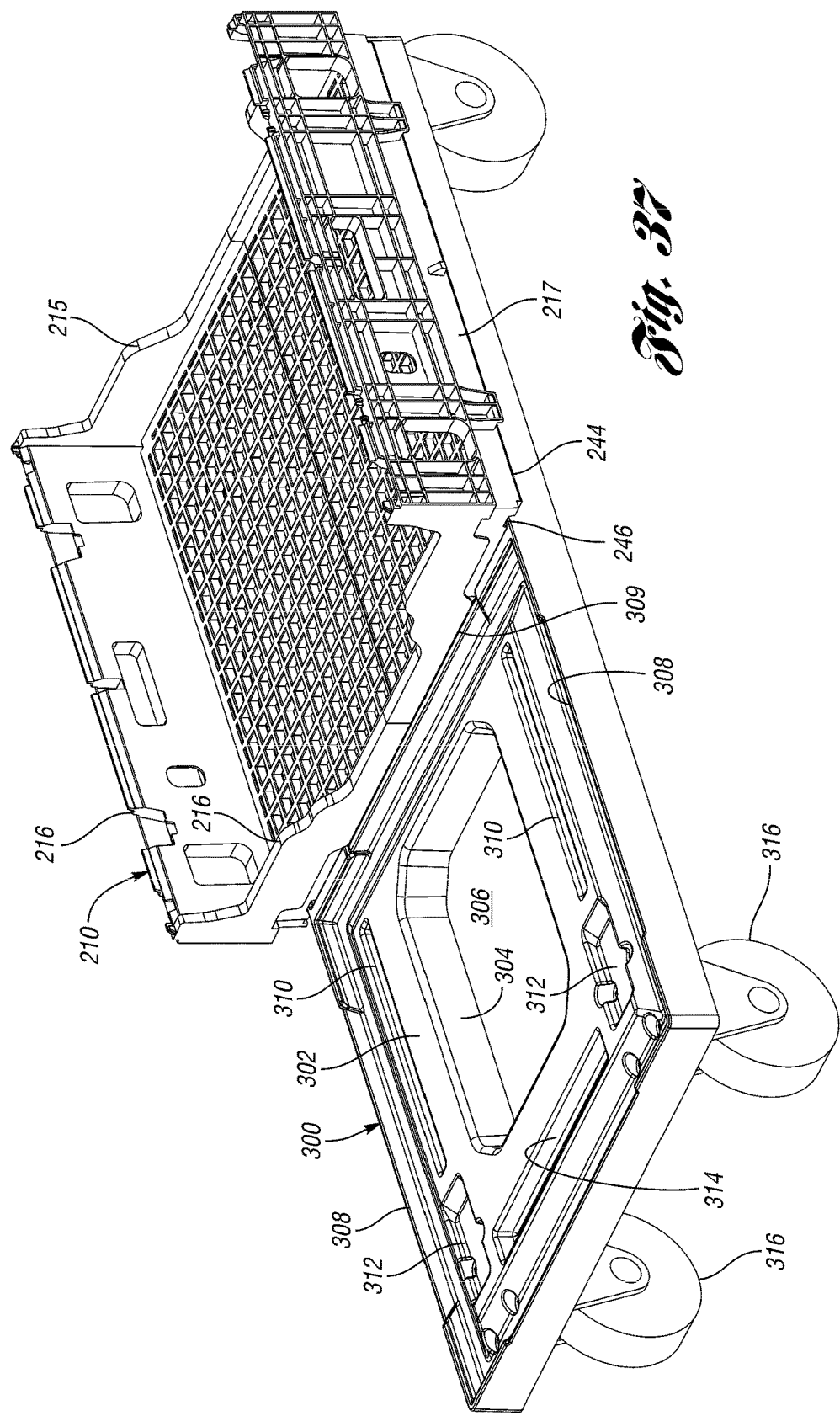
FIG. 37 is a perspective view of a dolly according to a first embodiment with a tray according to a second embodiment thereon.

FIG. 37 shows a dolly 300 in use with a tray 210 similar to the tray 10 of FIGS. 1-36. The dolly 300 could also be used with the tray 10 of FIGS. 1-36 similarly. The dolly 300 accommodates two such trays 210 (or two trays 10), although only one is shown in FIG. 37. Each half of the deck of the dolly 300 includes a central support surface 302 having a large central opening 306 and a large vertical rib 304 extending downwardly around the periphery of the opening 306. A lip 308 projects upwardly from the periphery of the deck of the dolly 300. A vertical rib 309 extends across the center of the dolly 300 between the halves of the dolly 300.

The central support surface 302 includes a pair of side channels 310 formed therein for reinforcement and load distribution. The central support surface 302 further includes a pair of caster recesses 312 aligned with casters 316 on the bottom of the dolly 300. When the dolly 300 is empty, the casters 316 of a similar dolly 300 can be received in the caster recesses 312 to facilitate stacking of empty dollies 300. The central support surface 302 further includes an end channel 314 adjacent an end of the dolly 300.

The tray 210 is similar to the tray 10 described above and includes side walls 216, 217. Front and rear walls 215, 216 are slightly different than those of the previous tray 10; however, both trays 10, 210 would fit on the dolly 300 the same way. In particular, the width of the dolly 300 is less than the width of the tray 210. Therefore, the lip 308 is received in the channel 246 inward of the lower wall portion 244 of the side walls 216, 217. The lower wall portions 244 thus project outwardly of the footprint of the dolly 300.

Figure 38:
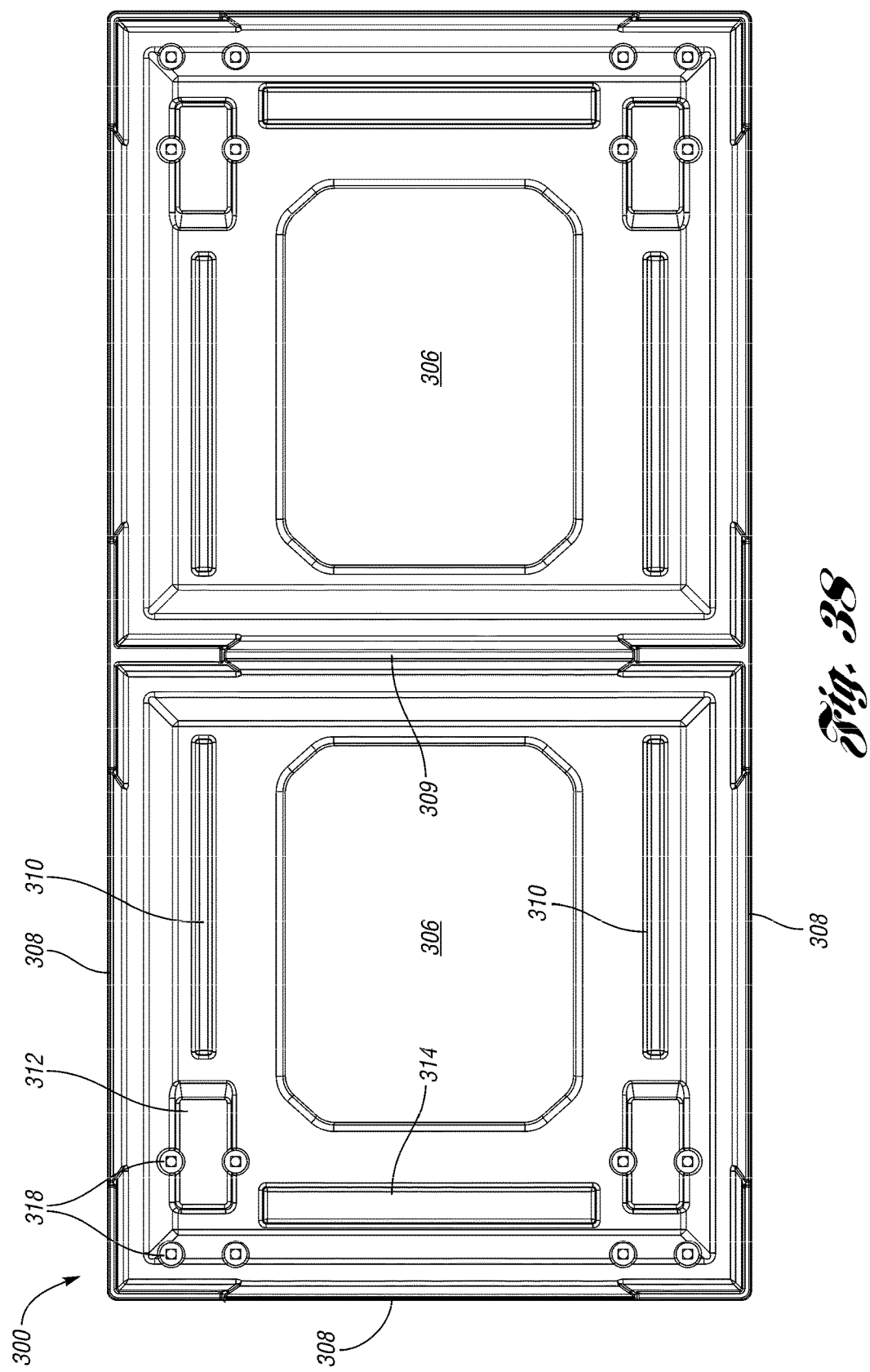
FIG. 38 is a top view of the dolly of FIG. 37.

FIG. 38 is a top view of the dolly 300 without the tray. Fastener openings 318 are formed near the caster recess 312. The fastener openings 318 accommodate fasteners for securing the plate of a caster 316 to the bottom of the dolly 300.

Figure 39:
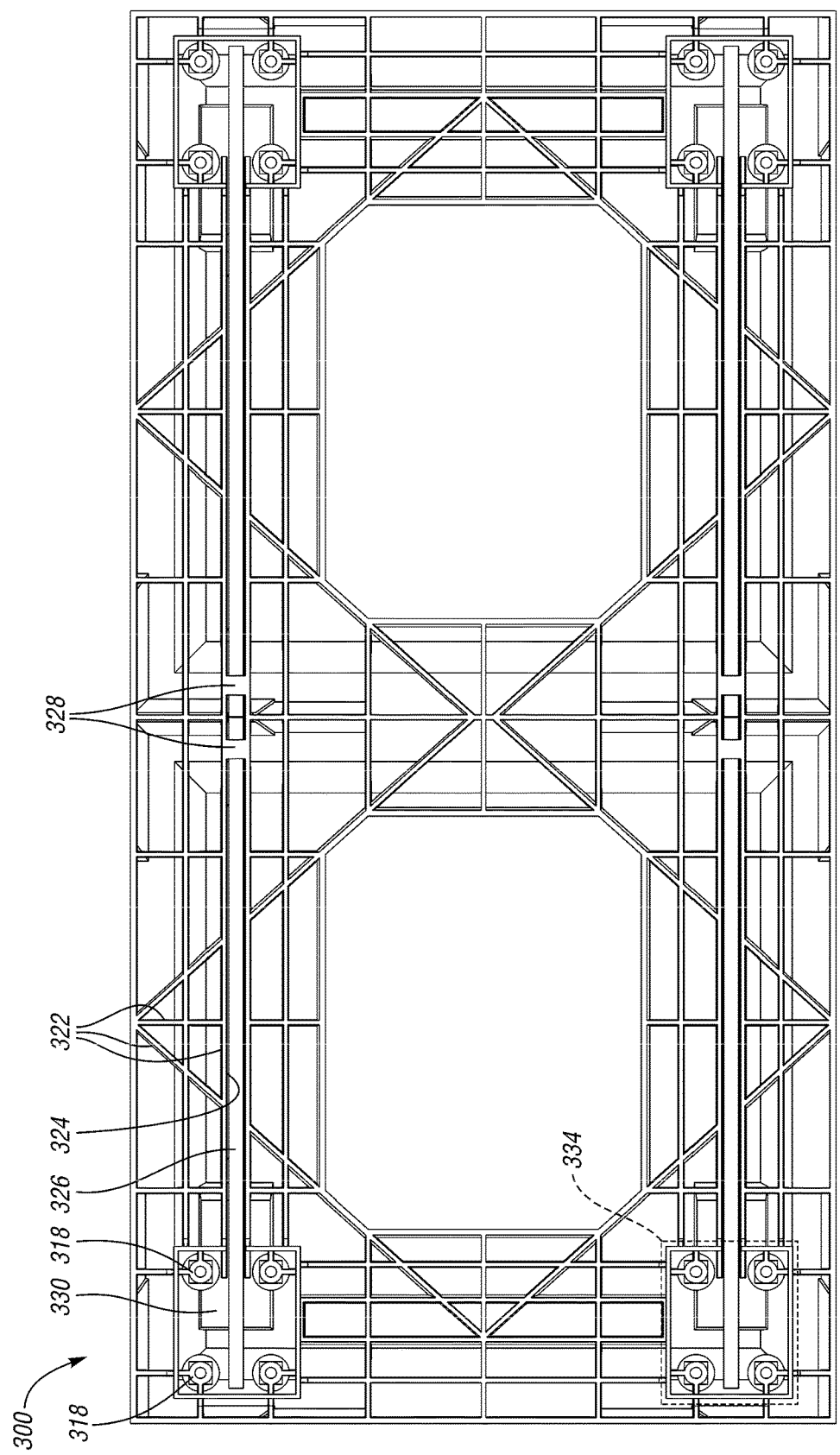
FIG. 39 is a bottom view of the dolly of FIG. 37.

FIG. 39 is a bottom view of the dolly 300. A plurality of ribs 322 are formed on the underside of the dolly 300, including a pair of ribs 322 that define a channel 324 for receiving a reinforcement rod 326. The reinforcement rod 326 could be steel, aluminum, metal, fiber glass, composite or other stiff material. Tabs 328 are formed below the channel 324 to retain the reinforcement rod 326 in the middle of the dolly 300. At the ends of the dolly 300, the reinforcement rods 326 extend into the caster areas. In the example shown, the reinforcement rods 326 extend adjacent the fastener receiving openings 318, such that the reinforcement rods 326 would be secured to the deck of the dolly 300 by the caster plates 334 (one shown in phantom in FIG. 39) of the casters 316 (FIG. 37). A bottom wall 330, which is the bottom wall of the caster recess 312 (FIG. 37), also contacts the reinforcement rod 326 on top of the reinforcement rod 326. Thus, the reinforcement rod 326 is locked between the caster plate 334 and the bottom wall 330 of the caster recess 312. The caster recess 312 (FIG. 37) also distributes the load on the reinforcement rod 326 outwardly across a larger area on the dolly 300.

Figure 40:
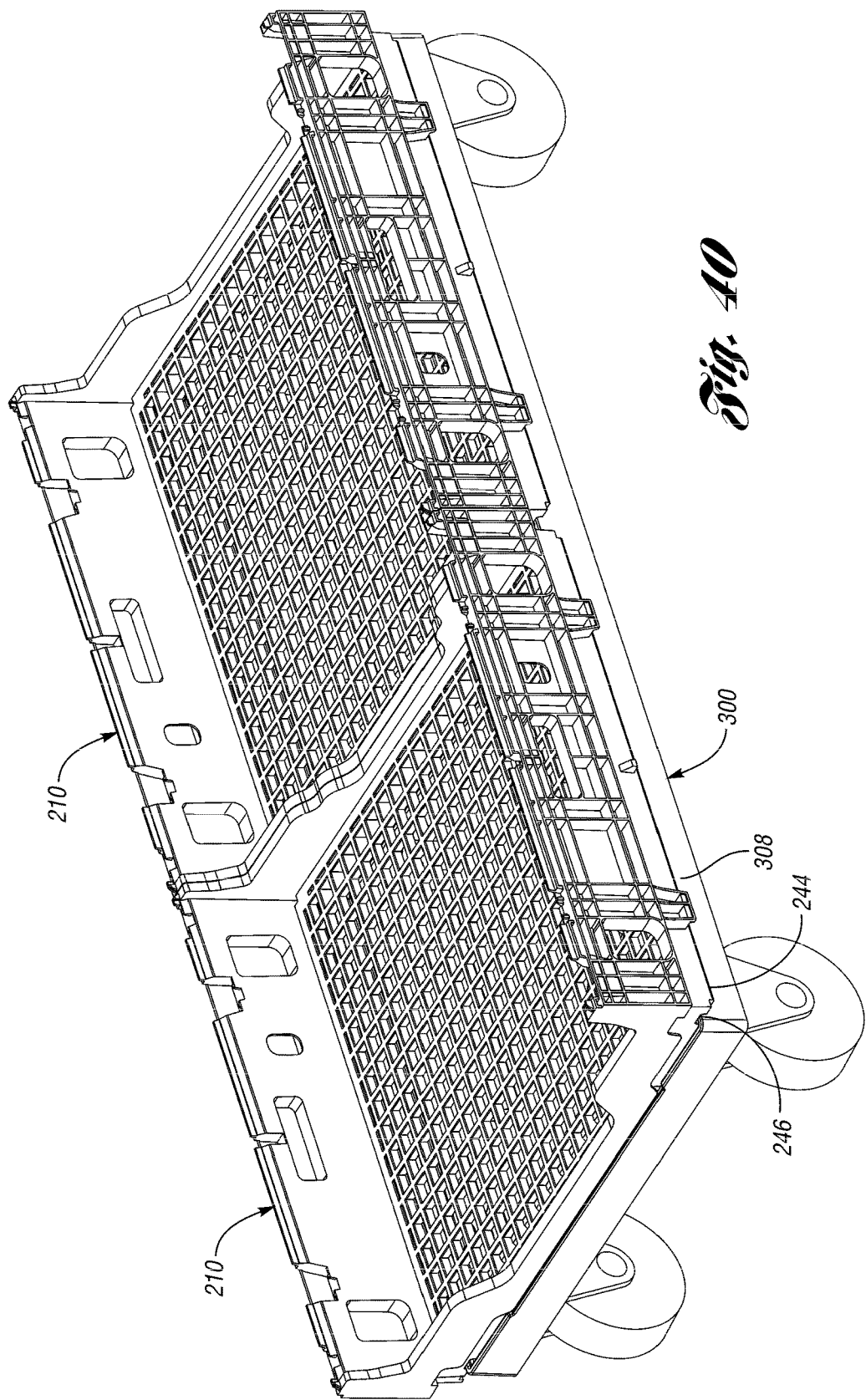
FIG. 40 shows the dolly of FIG. 37 with two trays stacked thereon.

FIG. 40 illustrates the dolly 300 with two trays 210 placed thereon. Again, the lips 308 are received in the channels 246 of the trays 210 such that the lower wall portions 244 are outside the footprint of the dolly 300.

Figure 41:
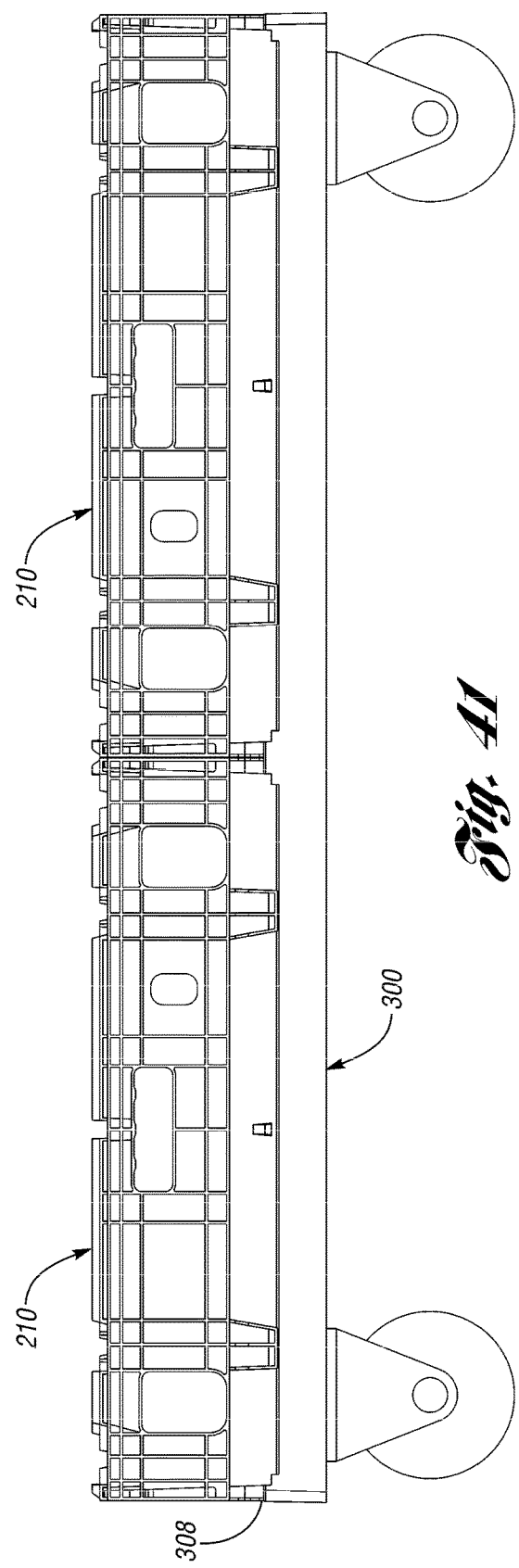
FIG. 41 is a side view of the dolly and trays of FIG. 40.

FIG. 41 is a side view of the dolly 300 and trays 210 of FIG. 25. As shown in this example, the trays 210 do not extend outside the footprint of the dolly 300 at the ends of the dolly 300; however, the trays 210 could alternatively extend past the ends as well.

Figure 42:
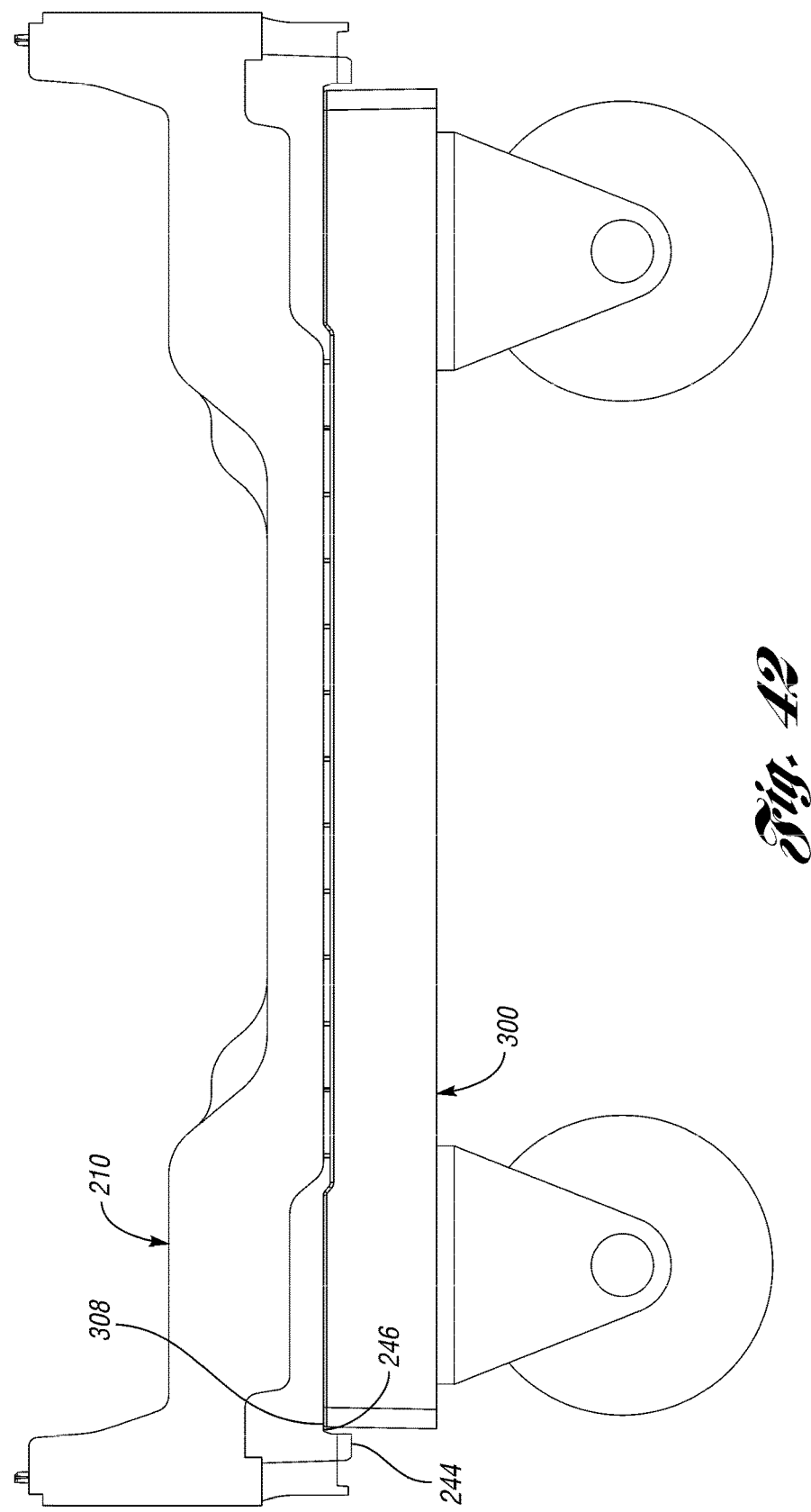
FIG. 42 is an end view of the dolly and trays of FIG. 40.

FIG. 42 is an end view of the dolly 300 and the tray 210. The lower wall portion 244 of the tray 210 extends down past the lip 308 of the dolly 300 and the lip 308 is received in the channel 246 of the tray 210.

Figure 43:
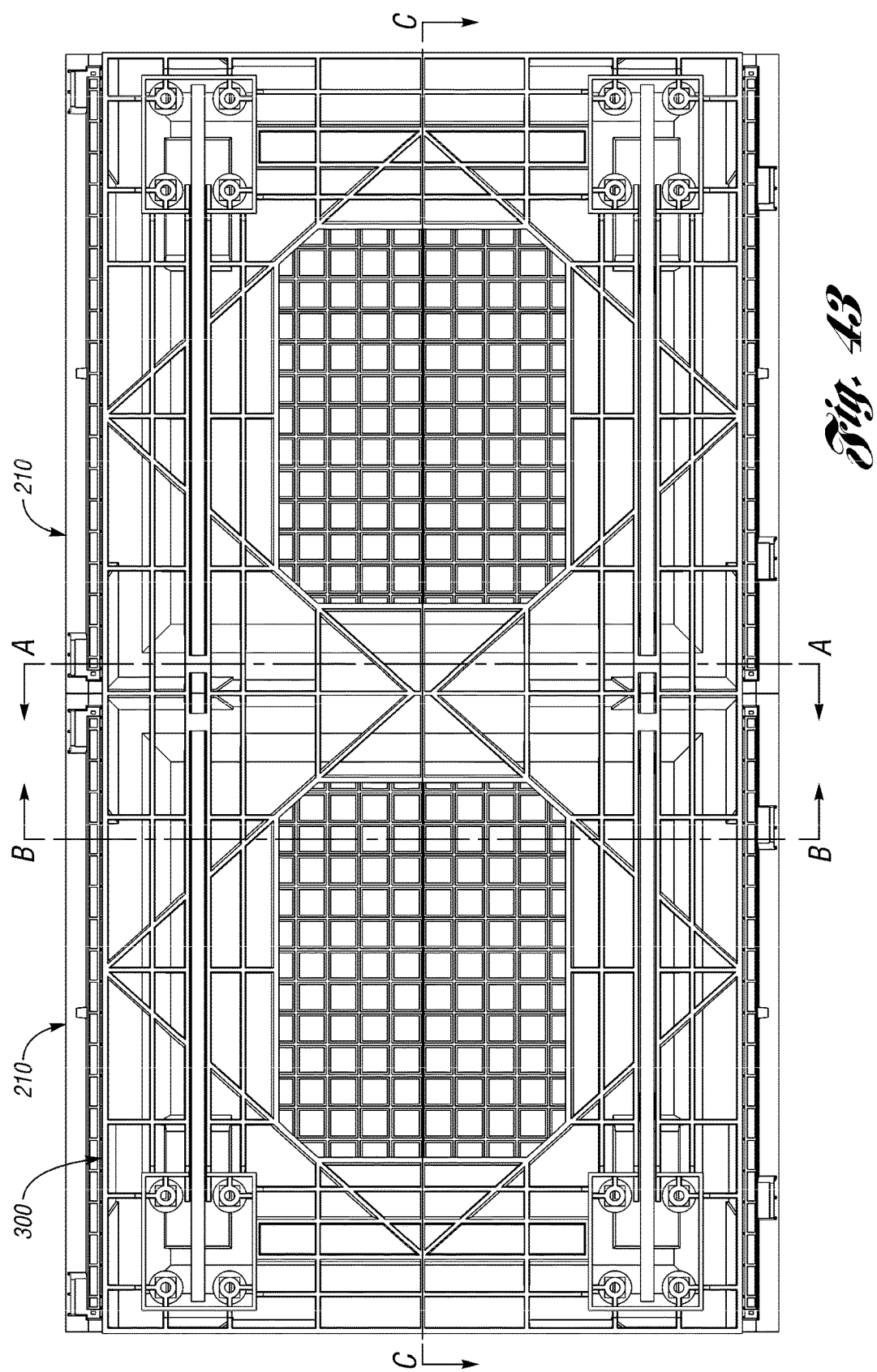
FIG. 43 is a bottom view of the dolly of FIG. 37.

FIG. 43 is a bottom view of the dolly 300 and trays 210 of FIG. 25.

Figure 28:
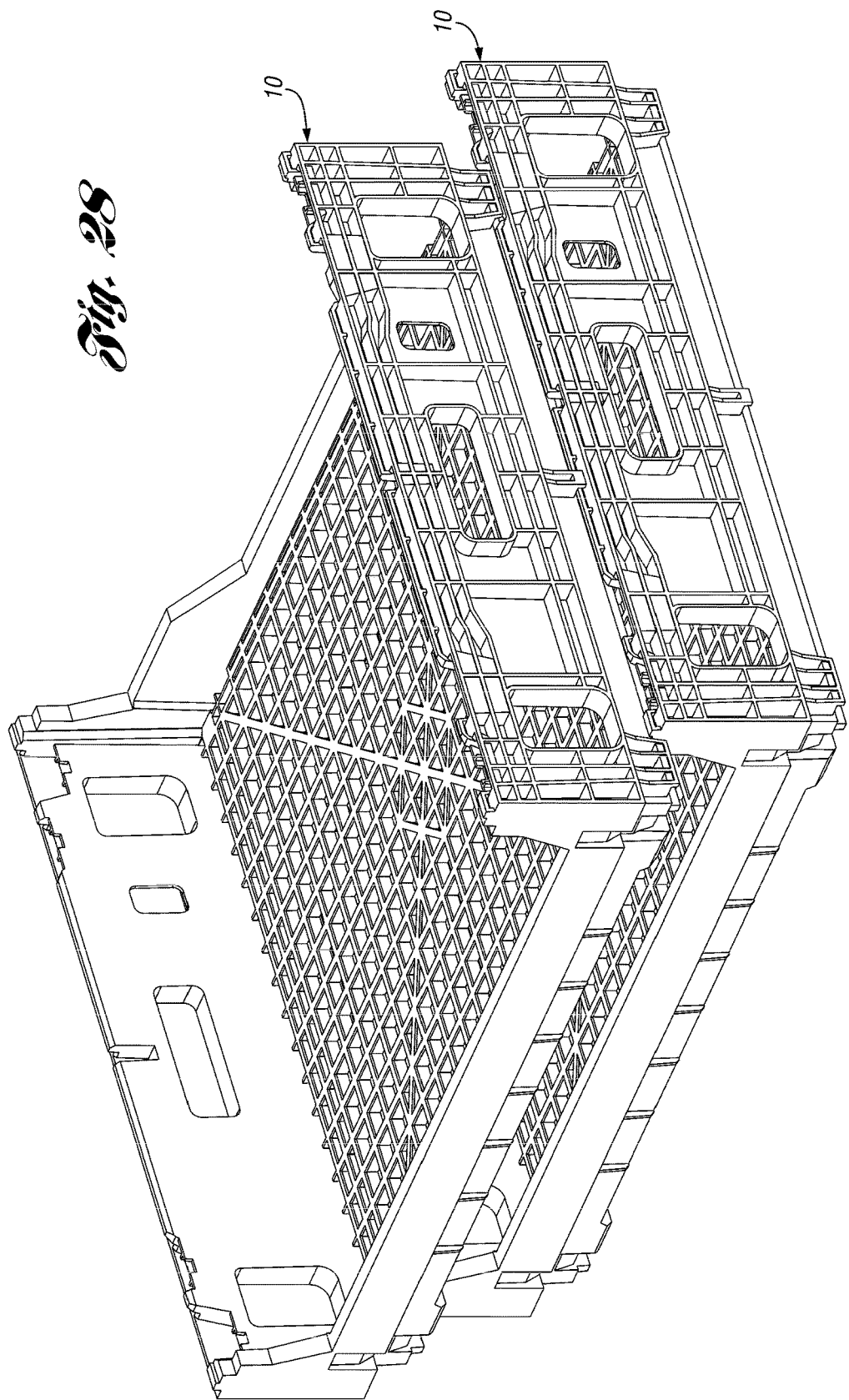
FIG. 28 is a perspective view of the trays of FIG. 26 slid to a second position relative to one another.
Figure 29:
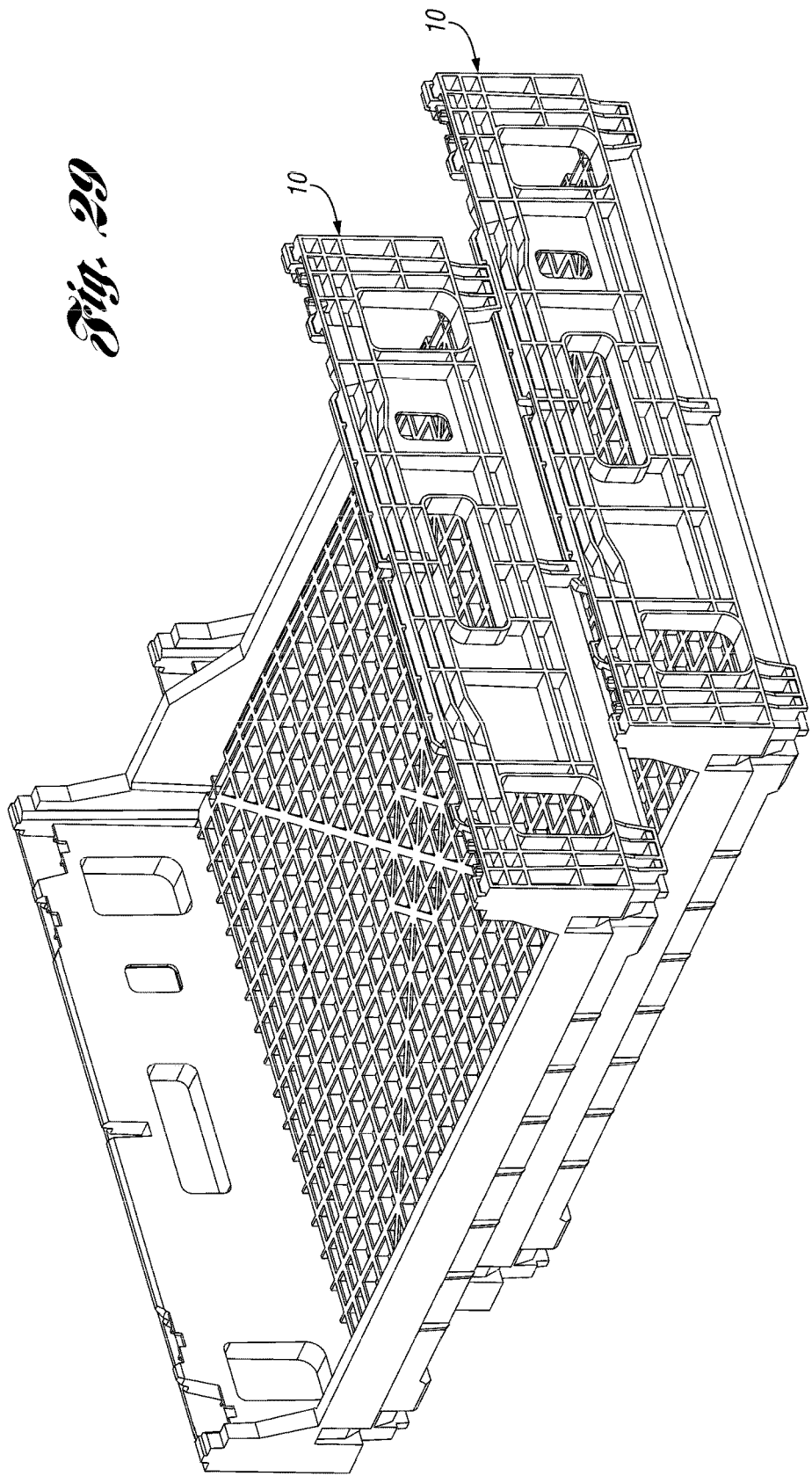
FIG. 29 is a perspective view of the trays of FIG. 26 slid to a third position relative to one another.
Figure 30:
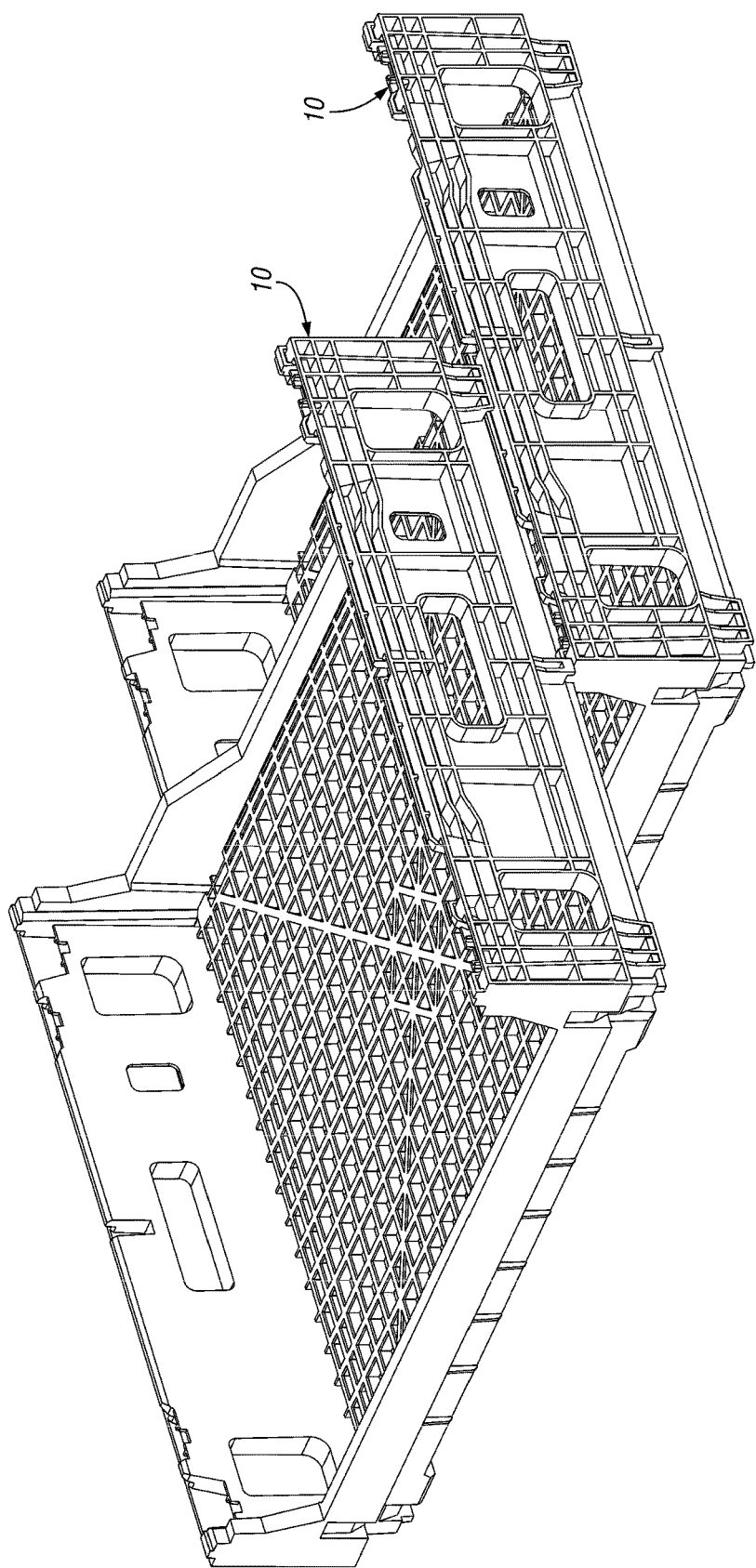
FIG. 30 is a perspective view of the trays of FIG. 26 slid to a fourth position relative to one another.
Figure 44:
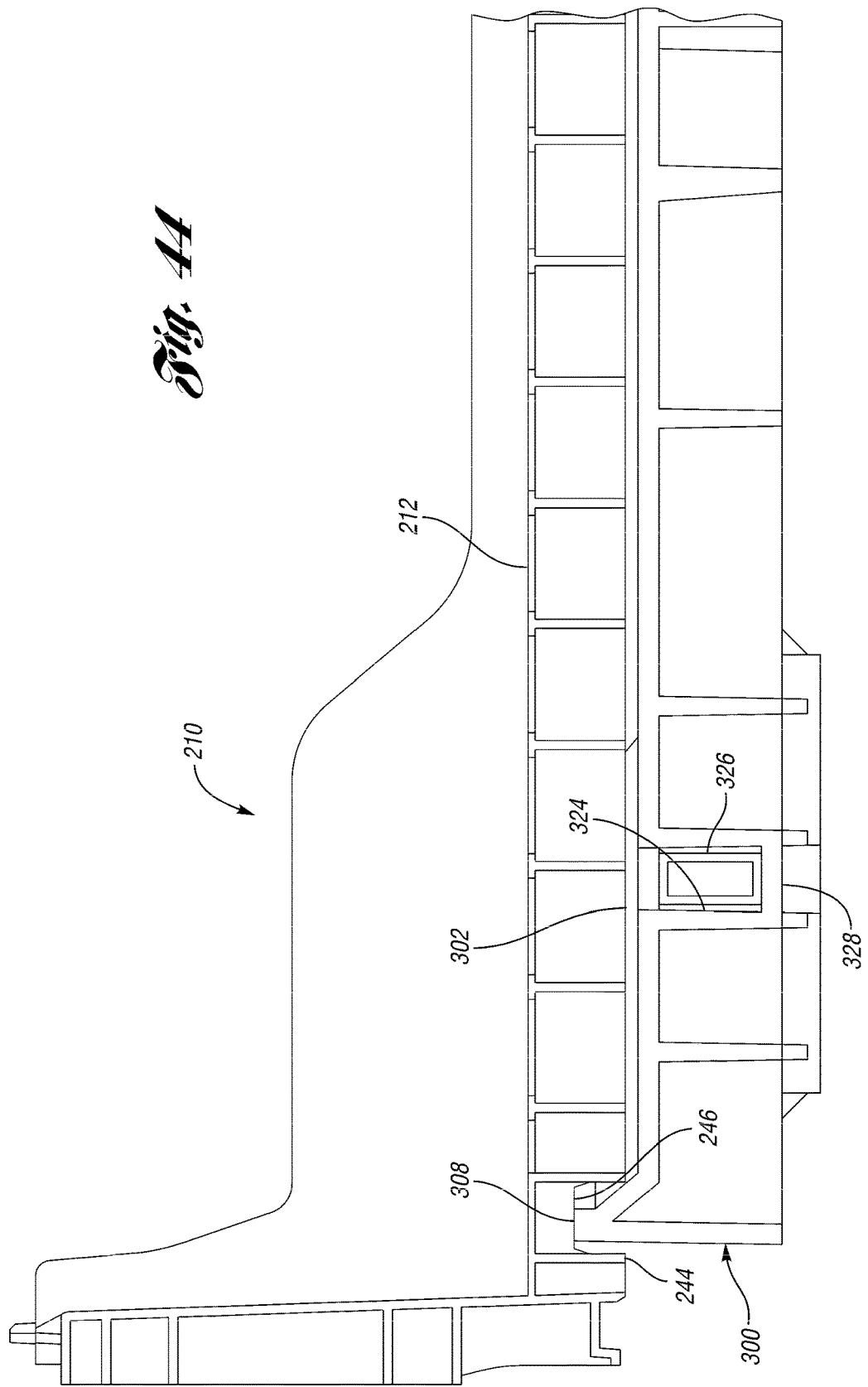
FIG. 44 is an enlarged view of a portion of the section view A-A of FIG. 43.

FIG. 44 is a section view taken along line A-A of FIG. 28. The lip 308 is received in the channel 246 and the lower wall portion 244 is exterior of the dolly 300 and the lip 308. The reinforcement rod 326 is within the channel 324 and secured from the underside by one of the tabs 328. The base 212 of the tray 210 is supported on the central support surface 302.

Figure 45:
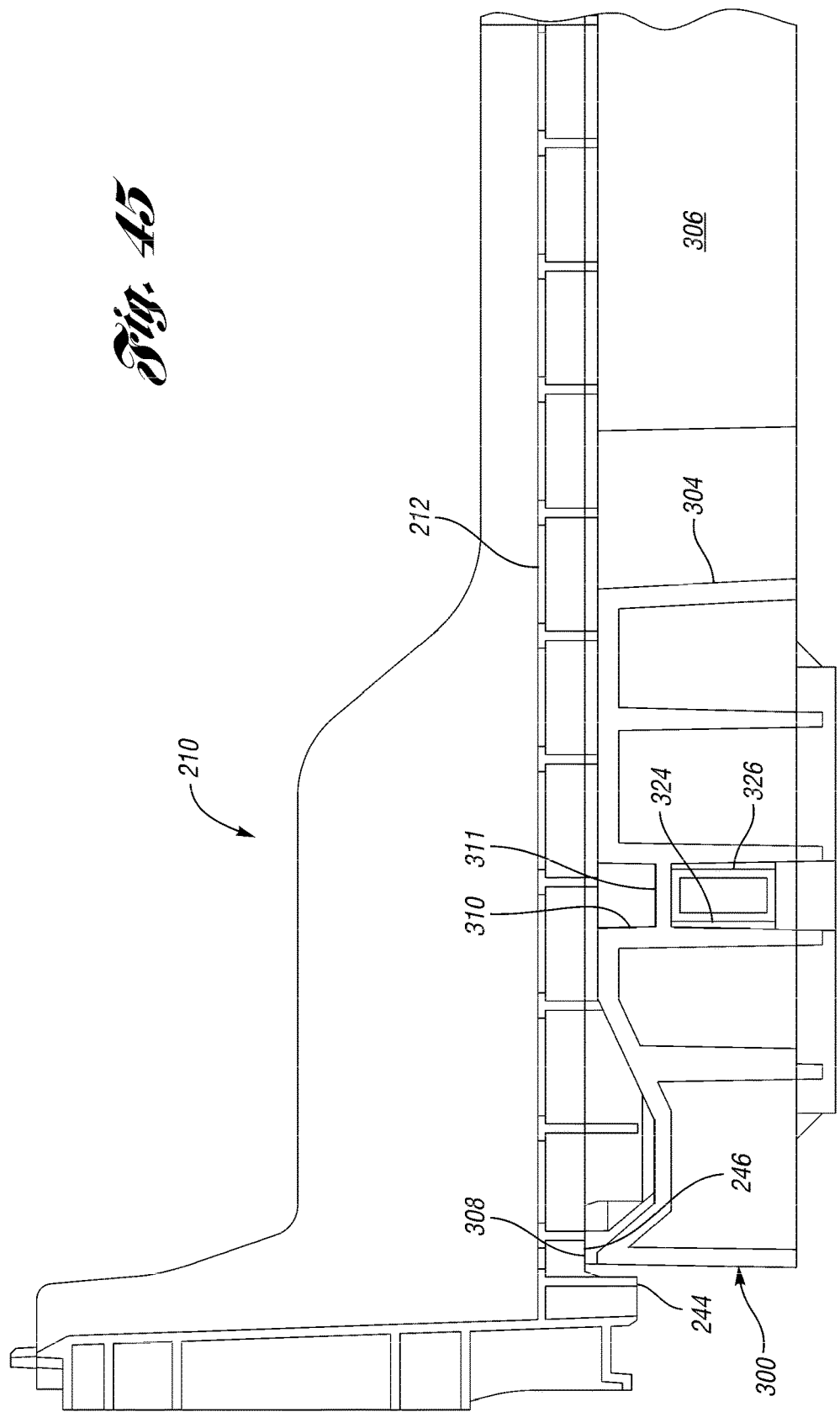
FIG. 45 is an enlarged view of a portion of the section view B-B of FIG. 43.

FIG. 45 is a section view taken along line B-B of FIG. 28. A lower wall 311 of the recess 310 contacts the upper surface of the reinforcement rod 326 to distribute the load on the dolly 300 to the reinforcement rod 326.

Figure 46:
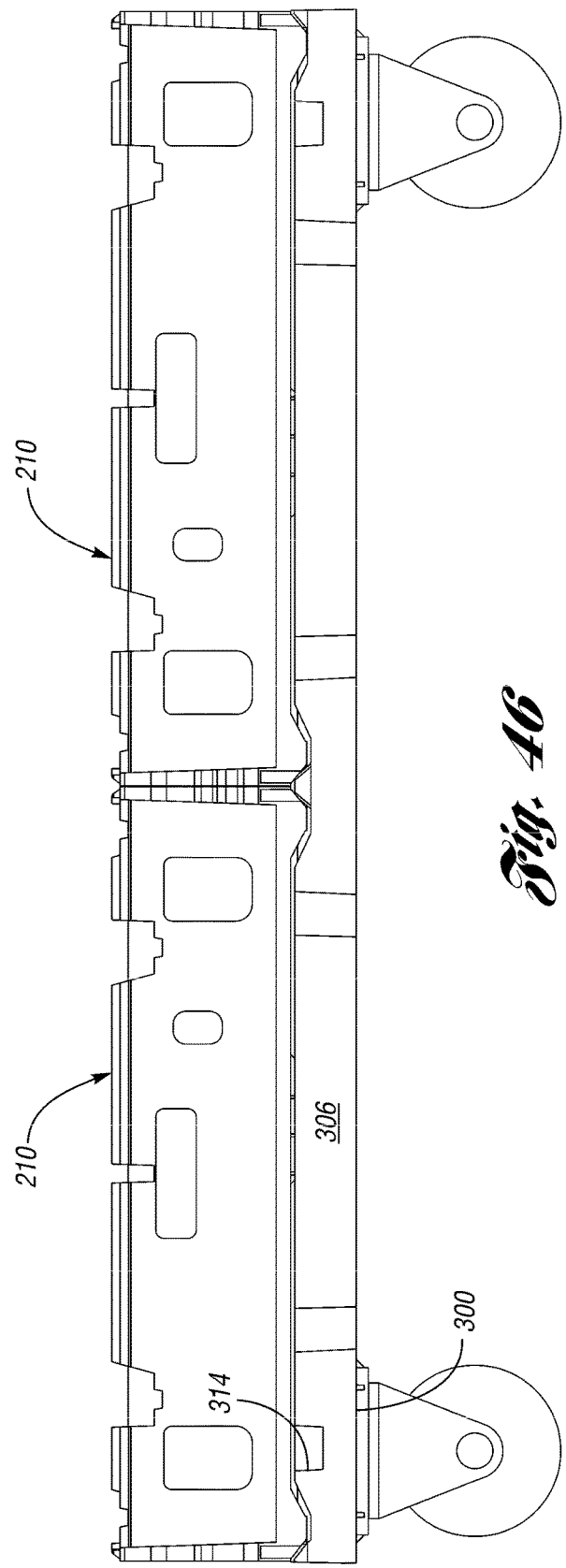
FIG. 46 is an enlarged view of a portion of the section view C-C of FIG. 43.
Figure 47:
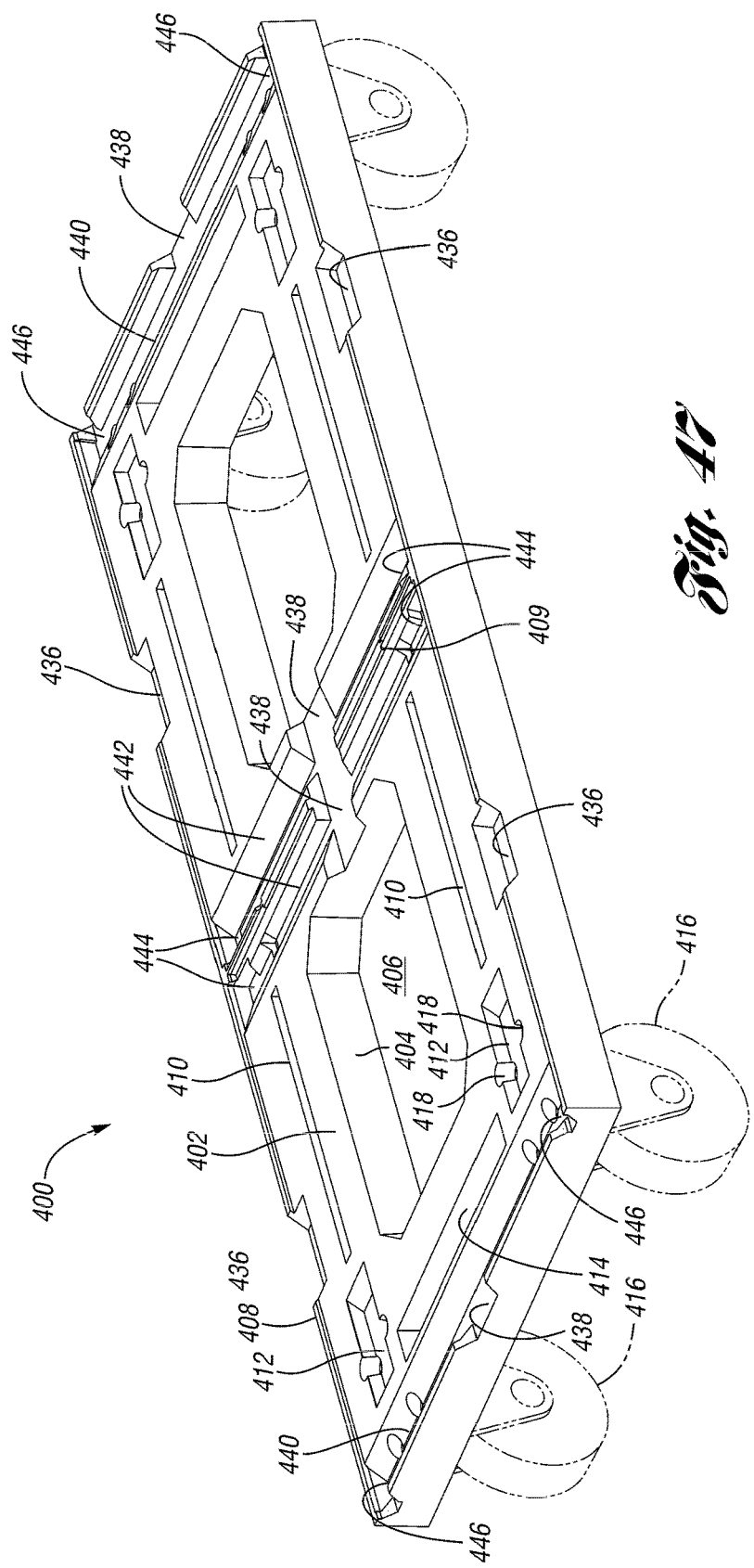
FIG. 47 is a perspective view of a dolly according to a second embodiment.

FIG. 46 is a section view taken along line C-C of FIG. 28.

FIGS. 47-62 show a dolly 400 according to a second embodiment of the present invention. The dolly 400 is the same as the dolly 300 of FIG. 37 except as described below or shown in the drawings. The dolly 400 accommodates two trays, as before. Each half of the dolly 400 includes a central support surface 402 having a large central opening 406 and a large vertical rib 404 extending downwardly around the periphery of the opening 406. A lip 408 projects upwardly from the periphery of the dolly 400. A divider 409 divides the halves of the dolly 400.

The central support surface 402 includes a pair of side channels 410 formed therein for reinforcement and load distribution. The central support surface 402 further includes a pair of caster recesses 412 aligned with casters 416 on the bottom of the dolly 400. When the dolly 400 is empty, the casters 416 of a similar dolly 400 can be received in the caster recesses 412 to facilitate stacking of empty dollies 400. The central support surface 402 further includes an end channel 414 adjacent each end of the dolly 400. Fastener openings 418 are formed adjacent each caster receiving recess 412.

In each half of the dolly 400, a recess 436 is formed through the lip 408 and central support surface 402. Another recess 438 is formed through the divider 409 and adjacent a portion of the central support surface 402. Another recess 438 is formed in each end of the dolly 400, adjacent a drag rail nesting cavity 440 adjacent each end of the dolly 400. These recesses 436, 438 accommodate J-hooks used to lift and pull a stack of trays off the dolly 400.

Figure 48:
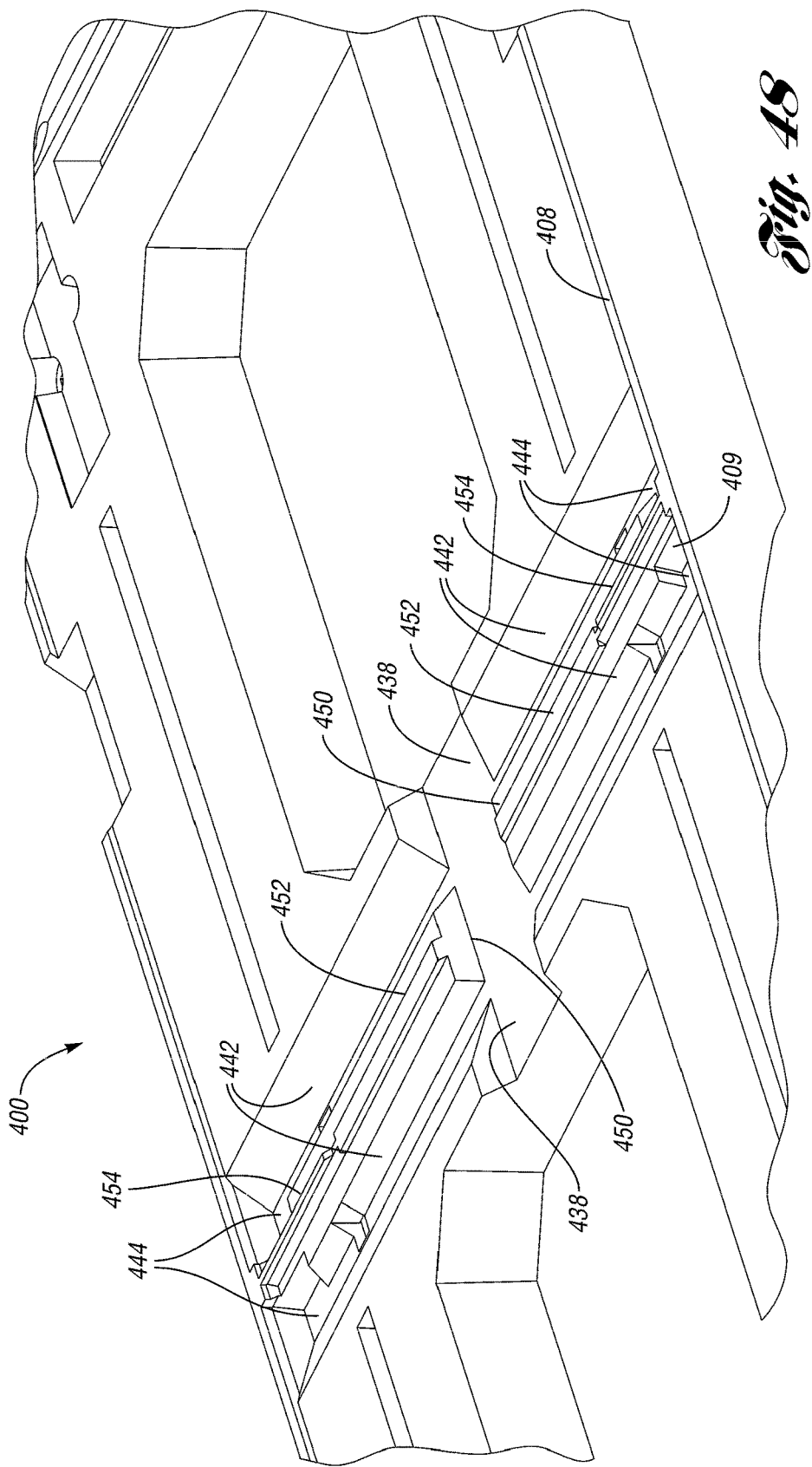
FIG. 48 is an enlarged view of the center of the dolly of FIG. 47.

Drag feet nesting cavities 446 are formed in each corner of the dolly 400. Drag feet nesting cavities 444 are also formed adjacent the edges of the dolly 400 along the center line dividing the halves of the dolly 400. FIG. 48 is an enlarged view of the divider 409 of the dolly 400. The divider 409 includes a plurality of raised surfaces and ribs, as shown. The divider 409 includes a base divider 450 separating the two drag rail receiving channels 442. A first rail portion 452 projects upwardly from the center of the base divider 450. A second rail portion 454 projects upwardly from the first rail portion 452 adjacent the drag feet nesting cavities 444.

Figure 49:
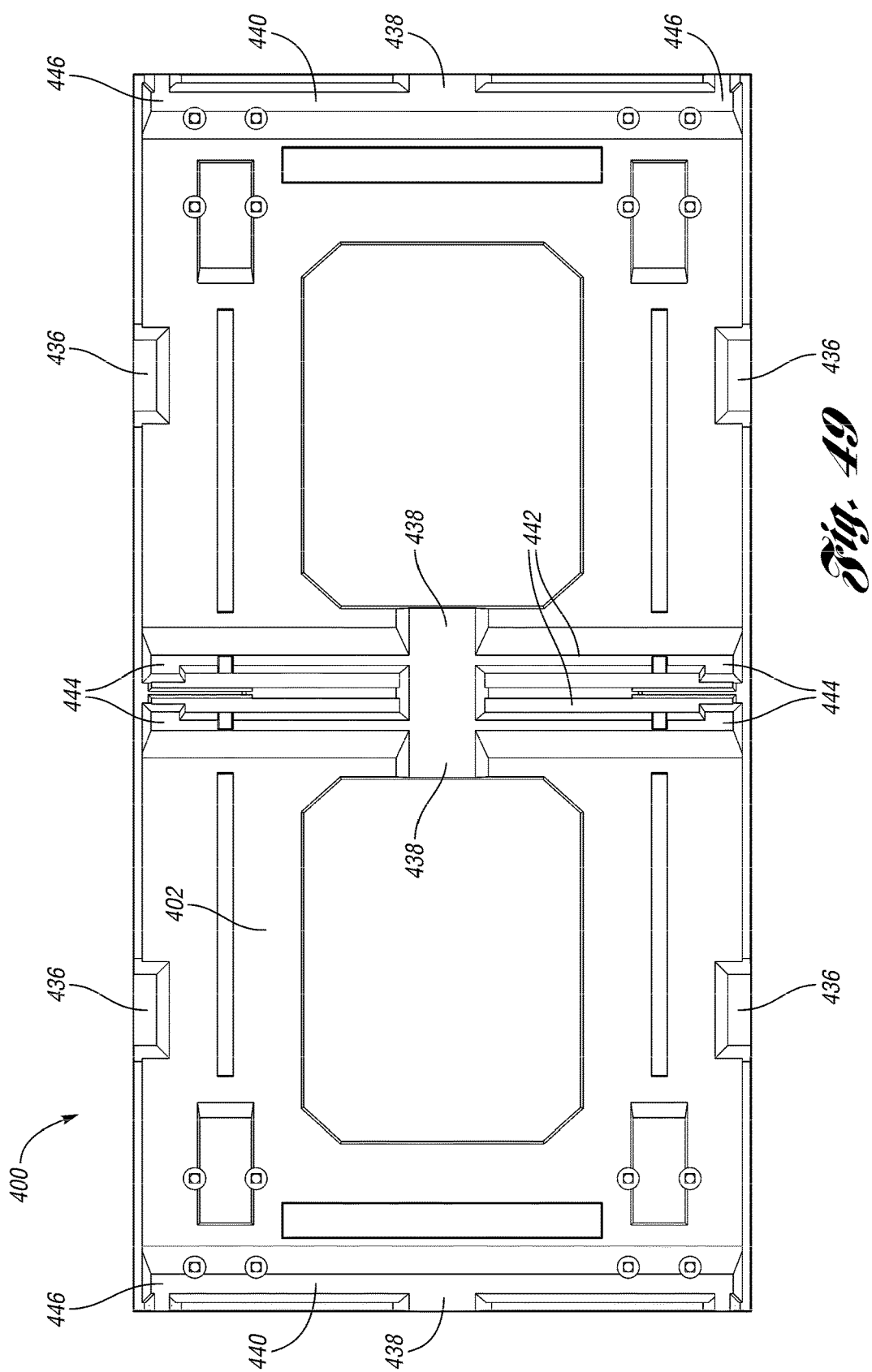
FIG. 49 is a top view of the dolly of FIG. 47.
Figure 50:
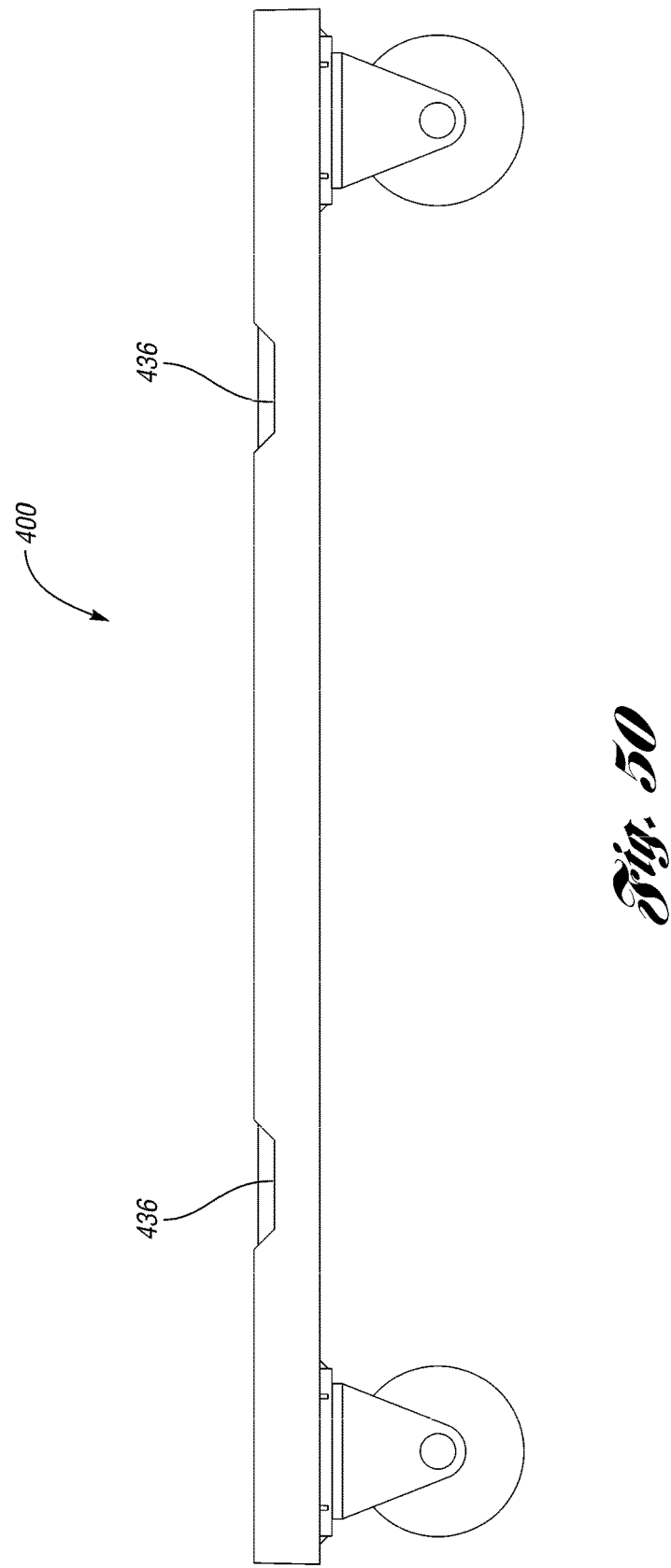
FIG. 50 is a side view of the dolly of FIG. 47.
Figure 51:
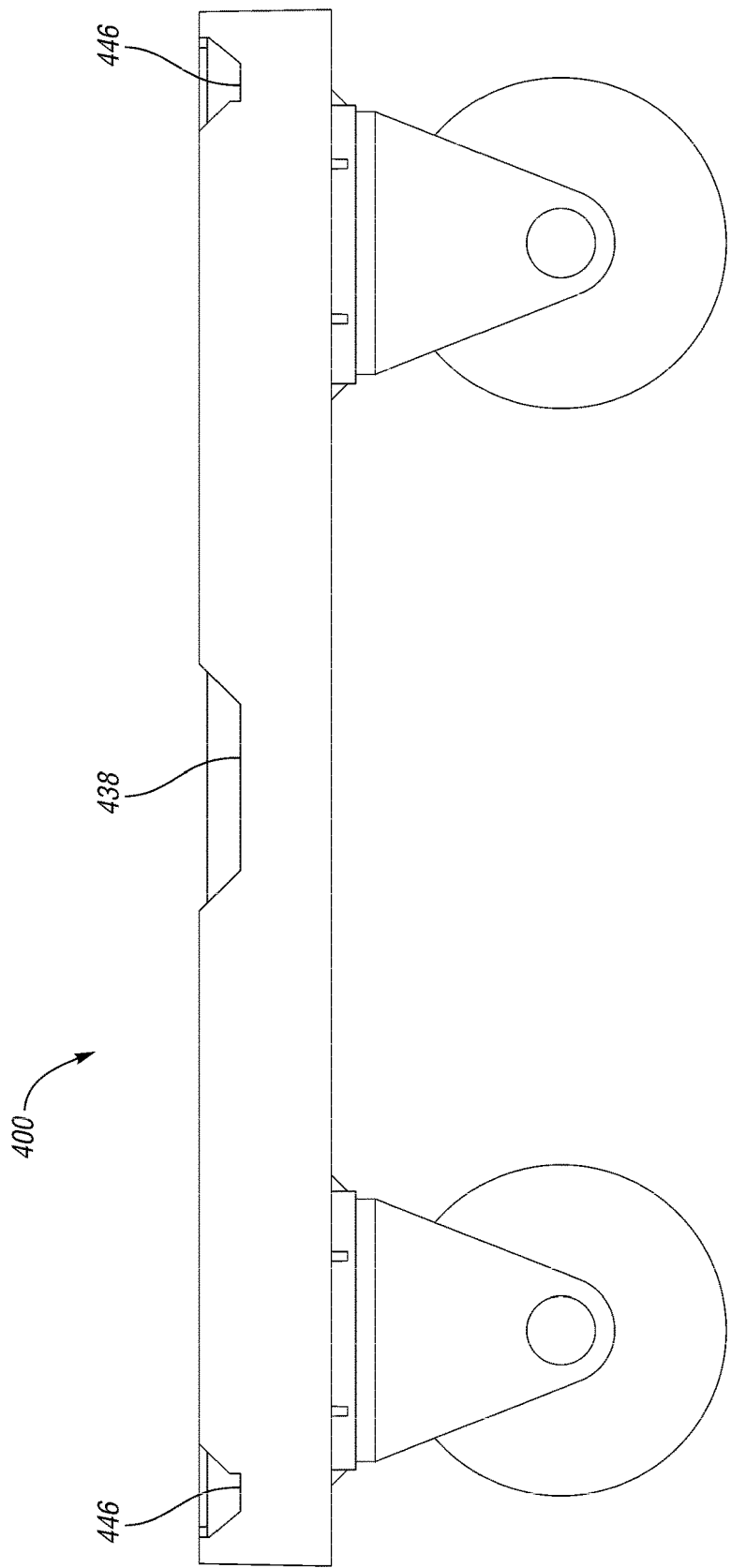
FIG. 51 is an end view of the dolly of FIG. 47.

FIG. 49 is a top view of the dolly 400. FIG. 50 is a front view of the dolly 400. FIG. 51 is a side view or end view of the dolly 400.

Figure 52:
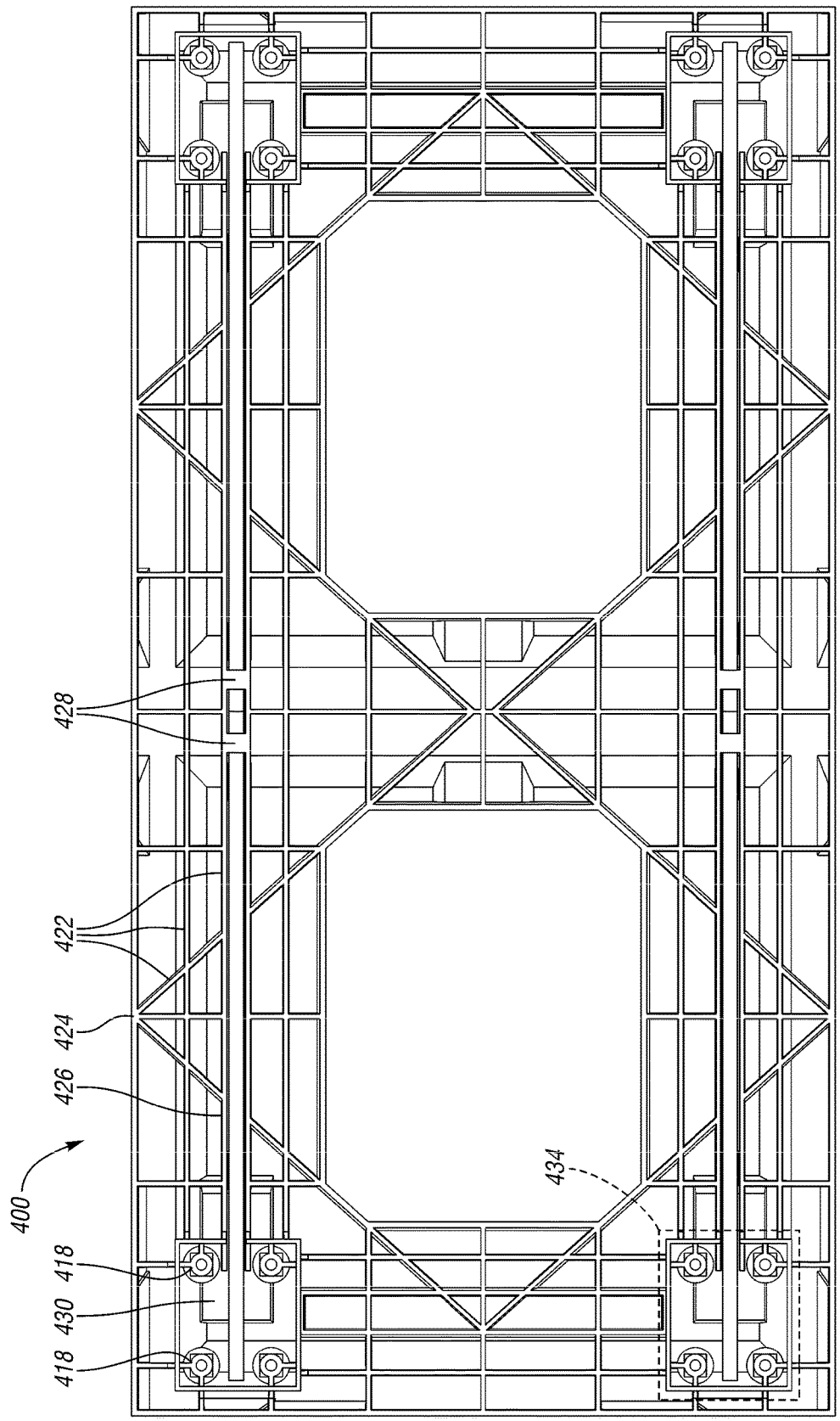
FIG. 52 is a bottom view of the dolly of FIG. 47.
Figure 53:
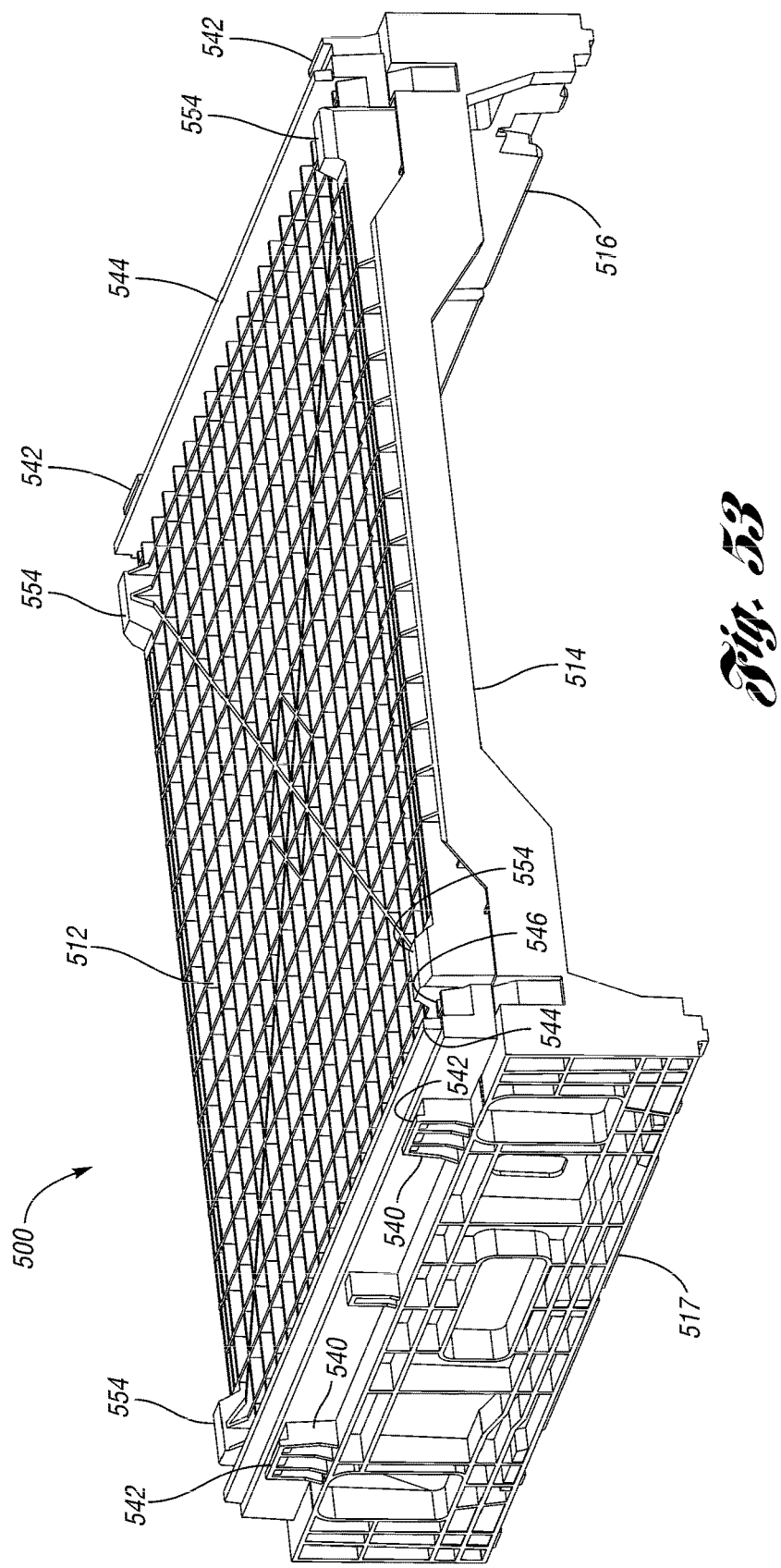
FIG. 53 is a bottom perspective of a tray according to a third embodiment.

FIG. 52 is a bottom view of the dolly 400. A plurality of ribs 422 are formed on the underside of the dolly 400, including a pair of ribs 422 that define a channel 424 for receiving a reinforcement rod 426. The reinforcement rod 426 could be steel, aluminum, metal, fiber glass, composite or other stiff material. Tabs 428 are formed below the channel 424 to retain the reinforcement rod 426 in the middle of the dolly 400. At the ends of the dolly 400, the reinforcement rods 426 extend into the caster areas. In the example shown, the reinforcement rods 426 extend adjacent the fastener receiving openings 418, such that the reinforcement rods 426 would be secured to the dolly 400 by the caster plates 434 (one shown in phantom in FIG. 52).

A tray 510, similar to the trays 10, 210 described above, is shown in FIG. 53, which is a bottom perspective view. The tray 510 includes a base 512, front wall 514 and side walls 516, 517. Stacking feet 540 extend downward from each side wall 516, 517. Each stacking foot 540 includes an outer rib 542 projecting downwardly therefrom. A short wall drag rail 544 projects downwardly from the base 512 below each of the side walls 516, 517. Drag feet 554 are formed inwardly of the drag rails 544 along the front and rear of the tray 510.

Figure 56:
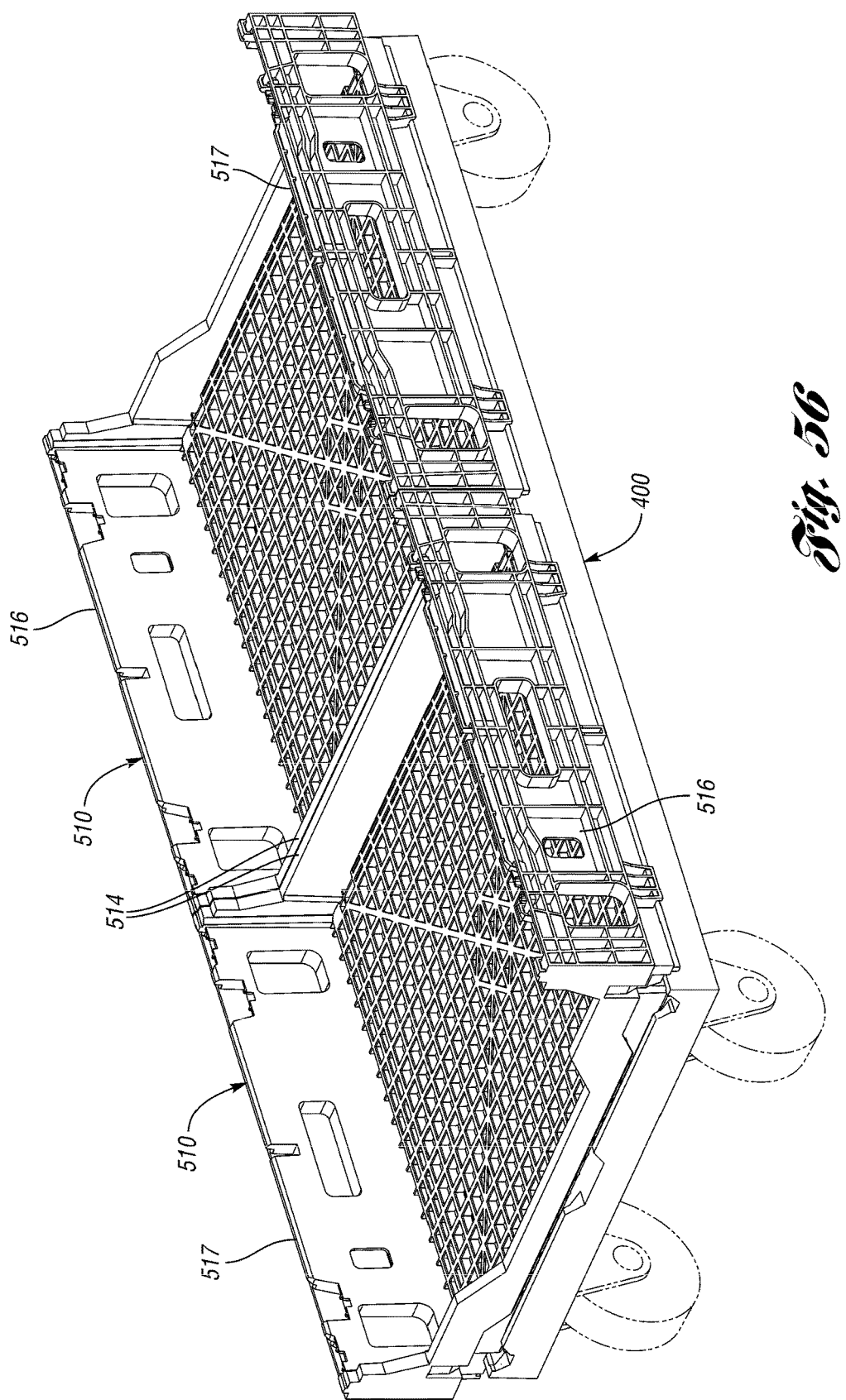
FIG. 56 is a perspective view of the dolly and tray of FIG. 55 with a second tray on the dolly.

The dolly 400 can carry two of the trays 510 in either of two 90° orientations, shown generally in FIGS. 56 and 60.

Figure 54:
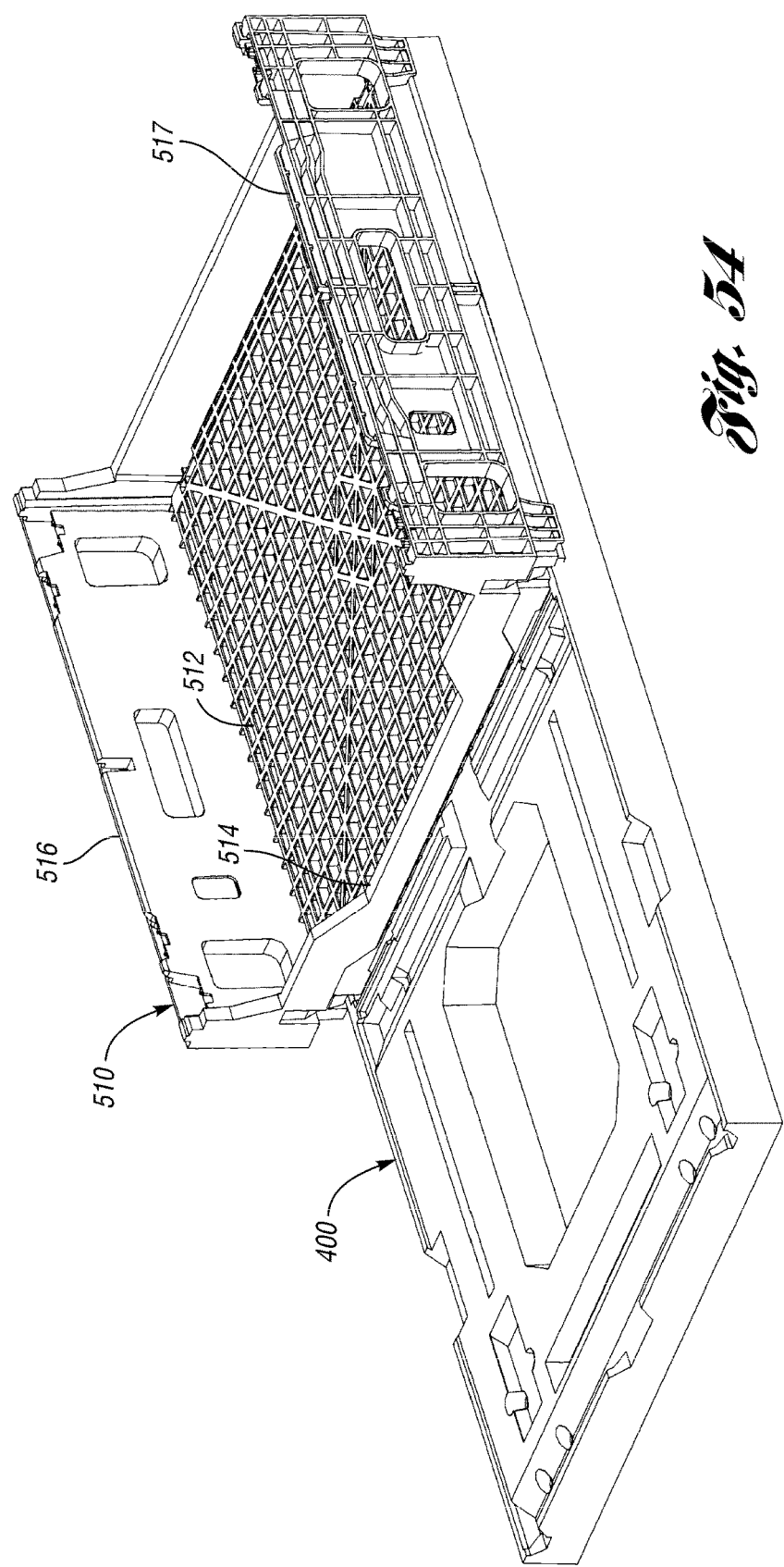
FIG. 54 is a perspective view of the dolly of FIG. 47 with the tray of FIG. 53 thereon.
Figure 55:
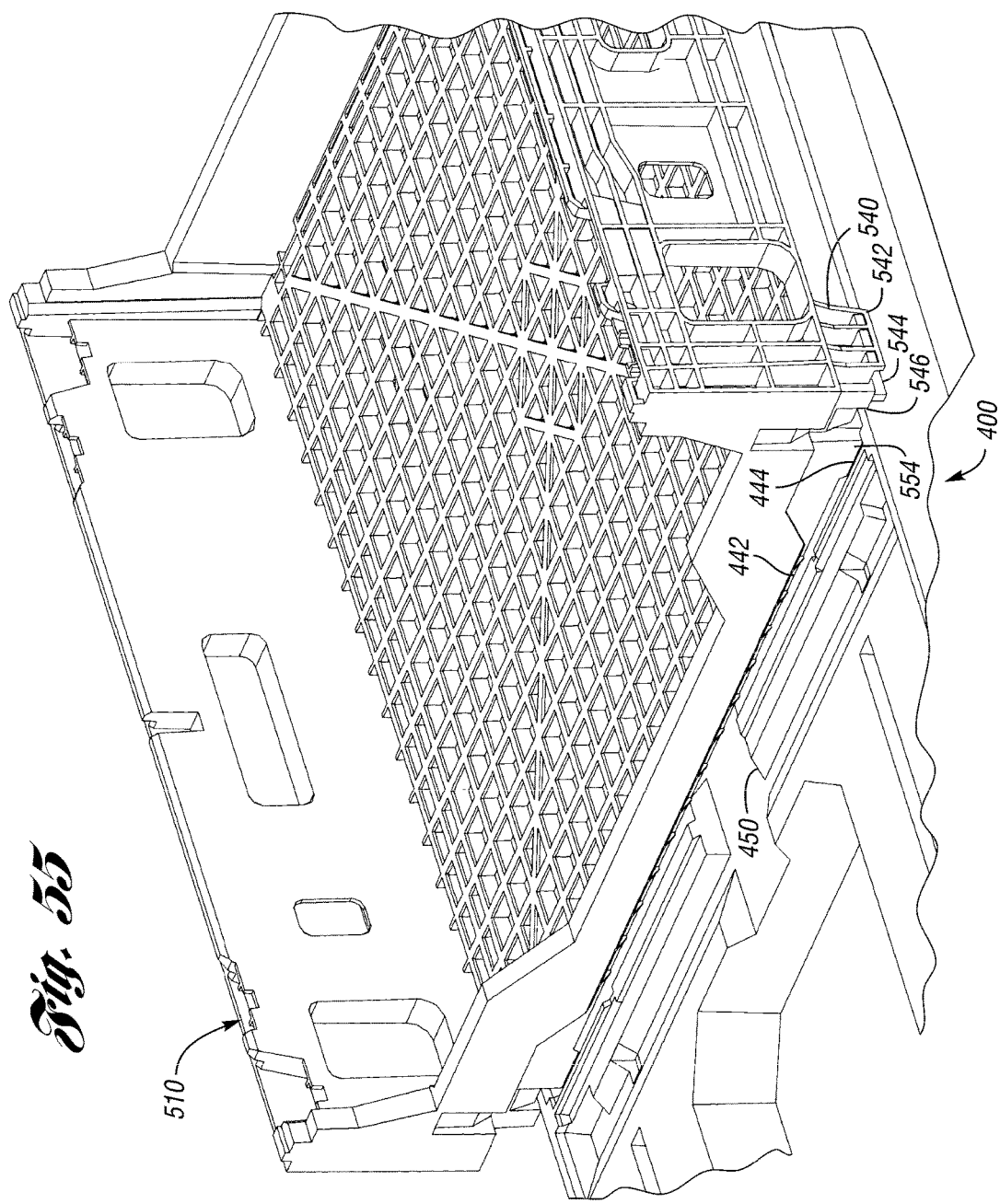
FIG. 55 is an enlarged view of the center of the dolly and tray of FIG. 54.

FIG. 54 illustrates the dolly 400 with a single tray 510 stacked thereon in a first orientation. FIG. 55 is an enlarged view of a portion of FIG. 54. As shown in FIG. 55, the lip 408 of the dolly 400 is received in the channel 546 formed adjacent the drag rail 544. The drag feet 554 are received in the drag feet nesting cavities 444 on the dolly 400. The base divider 450 also keeps the tray 510 in place on the dolly 400.

Figure 57:
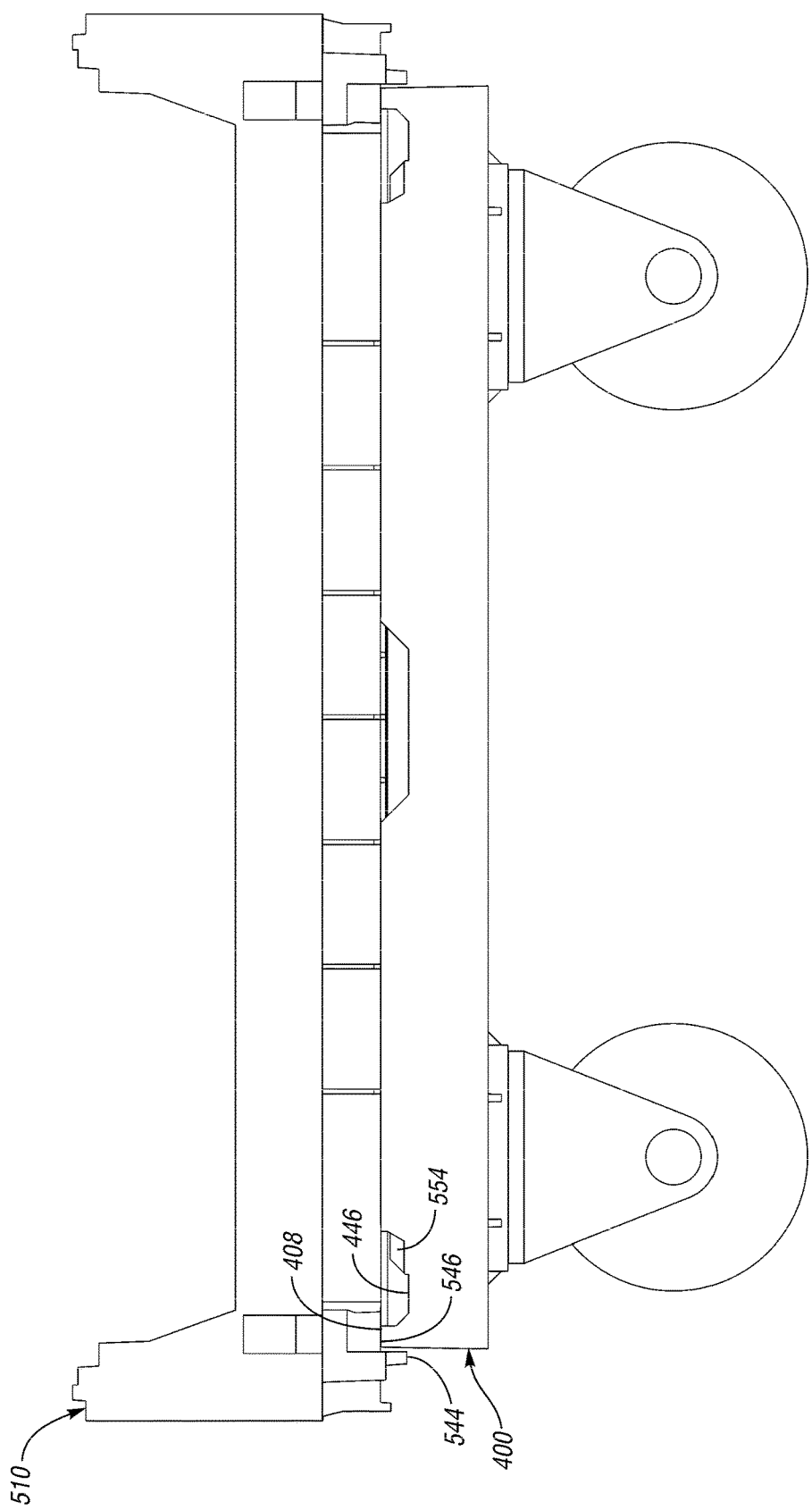
FIG. 57 is an end view of the dolly and trays of FIG. 56.

Referring to FIG. 56, in this orientation, the dolly 400 can accommodate two of the trays 510. As shown, the front walls 514 of the two trays 510 are adjacent one another in the center of the dolly 400. Referring to FIG. 57, the lip 408 is received in the channel 546 inwardly of the drag rail 544. The drag feet 554 are received in the drag feet nesting cavities 446.

Figure 58:
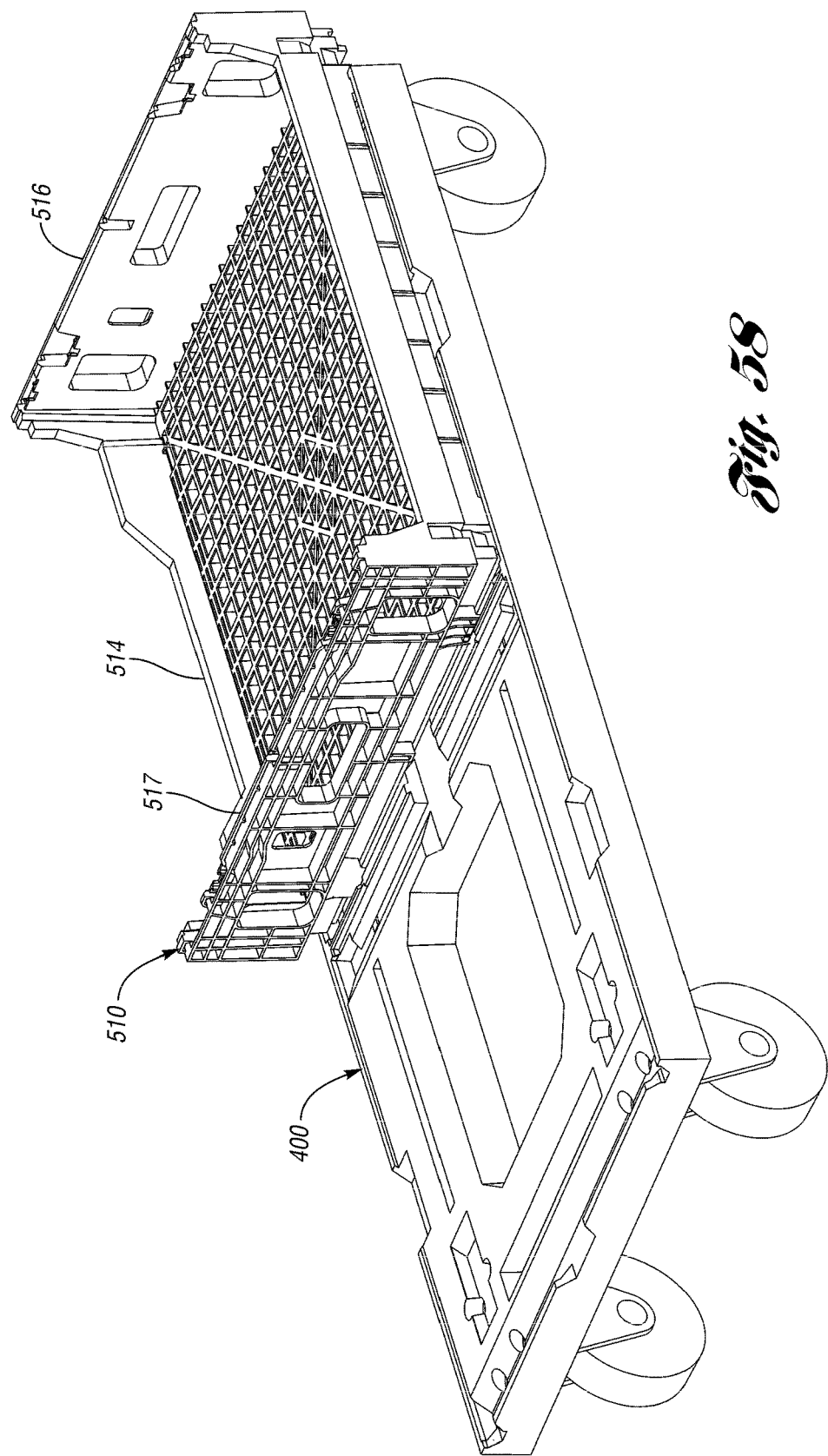
FIG. 58 shows the dolly and tray of FIG. 54 with the dolly in a second orientation.

FIG. 58 shows the tray 510 on the dolly 400 in a second orientation, i.e., with the side wall 517 along the center of the dolly 400. FIG. 59 is an enlarged view of the central portion of FIG. 58 (also showing that the tray 510 can be rotated with the rear wall in the center of the dolly 400). As shown, the drag rail 544 of the tray 510 is received in the drag wall receiving channel 442. The rib 542 of the stacking feet 540 abuts the rails 452, 454 of the divider 409.

Referring to FIG. 60 two of the trays 510 can be carried on the dolly 400 in a second orientation, i.e., with the side walls 516, 517 adjacent one another in the center of the dolly 400, and the front walls 514 of the trays 510 facing the same direction on the dolly 400. FIG. 61 is a front view of the dolly 400 and trays 510 of FIG. 60. FIG. 62 is a side view of the dolly 400 and one of the trays 510 of FIG. 60. As shown, the drag rail 544 is received in the drag rail receiving channel 442.

The trays are integrally molded as a single pieces of plastic. The deck of the dollies are integrally molded as a single piece of plastic.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A tray comprising:
    a base;
    a pair of opposed side walls extending upward from the base, each of the side walls including a plurality of feet providing multiple stacking heights with an identical tray, each side wall including a drag rail adjacent a lower surface of the base, wherein each side wall includes a generally horizontal upper surface and a side rail projecting upward higher than the upper surface, the upper surfaces having outermost edges such that the side rails are between the outermost edges, each side rail and upper surface defining a channel opening outwardly of the side rail through the outermost edge and opening upwardly of the upper surface;
    a rear wall extending upward from a rear of the base between the side walls; and
    a front wall extending upward from a front of the base between the side walls, the front wall including a portion lower than the side walls;

side flanges extending inwardly from the pair of side walls toward one another above the front wall and the rear wall and a notch in an upper surface of each of the side flanges aligned with the drag rail spaced inward from the side rail and below the side rail and the channel.

2. The tray of claim 1, wherein the notch abuts an inner edge of each of the side flanges.

3. The tray of claim 1, wherein a portion of each of the side flanges is flush with the side rail.

4. The tray of claim 1, further including a center projection between the feet on each side wall, the center projection including an outer projection projecting downwardly from the center projection.

5. The tray of claim 4, wherein each of the plurality of feet include a notch at least partially defined by an outer projection projecting downwardly from an outer side of each of the feet.

6. The tray of claim 1, comprising a stacking notch formed in the front wall adjacent each side wall and a stacking notch formed in the rear wall adjacent each side wall, the stacking notches configured to simultaneously partially receive side flanges of an identical tray on which the tray is cross-stacked.

7. A tray comprising:
a base;
a pair of opposed side walls extending upward from the base, each of the side walls including a plurality of feet configured to provide a high stacking position and a low stacking position when stacked on an identical tray, wherein the plurality of feet are supportable on the side walls of the identical tray in the high stacking position and in the low stacking position, wherein the tray is configured to provide the high stacking position when rotated 180 degrees from the low stacking position relative to the identical tray, wherein each of the side walls includes a pair of high feet-receiving pockets and a pair of low feet-receiving pockets, wherein the plurality of feet of the tray are receivable in the high feet-receiving pockets of the identical tray to provide the high stacking position and receivable in the low feet-receiving pockets of the identical tray to provide the low stacking position, each side wall including a side rail, wherein an uppermost surface of the side rail is the uppermost surface of the side wall, each side wall including an outer ledge defined outwardly of the side rail such that the side rails are between the outer ledges, wherein uppermost surfaces of the side rails are further from the base than the outer ledges, wherein the outer ledges are the uppermost surfaces of the tray outward of the side rails;
a rear wall extending upward from a rear of the base between the side walls; and
a front wall extending upward from a front of the base between the side walls, the front wall including a portion lower than the side walls.

8. The tray of claim 7, wherein the each of the pair of side walls include an outer surface with an upper edge flush with the outer ledge.

9. The tray of claim 8, wherein each outer ledge abuts the outer surface of one of the pair of side walls.

10. The tray of claim 7, wherein the side rail on each of the pair of side walls is interrupted by the pair of high feet receiving pockets and the pair of low feet receiving pockets, and the pockets are inward from the outer ledge.

11. The tray of claim 7, wherein each side rail abuts an inner surface of one of the pair of side walls.

12. The tray of claim 7, wherein each side rail is connected to the outer ledge with a guide surface.

13. The tray of claim 12, wherein each of the plurality of feet include a notch for accepting the side rail of the identical tray when stacked thereon.

14. The tray of claim 7 wherein the outer ledges are generally parallel to the base.

15. The tray of claim 14 wherein the side rails are perpendicular to the outer ledges.

16. A tray comprising:
a base;
a pair of opposed side walls extending upward from the base, each of the side walls including a plurality of feet configured to provide a high stacking position and a low stacking position when stacked on an identical tray, wherein the plurality of feet are supportable on the side walls of the identical tray in the high stacking position and in the low stacking position, wherein the tray is configured to provide the high stacking position when rotated 180 degrees from the low stacking position relative to the identical tray, each side wall including a side rail, wherein an uppermost surface of the side rail is the uppermost surface of the side wall, each side wall including an outer ledge defined outwardly of the side rail such that the side rails are between the outer ledges, wherein uppermost surfaces of the side rails are further from the base than the outer ledges, wherein the outer ledges are the uppermost surfaces of the tray outward of the side rails, wherein each side rail is connected to the outer ledge with a guide surface, wherein each of the plurality of feet include a notch for accepting the side rail of the identical tray when stacked thereon, wherein at least one of the plurality of feet include an outer projection at least partially forming the notch with a lower wall portion projecting downward below the base, the outer projection includes a contact surface configured to engage the guide surface when stacked on the identical tray;
a rear wall extending upward from a rear of the base between the side walls; and
a front wall extending upward from a front of the base between the side walls, the front wall including a portion lower than the side walls.

17. A tray comprising:
a base;
a pair of opposed side walls extending upward from the base, each of the side walls including a plurality of feet configured to provide a high stacking position and a low stacking position when stacked on an identical tray, wherein the plurality of feet are supportable on the side walls of the identical tray in the high stacking position and in the low stacking position, wherein the tray is configured to provide the high stacking position when rotated 180 degrees from the low stacking position relative to the identical tray, each side wall including a side rail, wherein an uppermost surface of the side rail is the uppermost surface of the side wall, each side wall including an outer ledge defined outwardly of the side rail such that the side rails are between the outer ledges, wherein uppermost surfaces of the side rails are further from the base than the outer ledges, wherein the outer ledges are the uppermost surfaces of the tray outward of the side rails;
a rear wall extending upward from a rear of the base between the side walls;

a front wall extending upward from a front of the base between the side walls, the front wall including a portion lower than the side walls; and side flanges extending inwardly from the pair of side walls toward one another above the front wall and the rear wall and a notch formed in the front wall adjacent each side wall and a notch formed in the rear wall adjacent each side wall, the notches configured to simultaneously partially receive the side flanges of the identical tray when the tray is cross-stacked thereon.

18. A tray comprising:

a base;

a pair of opposed side walls extending upward from the base, each of the side walls including an upper wall portion including a plurality of ribs extending outward from an interior wall portion, each of the side walls including a lower wall portion below the upper wall portion and recessed inward relative to the plurality of ribs of the upper wall portion, each of the side walls including a plurality of feet providing multiple stacking heights with an identical tray, the plurality of feet below the plurality of ribs and extending outward from the lower wall portion, a center projection between the feet on each of the pair of side walls, wherein the center projection includes a lowermost surface projecting outward from the lower wall portion, an outer projection projecting downwardly from an outer edge of the lowermost surface of the center projection to form a notch between the outer projection and the lower wall portion of the side wall and, wherein the space between the outer projection and the lower wall portion is void of material;

a rear wall extending upward from a rear of the base between the side walls; and a front wall extending upward from a front of the base between the side walls, the front wall including a portion lower than the side walls.

19. The tray of claim 18, wherein each of the pair of side walls include a rail extending from an upper edge and the notch is configured to receive the rail when slid on the identical tray.

20. The tray of claim 19, wherein the rail is spaced from an outer ledge by a guide surface and the outer projection is configured to engage the guide surface when slid on the identical tray.

21. The tray of claim 19 further including side flanges extending inwardly from the side walls toward one another, at least one of the side flanges including a notch aligned with the lower wall portion and configured to receive the lower wall portion when an identical tray is stacked thereon.

22. The tray of claim 18 wherein the lower wall portion of each of the side walls projects downward below the base.

23. The tray of claim 18 further including a handle opening through each of the upper wall portions of the side walls, the handle opening at least partially defined by the plurality of ribs.

24. The tray of claim 23 wherein each center projection is disposed directly below the handle opening.

25. The tray of claim 18 wherein each of the feet includes a lowermost foot surface extending outward from the lower wall portion, wherein the lowermost foot surface and lowermost surface of the center projection are coplanar.

26. The tray of claim 18 wherein each of the feet includes a lowermost foot surface extending outward from the lower wall portion, an outer foot projection projecting downward from an outer edge of each lowermost foot surface, wherein lowermost surfaces of the outer foot projections and the outer projections of the center projections are coplanar.

27. A tray comprising:

a base having an upper support surface for supporting goods thereon;

a pair of opposed side walls extending upward from the base;

a rear wall extending upward from a rear of the base between the side walls;

a front wall extending upward from a front of the base between the side walls, the front wall including a portion having a height lower than the side walls, wherein the front wall and rear wall each include an inner wall portion extending upward from the base and a lip extending outwardly and then downwardly from an upper edge of the inner wall portion; and side flanges extending inwardly from the side walls toward one another above the front wall and toward one another above the rear wall, the lip extending downward from each of the side flanges to a bottom edge below the side flange, a notch formed in the front wall adjacent each side wall and a notch formed in the rear wall adjacent each side wall, wherein the notches are laterally adjacent the lips of the front wall and rear wall, each notch extending upward from the bottom edge of the lip below the side flange, the notches configured to be aligned with the side flanges of an identical tray when the tray is cross-stacked on the identical tray.

28. The tray of claim 27 wherein each of the side walls includes a plurality of feet and a plurality of pockets providing multiple stacking heights with the identical tray.

29. The tray of claim 27 further including a drag rail below the base proximate each side wall, a plurality of drag feet below the base spaced inward of each the drag rails to define a channel inward of each drag rail and outward of the drag feet, the channels configured to receive upper edges of the front and rear walls when the tray is cross-stacked on the identical tray.

30. The tray of claim 27 wherein each side wall includes a side rail projecting upward and defining a channel opening outwardly of the tray with an outer ledge outward of the side rail.

31. The tray of claim 27 wherein the at least one of the side flanges of the identical tray is at least partially received in one of the notches of the tray.

32. A tray comprising:

a base having an upper support surface for supporting goods thereon;

a pair of opposed side walls extending upward from the base;

a rear wall extending upward from a rear of the base between the side walls;

a front wall extending upward from a front of the base between the side walls, the front wall including a portion having a height lower than the side walls, wherein the front wall and rear wall each include an inner wall portion extending upward from the base and a lip extending outwardly and then downwardly from an upper edge of the inner wall portion; and side flanges extending inwardly from the side walls toward one another above the front wall and toward one another above the rear wall, the lip extending downward from each of the side flanges to a bottom edge below the side flange, a recess formed in the lip of the front wall adjacent each side wall and a recess formed in the lip of the rear wall adjacent each side wall, each recess extending upward from the bottom edge of the lip below the side flange, wherein the tray is capable of being cross-stacked onto a similar tray with the base of the tray supported on the front and rear walls of the similar tray, wherein each of the recesses of the tray are capable of receiving one of the side flanges of the similar tray when the tray is cross-stacked on the similar tray.

33. The tray of claim 32 wherein the tray is cross-stacked on the similar tray and wherein the side flanges of the similar tray are received in the recesses of the tray.

34. A tray comprising:
a base having an upper support surface for supporting goods thereon;
a pair of opposed side walls extending upward from the base;
a rear wall extending upward from a rear of the base between the side walls;
a front wall extending upward from a front of the base between the side walls, the front wall including a portion having a height lower than the side walls, wherein the front wall and rear wall each include an inner wall portion extending upward from the base and a lip extending outwardly and then downwardly from an upper edge of the inner wall portion;
side flanges extending inwardly from the side walls toward one another above the front wall and toward one another above the rear wall, a notch formed in the front wall adjacent each side wall and a notch formed in the rear wall adjacent each side wall, wherein the notches are laterally adjacent the lips of the front wall and rear wall, the notches configured to be aligned with the side flanges of an identical tray when the tray is cross-stacked on the identical tray;
a drag rail below the base proximate each side wall; and
a plurality of drag feet below the base spaced inward of each the drag rails to define a channel inward of each drag rail and outward of the drag feet, the channels configured to receive upper edges of the front and rear walls when the tray is cross-stacked on the identical tray.

35. The tray of claim 34 wherein each of the side walls includes a plurality of feet and a plurality of pockets providing multiple stacking heights with an identical tray.

* * * * *